(12) United States Patent
Daniels et al.

(10) Patent No.: US 12,112,031 B2
(45) Date of Patent: *Oct. 8, 2024

(54) AUGMENTED REALITY FOR THE INTERNET OF THINGS

(71) Applicant: YouAR INC., Portland, OR (US)

(72) Inventors: Oliver Clayton Daniels, Portland, OR (US); David Morris Daniels, Portland, OR (US); Paul Issac Thomas, Centralia, WA (US); Luke Timothy Hartwig, Portland, OR (US); Raymond Victor Di Carlo, Portland, OR (US)

(73) Assignee: YouAR INC., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,759

(22) Filed: Oct. 11, 2022

(65) Prior Publication Data

US 2023/0168796 A1    Jun. 1, 2023

Related U.S. Application Data

(63) Continuation of application No. 17/069,764, filed on Oct. 13, 2020, now Pat. No. 11,467,721, which is a
(Continued)

(51) Int. Cl.
*G06F 3/0482* (2013.01)
*G06F 3/01* (2006.01)
(Continued)

(52) U.S. Cl.
CPC .......... *G06F 3/04847* (2013.01); *G06F 3/011* (2013.01); *G06F 3/048* (2013.01);
(Continued)

(58) Field of Classification Search
CPC ...... G06F 3/04847; G06F 3/011; G06F 3/048; G06F 3/04815; G06F 15/16; G06F 3/0482; G06F 9/451; G06F 9/54; H04L 67/12

See application file for complete search history.

(56) References Cited

U.S. PATENT DOCUMENTS 6,765,592 B1 *  7/2004  Pletcher ................. G06F 9/451
                                                            715/781
8,878,846 B1   11/2014  Francis, Jr. et al.
(Continued)

*Primary Examiner* — K C Chen
*Assistant Examiner* — Kuang F Chen
(74) *Attorney, Agent, or Firm* — Kolitch Romano Dascenzo Gates LLC

(57) ABSTRACT

An augmented reality (AR) platform for the Internet of Things (IoT) is disclosed. The AR platform enables a user to associate AR objects with IoT devices. These associations may further enable a user to direct a control input to a particular IoT device and receive outputs such as sensor measurements or state information from the IoT device via interaction with an associated AR object. These AR objects may be perceived by the user via a client device, such as via an AR viewer or other human interface. The AR platform further enables users to create shareable objects that define
(Continued)

an association among or between multiple AR objects and their IoT devices that can be shared with and modified by other users.

20 Claims, 32 Drawing Sheets

Related U.S. Application Data continuation of application No. 16/087,656, filed as application No. PCT/US2017/023902 on Mar. 23, 2017, now Pat. No. 10,802,695.

(60) Provisional application No. 62/312,426, filed on Mar. 23, 2016.

(51) Int. Cl.
| | |
|---|---|
| *G06F 3/048* | (2013.01) |
| *G06F 3/04815* | (2022.01) |
| *G06F 3/04847* | (2022.01) |
| *G06F 15/16* | (2006.01) |
| G06F 9/451 | (2018.01) |
| G06F 9/54 | (2006.01) |
| H04L 67/12 | (2022.01) |

(52) U.S. Cl.
CPC .......... *G06F 3/04815* (2013.01); *G06F 15/16* (2013.01); *G06F 3/0482* (2013.01); *G06F 9/451* (2018.02); *G06F 9/54* (2013.01); *H04L 67/12* (2013.01)

(56) References Cited

U.S. PATENT DOCUMENTS

| | | | |
|---|---|---|---|
| 9,063,739 B2 | 6/2015 | Ward et al. | |
| 2012/0096403 A1* | 4/2012 | Jung | H04M 1/72457 |
| | | | 715/817 |
| 2015/0074506 A1 | 3/2015 | Dunn et al. | |
| 2016/0005233 A1* | 1/2016 | Fraccaroli | G06F 3/0487 |
| | | | 345/633 |
| 2016/0165170 A1* | 6/2016 | McRae | G08C 17/02 |
| | | | 348/734 |
| 2016/0189427 A1 | 6/2016 | Wu et al. | |
| 2017/0054569 A1* | 2/2017 | Harms | H04W 4/33 |
| 2018/0314889 A1* | 11/2018 | Fukazawa | G06F 3/038 |
| 2019/0080518 A1* | 3/2019 | Soon-Shiong | G06F 16/00 |
| 2021/0385299 A1* | 12/2021 | Liao | G06F 3/03547 |

\* cited by examiner

| Layer ID | Layer Active? | ARC in FOV? | Description | Priority |
|---|---|---|---|---|
| ID 07 | N/A | Yes | Superlayer-Reserved | Highest |
| ID 02 | Yes | Yes | Currently Focused layer | High |
| ID 10 | Yes | Yes | Last focused layer | A |
| ID 16 | Yes | Yes | Most frequently focused layer | B |
| ID 03 | Yes | Yes | Least frequently focused layer | C |
| ID 15 | Yes | Yes | Never focused layer | D |
| ID 04 | Yes | Yes | Most recent interacted layer | E |
| ID 08 | Yes | Yes | Least frequently interacted layer | F |
| ID 09 | Yes | Yes | Never interacted layer | Lowest |
| ID 01 | Yes | No | Last focused layer | N/A |
| ID 13 | Yes | No | Most frequently focused layer | N/A |
| ID 06 | Yes | No | Least frequently focused layer | N/A |
| ID 12 | Yes | No | Never focused layer | N/A |
| ID 14 | Yes | No | Most recent interacted layer | N/A |
| ID 00 | Yes | No | Least frequently interacted layer | N/A |
| ID 11 | Yes | No | Never interacted layer | N/A |
| ID 05 | No | N/A | Inactive layer | N/A |

AUGMENTED REALITY FOR THE INTERNET OF THINGS

CROSS-REFERENCES

The following applications and materials are incorporated herein, in their entireties, for all purposes: U.S. patent application Ser. No. 17/069,764, filed Oct. 13, 2020, now U.S. Pat. No. 11,467,721, issued Oct. 11, 2022; U.S. patent application Ser. No. 16/087,656, filed Sep. 23, 2018, now U.S. Pat. No. 10,802,695, issued Oct. 13, 2020; U.S. Provisional Patent Application Ser. No. 62/312,426, filed Mar. 23, 2016; and U.S. Provisional Patent Application Ser. No. 62/242,860, filed Oct. 16, 2015.

INTRODUCTION

Augmented reality (AR) refers to machine-based augmentation of a person's sensory perception of a physical, real-world environment. Visual AR refers to a real-world view that is supplemented or otherwise altered by computer-generated graphical content, referred to as graphical AR content. Visual AR is typically achieved by either presenting graphical AR content via a graphical display device by which a camera view of a real-world environment is also presented, or by presenting graphical AR content via a see-through graphical display device that provides a person with a direct view of a real-world environment through the see-through graphical display device. Other forms of AR may relate to different human senses, such as hearing, touch, taste, and smell.

The Internet of Things (IoT) may refer to devices that may be controlled and/or that provide sensor measurements or state reporting via information networks, such as the Internet. IoT devices may include appliances, vehicles, dedicated sensors, and other consumer electronics.

SUMMARY

Augmented reality platforms according to the present teachings provide methods and systems for interacting with Internet of Things devices.

In some embodiments, a computer-implemented augmented reality (AR) platform may include a computer system including a set of one or more AR programs, the set containing a first AR object associated with a first priority value and a second AR object associated with a second priority value, wherein the first AR object is configured to communicate with a first physical device via a computer network, and the second AR object is configured to communicate with a second physical device via the computer network; and a computing device in the computer network, wherein the computing device is configured to: monitor output of a sensor configured to sense an event within a physical space, and in response to sensing a first event by the sensor, automatically select one of the first and second AR objects based on the first and second priority values, and trigger the selected AR object to communicate a first command to the physical device corresponding to the selected AR object.

In some embodiments, a sensor system may include a sensor configured to sense data relating to a physical space; a computer-implemented augmented reality (AR) system in communication with a computer network, the AR system including a first AR object configured to communicate with a first physical device and a second AR object configured to communicate with a second physical device, wherein the first AR object has a first priority value and the second AR object has a second priority value; and a computer system configured to receive output of the sensor and, in response to output indicating a first event within the physical space, automatically determine that the first priority value indicates a higher priority than the second priority value and communicate first data to the first AR object; wherein the first AR object is configured to communicate an instruction to the first physical device in response to the first data.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 12 depicts a table that describes an illustrative priority framework.

DESCRIPTION

Figure 1:
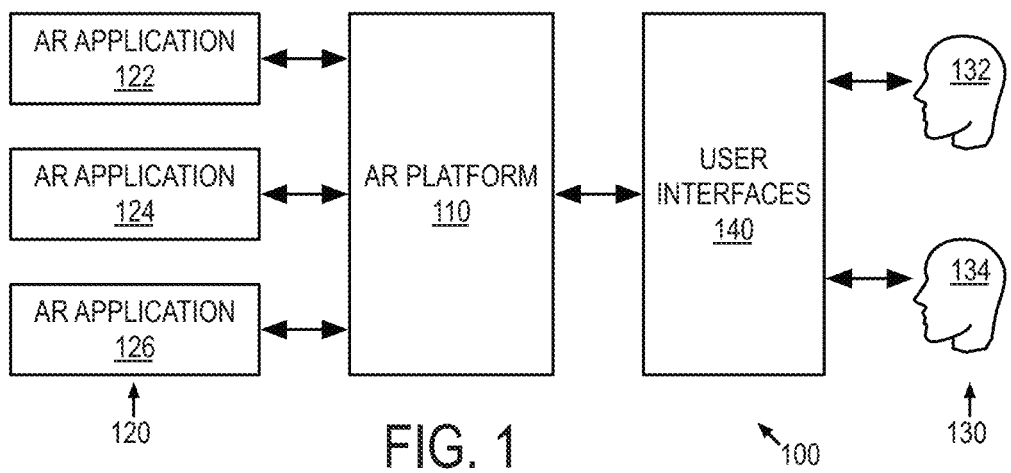
FIG. 1 is a schematic diagram depicting an illustrative augmented reality (AR) system.

The present disclosure and associated drawings describe various aspects and examples of an augmented reality (AR) platform that supports concurrent operation of multiple AR applications from first- and/or third-party software developers, includes shareable AR objects, and facilitates association of AR objects with Internet of Things (IoT) devices, as well as related devices and methods. Unless otherwise specified, the AR platform for IoT, and/or its various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Substantially" means to be essentially conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"Internet of Things" or "IoT" refers to devices that may be controlled and/or that provide sensor measurements or state reporting via information networks (e.g., the Internet). IoT devices may include appliances, vehicles, dedicated sensors, other consumer electronics devices, and the like. IoT devices may be interchangeably referred to as network-connected physical devices, or the like.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

OVERVIEW

In general, an augmented reality (AR) platform for the Internet of Things (IoT) enables a user to associate AR objects with network-connected physical devices (e.g., IoT devices) and to then interact with those devices using the AR objects. These associations may enable a user to direct a control input to a particular IoT device and receive outputs such as sensor measurements or state information from the IoT device via interaction with an associated AR object. These AR objects may be perceived by the user via a client device, such as via an AR viewer or other human interface. The AR platform further enables users to create shareable objects that define an association among or between multiple AR objects and their IoT devices that can be shared with and modified by other users.

The AR platform may include an application programming interface (API) that third-party software developers can use to integrate features of the AR platform into the overall user experience of their AR applications. The AR platform includes a feature set having a variety of AR-specific features that interact with and are accessible to the AR applications or AR layers that define a collection of AR content. Examples of these AR-specific features include:

(1) an AR platform capable of concurrently presenting AR content of multiple AR applications or AR layers via a common AR viewer, (2) a layer controller feature that enables a user to control or otherwise define which AR content from among these AR applications or AR layers are presented within an AR view, (3) an event capture feature that utilizes a relative priority among AR content to intelligently predict the AR application or AR layer that the user intends to interact with, (4) a collision signaling feature that messages with AR applications or AR layers to provide third-party developers with the ability to resolve spatial conflicts within the AR applications or AR layers, (5) a conflict mitigation feature that resolves spatial conflicts between or among AR content on behalf of AR applications or AR layers, (6) a graceful degradation feature that implements a presentation policy across the AR applications or AR layers based on client-specific operating conditions, and (7) a set of features using the AR platform to interact with and control network-connected physical devices (e.g., Internet of Things devices) using, for example, AR objects (e.g., shareable AR objects).

Each of these AR-specific features is described in further detail below, with each feature being emphasized in a corresponding section of the disclosure.

An AR platform may include any suitable computer-implemented method and/or system configured to allow users to view and interact with augmented reality content, and to allow users (e.g., including third parties) to author and publish AR content to the platform. An AR platform may further support filtering of AR content through an AR content management system and/or support social features (e.g., for users to share, comment, and entertain each other). An AR platform program may include any suitable software system configured to implement aspects of an AR platform.

The AR platform described herein may include a server-side component and/or a client-side component. The server-side component of the AR platform includes a server system of one or more server computing devices that implement one or more server-side AR programs. The client-side component of the AR platform may include a client computing device that implements a client-side AR program. This client-side AR program may take the form of an application program or a component of an operating system of the client device. These server-side and client-side AR programs of the AR platform may be configured for coordinated operation with each other by way of network communications between the client and the server system, typically over a wide area network such as the Internet.

The AR platform may support the use of child application programs at client devices. As an example, a child AR application program developed by a third-party developer may be implemented at the client device by the client-side program of the AR platform by instantiating the child AR application. Here, the child-side program of the AR platform may download an instance of a child AR application program from a server, and then run that child AR application program within the child-side program of the AR platform. As a non-limiting example, the client-side program of the AR platform may execute dynamic link library (DLL) components of the child AR application program downloaded from the server. The client-side program of the AR platform may serve as a parent or master program for running multiple child application programs.

Within this framework, the AR platform supports an AR application layer that includes an instantiated child application program at the client device, child application data received from a server over a network, and one or more shareable objects that may be created, modified, and shared between or among users. These shareable objects may be associated with one or more IoT devices.

Examples, Components, and Alternatives

The following sections describe selected aspects of exemplary AR platforms, as well as related systems and/or methods. The examples in these sections are intended for illustration and should not be interpreted as limiting the entire scope of the present disclosure. Each section may include one or more distinct embodiments or examples, and/or contextual or related information, function, and/or structure.

Illustrative AR Platform and Messaging Methods

As shown in FIGS. 1-4, this section describes an illustrative AR system and platform, as well as related messaging methods. FIG. 1 is a schematic diagram depicting an example augmented reality (AR) system 100. AR system 100 includes an AR platform 110 that facilitates interaction between or among a set of one or more AR applications 120 and a set of one or more users 130. In this example, AR applications 120 include multiple independent AR applications 122, 124, 126, etc. Users 130, including example users 132, 134, etc., may interact with AR system 100 via one or more user interfaces 140. A variety of human-perceivable stimuli provided by the AR system may be presented to users 130 via user interfaces 140 in the form of visual, aural, and/or tactile/haptic outputs. A variety of user inputs directed at the AR system may be received from users 130 via user interfaces 140.

AR platform 110 may include or take the form of a set of one or more AR platform programs (i.e., a program set or program suite) implemented by a computing system that includes one or more computing devices. An AR platform program may be referred to as a parent AR program in relation to AR applications that depend on the AR platform program for operation. AR platform 110 may be distributed across server-side and client-side computing devices as one or more server-based AR platform programs (e.g., as an AR service) and as a client-based AR platform program (e.g., as an AR browser program or AR viewer program), in an example implementation. Each client computing device or client computing system operable by one or more human users may implement a respective instance of the client-based AR platform program as a component of the AR platform.

An AR application that depends on the AR platform for operation may take the form of a set of one or more AR application programs implemented by a computing system that includes one or more computing devices. An instance of an AR application may be distributed across server-side and client-side computing devices via server-based and client-based AR application programs, in an example implementation. The same or different computing devices that implement an AR platform program may implement an AR application program. Within the context of the AR platform disclosed herein, AR applications may be referred to as child AR applications, and their respective programs may be referred to as child AR programs. Each client computing device or client computing system operable by one or more human users may implement a respective instance of a client-based AR child program as a component of an AR application.

Input and output devices of user interfaces 140 may form part of a client system or may be peripheral devices to the client system. A client system may include an individual client device or a collection of multiple networked client devices operable by one or more human users. In some examples, a client system or an individual client device thereof may be operable by two or more users in a shared use-scenario. In other examples, each user may operate a respective client system or a respective client device. Users 130 (and their respective client systems or devices) may be geographically distributed or co-located depending on the implementation or use-scenario.

Figure 2:
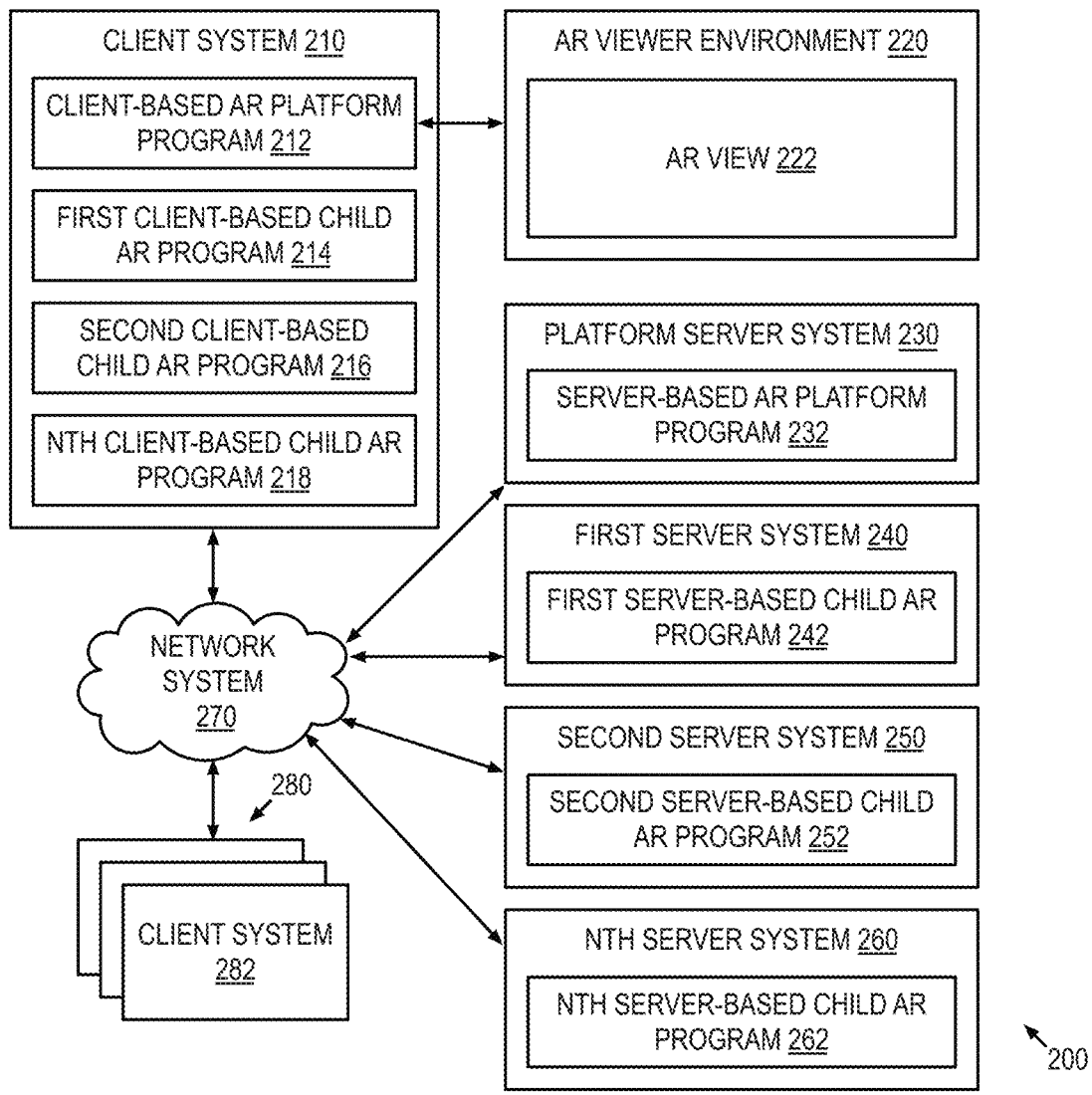
FIG. 2 is a schematic diagram depicting an illustrative computing system implementing an AR system.

FIG. 2 is a schematic diagram depicting an example computing system 200 implementing an AR system, such as example AR system 100 of FIG. 1. Computing system 200 includes a client system 210 implementing a client-based AR platform program 212. Client-based AR platform program 212 is an example of a client-side program component of previously described AR platform 110. A client-based AR platform program, such as program 212, may take the form of an application program or a portion thereof, or may take the form a component of an operating system of the client system, depending on implementation.

Computing system 200 further includes a platform server system 230 implementing a server-based AR platform program 232. Server-based AR platform program 232 is an example of a server-side program component of previously described AR platform 110. A server-based AR platform program, such as program 232, may take the form of an application program or a portion thereof, or may take the form of a component of an operating system of the server system, depending on implementation. Client-based AR platform program 212 and server-based AR platform program 232 may be configured for coordinated operation and collectively provide an instance of an AR platform, such as example AR platform 110 of FIG. 1.

In at least some implementations, the AR platform formed by client-based AR platform program 212 and/or server-based AR platform program 232 includes an AR viewer program component that provides a user with an AR view 222 of an AR viewer environment 220. As an example, client-based AR platform program 212 includes a rendering engine (e.g., a 3D rendering engine) that renders graphical content for presentation via a graphical display device. Alternatively, this rendering engine may reside at server-based AR platform program 232 in which display information is communicated over a communications network to the client system for presentation. AR viewer environment may be referred to as a common or shared AR viewer environment within the context of the AR platform presenting AR content components obtained from a plurality of AR applications or AR layers. AR view 222 may include graphical AR content components that are presented via a graphical display device of client system 210 or a graphical display device operatively coupled with client system 210 as a peripheral device. Graphical AR content components that are present within or form part of the AR viewer environment 220 may be presented via the graphical display device overlaid upon a direct view or integrated with a camera view of a real-world environment to provide a user with AR view 222. AR view 222 represents a particular view of AR viewer environment 220 from a particular perspective. AR view 222 may be changed or otherwise updated by the AR platform to reflect a different view of AR viewer environment 220 as the perspective of the user changes, as determined from position/orientation sensors of the client system and/or by image recognition via one or more cameras of the client system.

One or more of AR platform programs 212 and 232 may interact with child AR applications. A child AR application, such as one of previously described AR applications 120, may include client-side and/or server-side program components. As an example, a first AR application may include a first client-based child AR program 214 that is implemented by client system 210 and/or a first server-based child AR program 242 that is implemented by a first server system 240. In distributed contexts, client-based program 214 and server-based program 242 may be configured for coordinated operation and collectively provide an instance of a child AR application, such as previously described with reference to AR applications 120 of FIG. 1.

Each child AR application includes application data that may take the form of computer executable instructions and/or AR objects. Each AR object may include one or more AR content components (i.e., AR assets) and associated metadata. An AR content component may take the form of a graphical AR content component within the context of visual AR. AR content components additionally or alternatively may include other forms of AR content including audible, haptic/tactile, etc. Graphical AR content components may include a three-dimensional (3D) or two-dimensional (2D) graphical content component having associated textures, lighting/shading, etc. Graphical AR content components may be dynamic or static.

An AR object may include a collection of AR content components that are arranged in a hierarchy or ordered priority of different abstraction and/or degradation modes as will be described herein with reference to FIGS. 5 and 7. Metadata of an AR object may include computer executable instructions (e.g., scripts) that travel with the AR object and/or a presentation policy to be used by the AR platform with respect to the AR object and its AR content components. Metadata may include other suitable information that may be used by the AR platform, including positioning information that aids the AR platform in the presentation of graphical AR content at an apparent geospatial positioning within the real-world environment.

Within the context of visual AR, graphical AR content components may be tethered or otherwise mapped to specified points or locations within a model (e.g., of viewer environment 220) that is then aligned with a real-world environment based on sensor data obtained from sensor devices located on-board or in the vicinity of the client device or client system. This sensor data may be used by the AR platform to determine the position and/or orientation of the client device or client system within the real-world environment in up to six degrees-of-freedom (6DOF). Graphical AR content components presented via a graphical display device using proper alignment between the model and the real-world environment have the appearance of being physically present within the real-world environment at the apparent geospatial position or positioning. This aspect of visual AR may be distinguishable from heads-up-display (HUD) technologies that present graphical content upon a see-through graphical display device without respect to the geospatial positioning of the graphical content that is presented.

Within computing system 200, a second child AR application may include client-side and/or server-side components in the form of a second client-based child AR program 216 implemented by client system 210, and a second server-based child AR program 252 implemented by a second server system 250. Client system 210 may implement additional AR application components, including an Nth client-based child AR program 218. In this example, program 218 is a stand-alone client-side implementation of a corresponding AR application. Computing system 200 further includes Nth server system 260 implementing an Nth server-based child AR program 262. In this example, program 262 is a stand-alone server-side implementation of a corresponding AR application. Hence, client-based program 218 and server-based program 262 provide examples of AR application components for respective AR applications that are not distributed across client-server systems.

Computing system 200 may include one or more additional client systems 280, including example client system 282. Each of client systems 280 may include a respective instance of a client-based AR platform program, such as previously described with reference to program 212 of client system 210. Each of client systems 280 may further include respective instances of client-based child AR programs. In at least some implementations, server-based programs may service multiple instances of a client-based program residing at multiple independent client systems such that a particular instance of a server-based program may be configured for coordinated operation with the multiple instances of the client-based program.

The various client systems and server systems of computing system 200 may communicate with each other via a network system 270. Network system 270 may include one or more communications networks, such as one or more wide area networks (e.g., the Internet or a portion thereof, wireless edge network components, etc.), one or more local area networks, and one or more personal area networks, depending on implementation. Each client system of computing system 200 may include one or more client computing devices and associated hardware (e.g., graphical display devices, sensor devices, peripheral devices, etc.). Each server system of computing system 200 may include one or more server computing devices and associated hardware. In some examples, server systems 230, 240, 250, and 260 may be integrated into a common server system or a common server computing device. Some or all of the server computing devices of a server system may be geographically distributed or co-located.

Figure 3:
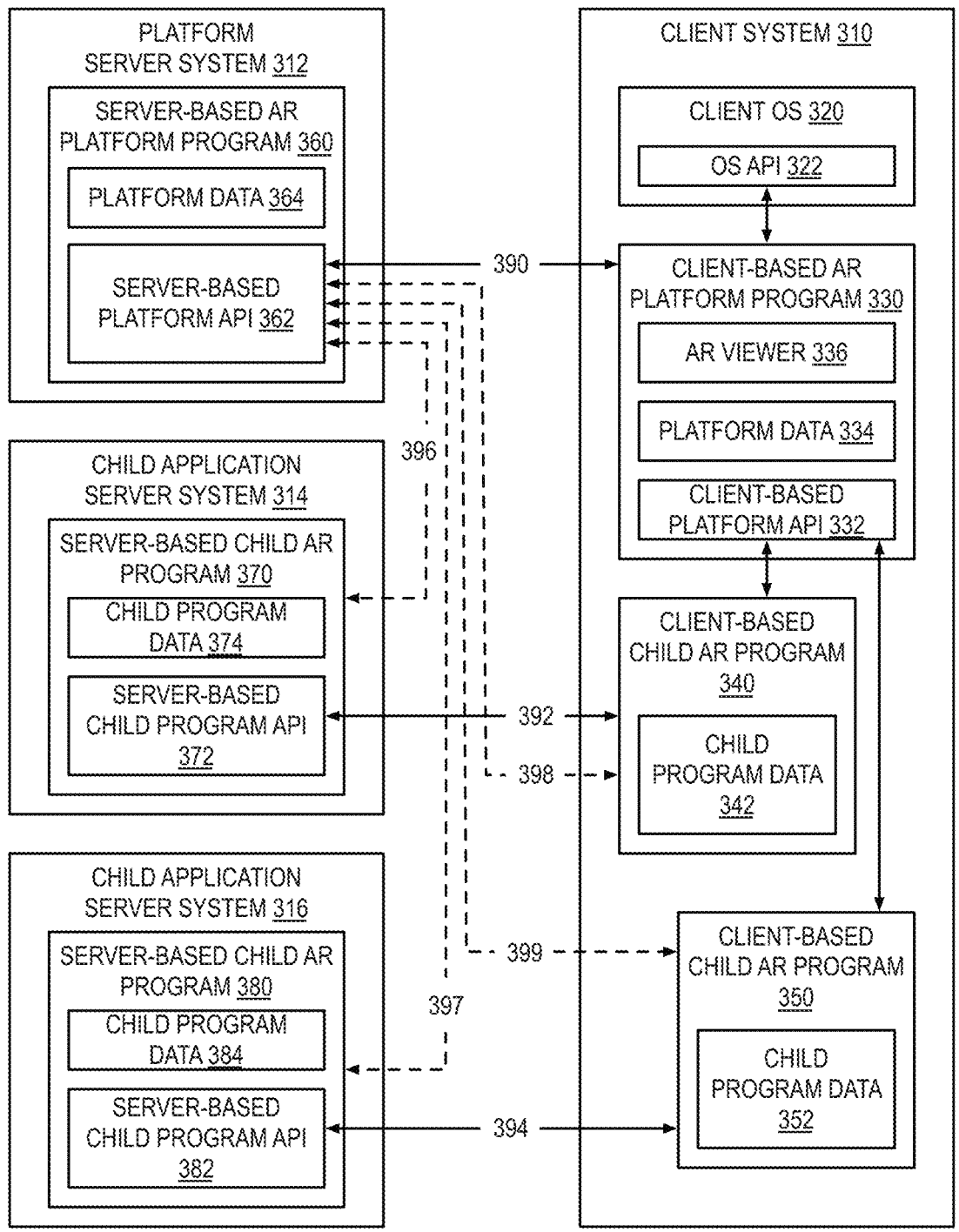
FIG. 3 is a schematic diagram depicting additional aspects of an illustrative AR system in the context of an illustrative computing system implementation.

FIG. 3 is a schematic diagram depicting additional aspects of an example AR system 300 within the context of an example computing system implementation. AR system 300 is a non-limiting example of previously described AR system 100 of FIG. 1, and represents an example implementation of computing system 200 of FIG. 2. Within FIG. 3, AR system 300 includes a client system 310 that includes and is implementing a client operating system (OS) 320, a client-based AR platform program 330, and multiple client-based AR child programs 340 and 350. Typically, client-based AR child programs or their AR layers are downloaded to client systems over a communications network from a network accessible library or marketplace.

Client OS 320 includes an OS application programming interface (API) 322 by which application programs interface with client OS 320 using supported API calls of API 322. For example, client-based AR platform program 330 may take the form of a client-based application program that interfaces with client OS 320 via OS API 322. Client-based AR platform program 330 is a non-limiting example of previously described client-based AR platform program 212 of FIG. 2.

Client-based AR platform program 330 may include a client-based platform API 332 by which client-based child AR programs 340, 350, etc. interface with client-based AR platform program 330 using supported API calls of API 332. Client-based AR platform program 330 may include or otherwise access platform data 334 stored locally at client system 310. Client-based AR platform program 330 includes an AR viewer 336 by which an AR view may be presented, such as previously described AR view 222 of FIG. 2.

Client-based AR platform program 330 may be configured for coordinated operation with a server-based AR platform program 360 hosted at an AR platform server system 312. Server-based AR platform program 360 is a non-limiting example of previously described server-based AR platform program 232 of FIG. 2. Server-based AR platform program 360 may include a server-based platform API 362 by which client-based AR platform program 330 interfaces with server-based AR platform program 360 using supported API calls of API 362.

Server-based AR platform program 360 may include or otherwise access platform data 364 stored locally at platform server system 312. Client-based AR platform program 330 may also access platform data 364 of platform server system 312 as well as the various services provided by server-based AR platform program 360 via server-based platform API 364 using supported API calls. Server-based AR platform program 360 may access platform data 334 of client system 310 as well as the various services provided by client-based AR platform program 330 via server-based platform API 362. Communications between client-based AR platform program 330 and server-based AR platform program 360 are performed over a communications network as indicated by data flow path 390.

Each client-based child AR program may include or otherwise access its respective child program data stored locally at client system 310. For example, client-based child AR programs 340 and 350 may include or otherwise access child program data 342 and 352, respectively. Client-based child AR programs 340 and 350 are non-limiting examples of previously described client-based child AR programs 214 and 216 of FIG. 2. Each client-based child AR program may also access platform data 334 and the various services provided by client-based AR platform program 330 via client-based platform API 332 using supported API calls of API 332. Client-based AR platform program 330 may access child program data and/or services of client-based child AR programs 340 and 350 via client-based platform API 332. In at least some implementations, communications between client-based AR platform program 330 and client-based child AR programs may additionally or alternatively be provided via OS API 322 using supported API calls of API 322.

Each client-based child AR program may be configured for coordinated operations with a respective server-based child AR program hosted at a server system. In this example, server-based child AR program 370 is hosted at a child application server system 314, and server-based child AR program 380 is hosted at a child application server system 316. In other examples, server-based child AR programs may be hosted at platform server system 312 or may be omitted for some or all of the client-based child AR programs.

Server-based AR child programs 370 and 380 are non-limiting examples of previously described server-based AR child programs 242 and 252 of FIG. 2. Each server-based AR child program may include a respective server-based child program API (e.g., 372 and 382). Each client-based AR child program interfaces with its respective server-based AR child program via a corresponding server-based child program API. Each server-based AR child program may include or otherwise access child program data (e.g., 374 and 384) stored locally at its respective server system.

Each client-based AR child program may access child program data of its respective child application server system as well as the various services provided by its respective server-based AR child program via a respective server-based child program API using supported API calls. Each server-based AR child program may access corresponding child program data of client system 310 as well as the various services provided by its respective client-based AR child program via its server-based child program API. Communications between client and server-based AR child programs 340 and 370 of a first AR application, and communications between client and server-based AR child programs 350 and 380 of a second AR application are each provided over a communications network as indicated by data flow paths 392 and 394, respectively.

Additional or alternative data flow paths are depicted in FIG. 3 that may correspond to other examples of how data and/or services may be accessed by program components. Data flow paths 396 and 397 depict an example in which respective server-based child AR programs 370 and 380 may communicate with server-based AR platform program 360 using API calls supported by API 362. Data flow paths 398 and 399 depict an example in which respective client-based child AR programs 340 and 350 may communicate with server-based AR platform program 360 using API calls supported by API 362.

The AR platform disclosed herein may host and maintain user accounts that contain user-specific information for each user. In an example, these user accounts may be stored at a server-based component of the AR platform, and may be included in platform data 364, for example. Alternatively or additionally, each AR client may host and maintain some or all of this user-specific information locally at the client system, and may be included in platform data 334, for example. A user operating an AR client (e.g., client system 310) may be authenticated by the AR platform (e.g., platform server system 312 and/or client-based AR platform program 330 of client system 310), for example, based on user login credentials provided by the user or other suitable authentication information. Once authenticated by the AR platform, a user may define or update aspects of this user-specific information. As an example, the AR platform may present a user interface to the user of an AR client or other suitable computing device that enables the user to define or update the user-specific information. The AR platform may tailor a user experience provided to users of AR clients based on and responsive to their respective user-specific information.

In at least some implementations, a user may create or otherwise define content of a curated AR layer. As an example, a user may upload AR content components to the AR platform to be associated with a curated AR layer. As another example, a user may additionally or alternatively select AR content components from other AR layers (e.g., other native AR layers or other curated AR layers) to be associated with an AR curated layer. AR curated layers created or otherwise defined by a user may be stored in or otherwise associated with the user account of that user. A user may share AR layers, including curated AR layers and native AR layers with other users. As an example, a user may share a hyperlink or other suitable traversable reference with other users via a communications network. These other users may select the hyperlink or traversable reference via their respective AR clients to access and be presented with the AR layer. As will be described in further detail below, AR layers that have been accessed by a user may be presented in a layer controller interface at the AR client.

Figure 4:
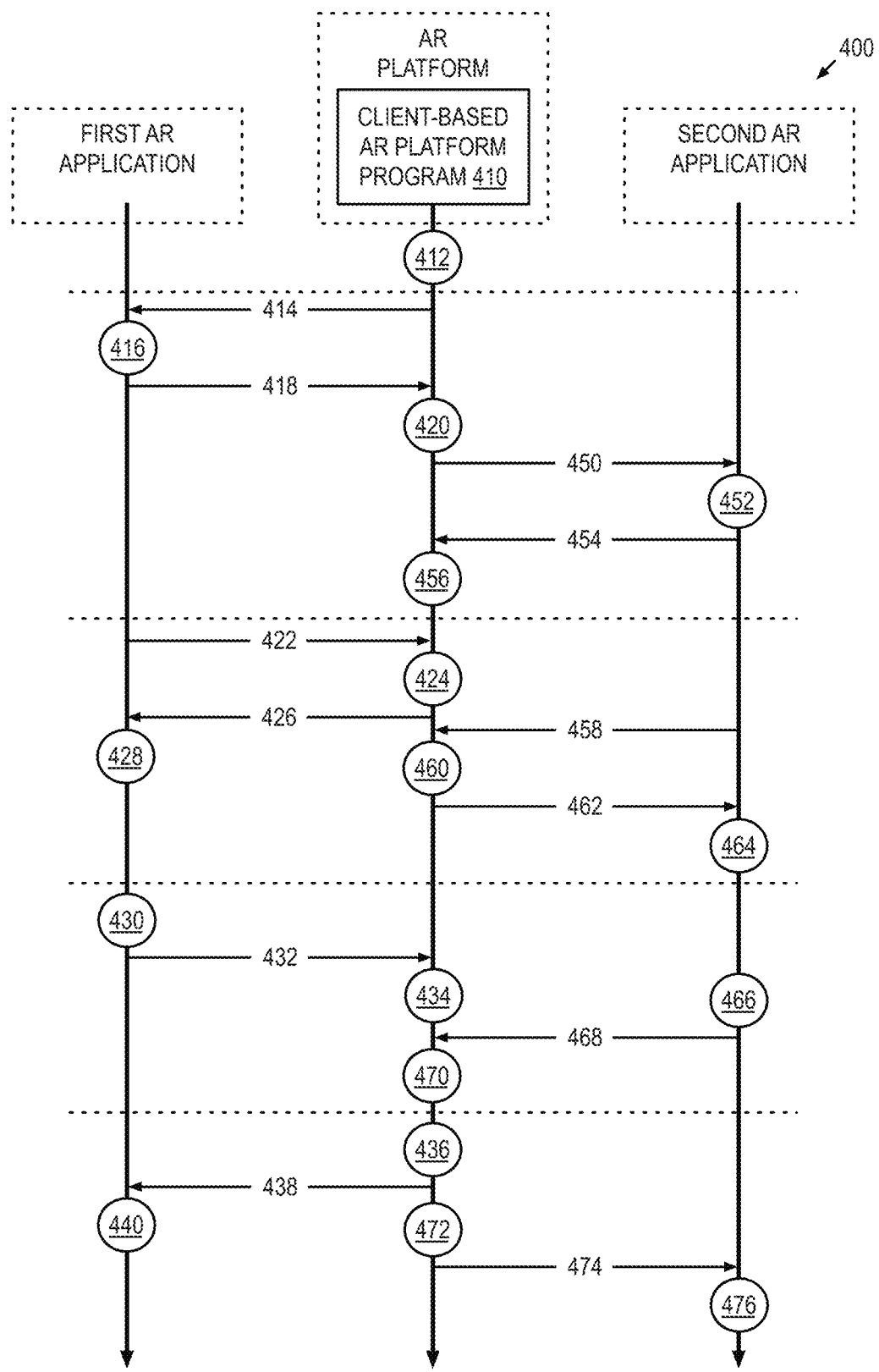
FIG. 4 is a flow diagram depicting an illustrative method of messaging between an AR platform and multiple AR applications or AR layers.

FIG. 4 is a flow diagram depicting an example method 400 of messaging between an AR platform and multiple AR applications or AR layers. The AR platform of method 400 is a non-limiting example of AR platform 110 of FIG. 1. The AR applications of method 400 are non-limiting examples of AR applications 120 of FIG. 1. While AR applications are described and depicted with reference to FIG. 4, these AR applications may instead refer to AR layers and their associated scripts. The various communication modes of FIG. 4 may be used within the context of the various features described herein to communicate information such as display information, interaction events, responses to interaction events, priority, conflicts, collisions, and menu data between the AR platform and the AR objects, AR layers, and source AR applications.

As previously described, the AR platform may include or take the form of a computing system that implements a platform program set or suite of one or more AR platform programs. For example, this program set may include an instance of a client-based AR platform program implemented by each client system of the AR ecosystem, and one or more server-based programs implemented by a server system of the AR ecosystem. An example client-based AR platform program 410 implemented by an individual client system is depicted in FIG. 4. Client-based program 410 may take the form of an AR browser program or an AR viewer program that includes an AR viewer, for example.

A client system implementing an instance of a client-based AR platform program may be referred to collectively as an AR client. A server system implementing the one or more server-based programs of the AR platform may be referred to collectively as an AR service. The AR service may interface with and support operation of many AR clients of the AR ecosystem.

At 412, a client state is determined for the AR client. A client state refers to a state of the AR client within the AR ecosystem at a particular time. The client state of an AR client may be based on a variety of state-determining factors (see below) that are specific to that AR client. Accordingly, each AR client may have its own respective client state at a particular time. A client state of each AR client may change over time in response to changes within the state-determining factors that are specific to that AR client. The AR platform may continuously determine client state for each AR client on a periodic basis and/or in response to changes in state-determining factors.

State-determining factors for determining client state may include one or more of: (1) a hardware state component that includes sensor measurements obtained from one or more sensors of the client system (e.g., position and orientation of the AR view), hardware type, and/or hardware capability of the client system, (2) a user state component that includes an identity of each user of the AR client, user-specific settings associated with each user, and/or user-specific profile information associated with each user, (3) an AR platform state component that includes a program state of the AR platform with respect to the AR client, (4) an AR application state component that includes a program state of each AR application interfacing with the AR platform with respect to the AR client.

In a first exchange between the AR platform and the first AR application, at 414, the AR platform initiates one or more requests to the first AR application for the AR client. The one or more requests initiated at 414 may be performed responsive to the client state determined at 412. At 416, the first AR application receives and processes the one or more requests initiated by the AR platform for the AR client. A request may indicate a particular action or set of actions that are to be performed by a target program, such as a request that a particular set of information be returned or that a particular command be implemented by the target program.

At 418, the first AR application initiates one or more responses to the AR platform for the AR client that are responsive to the one or more requests previously received at 414. At 420, the AR platform receives and processes the one or more responses initiated by the first AR application for the AR client. A response may indicate whether the particular action or set of actions indicated by the one or more requests was performed and/or the results of such action or set of actions. This first exchange is an example of a request-based communication mode for communications that are initiated by the AR platform with the first AR application.

In a second exchange between the AR platform and the first AR application, at 422, the first AR application initiates one or more requests to the AR platform for the AR client. At 424, the AR platform receives and processes the one or more requests initiated by the first AR application for the AR client. At 426, the AR platform initiates one or more responses to the first AR application for the AR client that are responsive to the one or more requests previously received at 424. At 428, the first AR application receives and processes the one or more responses initiated by the AR platform for the AR client. This second exchange is an example of a request-based communication mode for communications that are initiated by the first AR application with AR platform.

The above exchanges between the AR platform and the first AR application are examples of a request-based communication mode in which responses are provided by a program component in response to requests initiated by another program component. This request-based communication mode may be supported by an API of the AR platform or the first AR application, for example.

In another example, a push-based (i.e., a subscription-based) communication mode may be alternatively or additionally used in which exchanges between the AR platform and the first AR application do not necessarily involve initiating requests. With a push-based communication mode, responses may be provided by a program to another program in response to satisfaction of a pre-defined set of conditions. This pre-defined set of conditions may be established at a particular program by another program at an earlier time or in a prior session to define how, when, or if communications are to be initiated. A push-based communication mode may be supported by an API of the AR platform or the first AR application, for example.

For example, in a third exchange between the AR platform and the first AR application under a push-based communication mode, at 430, the first AR application determines that one or more responses are to be initiated to the AR platform. At 432, the first AR application initiates the one or more responses to the AR platform for the AR client that are responsive to the determination at 430. At 434, the AR platform receives and processes the one or more responses initiated by the first AR application for the AR client. This third exchange represents an example of a push-based communication mode in which the AR platform subscribes to the first AR application for communications that are initiated by the first AR application with AR platform.

In a fourth exchange between the AR platform and the first AR application under a push-based communication mode, at 436, the AR platform determines that one or more responses are to be initiated to the first AR application. At 438, the AR platform initiates the one or more responses to the first AR application for the AR client that are responsive to the determination at 436. At 440, the first AR application receives and processes the one or more responses initiated by the AR platform for the AR client. This fourth exchange represents an example of a push-based communication mode in which the first AR application subscribes to the AR platform for communications that are initiated by the AR platform with the first AR application.

Similarly, with respect to a second AR application (or an additional AR application), in a first exchange between the AR platform and the second AR application under a request-based communication mode, at 450, the AR platform initiates one or more requests to the second AR application for the AR client. At 452, the second AR application receives and processes the one or more requests initiated by the AR platform for the AR client. At 454, the second AR application initiates one or more responses to the AR platform for the AR client that are responsive to the one or more requests previously received at 452. At 456, the AR platform receives and processes the one or more responses initiated by the second AR application for the AR client. This first exchange is an example of a request-based communication mode for communications that are initiated by the AR platform with the second AR application.

In a second exchange between the AR platform and the second AR application under a request-based communication mode, at 458, the second AR application initiates one or more requests to the AR platform for the AR client. At 460, the AR platform receives and processes the one or more requests initiated by the second AR application for the AR client. At 462, the AR platform initiates one or more responses to the second AR application for the AR client that are responsive to the one or more requests previously received at 460. At 464, the second AR application receives and processes the one or more responses initiated by the AR platform for the AR client. This second exchange is an example of a request-based communication mode for communications that are initiated by the second AR application with the AR platform.

In a third exchange between the AR platform and the second AR application under a push-based communication mode, at 466, the second AR application determines that one or more responses are to be initiated to the AR platform. At 468, the second AR application initiates the one or more responses to the AR platform for the AR client that are responsive to the determination at 466. At 470, the AR platform receives and processes the one or more responses initiated by the second AR application for the AR client. This third exchange represents an example of a push-based communication mode in which the AR platform subscribes to the second AR application for communications that are initiated by the second AR application with AR platform.

In a fourth exchange between the AR platform and the second AR application under a push-based communication mode, at 472, the AR platform determines that one or more responses are to be initiated to the second AR application. At 474, the AR platform initiates the one or more responses to the second AR application for the AR client that are responsive to the determination at 472. At 476, the second AR application receives and processes the one or more responses initiated by the AR platform for the AR client. This fourth exchange represents an example of a push-based communication mode in which the second AR application subscribes to the AR platform for communications that are initiated by the AR platform with the second AR application.

Use of the example communication modes described with respect to method 400 of FIG. 4 may be defined on a per application basis, on a per direction of communication basis, and/or on a per AR client basis. For example, communications initiated by the first AR application to the AR platform, for some or all AR clients, may use a request-based communication mode, whereas communications initiated by the AR platform to the first AR application may use a push-based communication mode; or vice-versa. As another example, the second AR application may use a push-based communication mode (or alternatively a request-based communication mode), for some or all AR clients, for communications initiated by the second AR application to the AR platform and for communications initiated by the AR platform to the second AR application. As yet another example, all AR applications of the AR ecosystem may use a request-based communication mode (or alternatively a push-based communication mode) to initiate communications to the AR platform, and the AR platform may use a request-based communication mode (or alternatively a push-based communication mode) to initiate communications to all AR applications of the AR ecosystem. In at least some implementations, an AR application may define whether a push-based or a request-based communication mode is to be used for communications initiated by the AR platform to that AR application. In at least some implementations, the AR platform may define whether a push-based or a request-based communication mode is to be used for communications initiated by an AR application to the AR platform. The particular API of the AR platform or the AR applications may be used to define which communication mode is to be used for communications between the AR platform and the AR applications.

AR Layers, Objects, Presentation Methods, Layer Controller

As shown in FIGS. 5-10B, this section describes illustrative aspects of AR platform 110, including AR layers, objects, presentation methods, and a layer controller.

In general, a layer may include any suitable collection of AR objects and their associated behaviors. Layers are mid-level organizational structures grouping individual AR objects within the AR Platform. The term "AR layer" may refer to AR application layers and AR curated layers (described below). An AR layer controller may include any suitable user interface (UI) configured to manage how AR layers are streamed (by the platform servers) to a user device and/or executed on the user device. AR layer parameters may be configured and customized through an AR layer controller UI.

Figure 5:
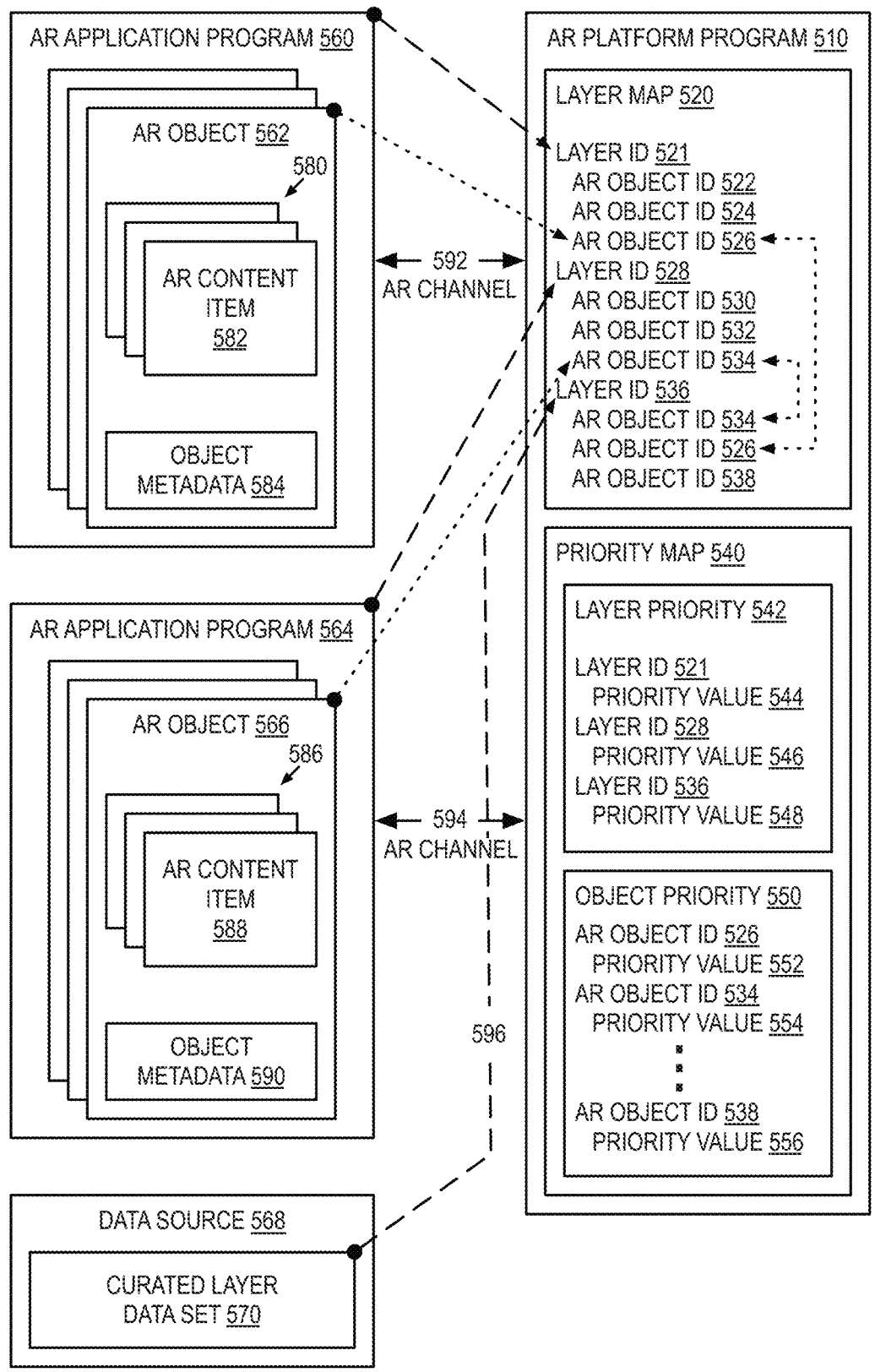
FIG. 5 is a schematic diagram depicting an example of AR layers and priority among such AR layers being maintained by an AR platform within the context of a multi-application interaction.

FIG. 5 is a schematic diagram depicting an example of AR layers and priority among such AR layers being maintained by an AR platform within the context of a multi-application interaction. Within FIG. 5, an AR platform, as an AR platform program 510 implemented by a computing system, maintains a layer map 520 and a priority map 540. Layer map 520 and priority map 540 are non-limiting examples of the platform data of FIG. 3. Accordingly, layer map 520 and/or priority map 540 may reside at a client-based platform program in an example implementation, and may reflect a particular client state of an AR client.

A layer map, such as example layer map 520, may be used by the AR platform to identify and distinguish multiple AR layers and their respective AR objects from each other. Layer map 520 includes a set of one or more layer identifiers. Each layer identifier corresponds to a respective AR layer. Example layer identifiers 521, 528, 536 are depicted in FIG. 5. Each layer identifier is associated with a set of one or more AR object identifiers within layer map 520. Example AR object identifiers 522, 524, 526 are associated with layer identifier 521, and example AR object identifiers 530, 532, 534 are associated with layer identifier 528 in FIG. 5.

An AR layer may take the form of a native AR layer or a curated AR layer. A native AR layer refers to an AR layer having a set of one or more associated AR objects that originate from an individual source, such as from a particular AR application. Within this context, the AR application may include many instances of a client-based AR child program that are implemented by many client devices. AR application program 560 of an AR application corresponds to layer identifier 521 as indicated by a line connecting AR application program 560 to layer identifier 521 in FIG. 5. Also in this example, AR application program 564 of a different AR application corresponds to layer identifier 528 as indicated by a line connecting AR application program 564 to layer identifier 528 in FIG. 5.

In this example, AR application program 560 includes a set of AR objects, including example AR object 562. AR objects of AR application programs in FIG. 5 are non-limiting examples of child program data in FIG. 3. Within FIG. 5, AR object 562 corresponds to AR object identifier 526 as indicated by a line connecting AR object 562 to AR object identifier 526 within FIG. 5. Similarly, other AR objects of AR application program 560 correspond to AR object identifiers 522 and 524. Also in this example, AR application program 564 includes a set of AR objects, including example AR object 566. AR object 566 corresponds to AR object identifier 534 as indicated by a line connecting AR object 566 to AR object identifier 534 within FIG. 5. Other AR objects of AR application program 564 correspond to AR object identifiers 530 and 532.

In contrast to a native AR layer, a curated AR layer refers to an AR layer having AR objects that originate from two or more independent sources. As an example, AR layer identifier 536 corresponds to a curated AR layer that includes AR objects 526 and 534 of AR application programs 560 and 564, respectively. Accordingly, a curated AR layer is an AR layer that includes a mix of AR objects from two or more independent sources. A curated AR layer may contain one or more other AR layers, including another curated AR layer.

AR objects may originate from other sources aside from AR application programs. As an example, a data source 568 depicted schematically in FIG. 5 may refer to a component of the AR platform (e.g., AR platform program 510 or a database system accessible to the AR platform program) or a third-party data source (e.g., a network resource accessible over a communications network or data storage of a client device). Data source 568 may refer to an example of the platform data of FIG. 3. Curated AR layer data set 570 may include a layer map or a portion thereof for a curated AR layer and/or may include some or all of the AR objects of that curated AR layer. For example, an AR object corresponding to AR object identifier 538 which did not originate from either of AR application programs 560 may instead originate from curated AR layer data set 570 of data source 568.

A priority map, such as example priority map 540, may be used by the AR platform to identify and distinguish multiple AR layers and their respective AR objects from each other with respect to priority. As will be described in further detail with regards to layer control and conflict mitigation, priority may be used by the platform program to determine whether a particular AR object is to be presented and how that AR object is presented within the context of a multi-application AR experience.

Priority map 540 includes a layer priority 542 component and an object priority 550 component. Accordingly, AR platform program 510 maintains priority between or among AR layers, and additionally maintains priority between or among AR objects. The AR platform may periodically or continuously update the priority values associated with AR layers and AR objects responsive to changes in client state of the AR client, for example.

Layer priority 542 includes a priority value associated with each layer identifier of layer map 520. As an example, layer identifier 521 corresponding to a native AR layer of AR application program 560 is associated with priority value 544, layer identifier 528 corresponding to a native AR layer of AR application program 564 is associated with priority value 546, and layer identifier 536 corresponding to a curated AR layer is associated with priority value 548.

Object priority 550 includes a priority value associated with each AR object identifier of layer map 520. As an example, AR object identifier 526 corresponding to AR object 562 is associated with priority value 552, AR object identifier 534 corresponding to AR object 566 is associated with priority value 554, and AR object identifier 538 corresponding to another AR object of a curated AR layer is associated with priority value 556.

FIG. 5 depicts additional aspects of example AR objects. For example, AR object 562 includes a set of one or more content items 580, which includes example AR content item 582 and may include additional AR and/or non-AR content items. A content item may include graphical content or other multimedia content that is capable of presentation to a user via a client system. A content item may take the form of one or more files. Non-limiting examples of graphical content items include: (1) 3D models having file formats such as .3ds, .obj, .mtl, .lwo, .ive, .osg, .fbx, etc., (2) 2D images having file formats such as .jpg, .png, .tga, .gif, .bmp, etc., (3) 2D videos having file formats such as .mp4, .mov, .wmv, .flv, .avi, etc., (4) text having file formats such as .ttf, etc., to name several examples. Non-limiting examples of non-graphical content items include audio having file formats such as .wav, .mp3, .mp4, .wma, etc., as well as audio components of video files.

An AR object may include metadata, such as example object metadata 584 of AR object 562. Metadata of an AR object may refer to all other data that accompanies the AR object aside from the AR content items of the AR object. AR object 566 of AR application program 564 also includes a set of one or more AR content items 586, which includes example AR content item 588 and may include additional AR content items. AR object 566 also includes object metadata 590 in this example.

FIG. 5 also depicts data flow paths 592 and 594 between AR platform program 510 and AR application programs 560 and 564, respectively. Data flow paths 592 and 594 may be referred to as AR channels, and may traverse one or more communications networks and/or APIs as previously described with reference to FIGS. 2-4. AR objects may be communicated over these AR channels between the AR platform program and an AR application program. Communications between data source 568 and AR platform program 510 may also be provided over a data flow path 596 that takes the form of an AR channel, such as where the data source is a remote independent data source residing at a third-party server system. Again, AR objects may be communicated over this AR channel between the data source and the AR platform program, and such communications may traverse one or more communications networks and/or APIs.

Figure 6:
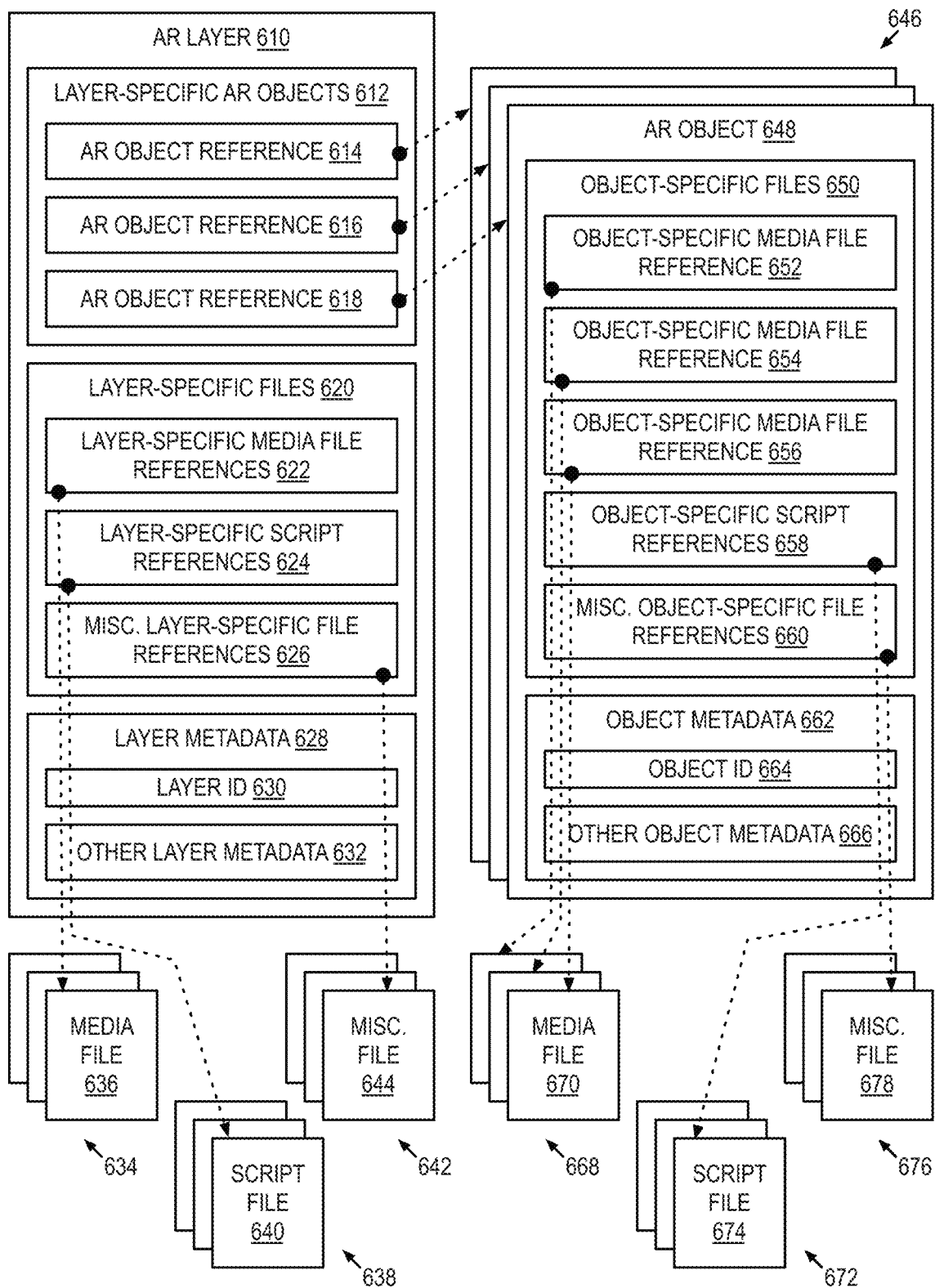
FIG. 6 is a schematic diagram depicting aspects of an AR layer, an AR object, and the various components thereof in further detail.

FIG. 6 is a schematic diagram depicting aspects of an AR layer, an AR object, and the various components thereof in further detail. In this example, AR layer 610 contains three types of data: (1) layer-specific AR objects 612, (2) layer-specific files 620, and (3) layer metadata 628. AR layer 610 is a non-limiting example of the previously described AR layers of FIG. 5. Accordingly, AR layer 610 may refer to a native AR layer or a curated AR layer.

Layer-specific AR objects 612 include references to respective AR objects 646, which may reside on one or more servers of a server system. For example, AR object reference 618 refers to AR object 648. Layer-specific files 620 may include one or more references to: (1) respective media files 634 (i.e., AR content items or media content items, generally), (2) script files 638, and (3) miscellaneous files 642, which may reside on one or more servers of the server system. For example, a layer-specific media file reference of previously described references 622 refers to media file 636, a layer-specific script reference of references 624 refers to script file 640, and a miscellaneous layer-specific file reference of references 626 refers to miscellaneous file 644.

As previously described, media files 634 may include files formatted for the delivery of media, including 3D models, animations, video, images, audio, and haptic media. File formats may include .jpg, .gif, .mp4, .mpeg, .mp3, .avi, .obj, etc., as non-limiting examples. Script files 638 may include various script and/or event files for use in AR layers and AR objects, enabling users to interact with such layers or objects. Miscellaneous files 642 may include information and/or datasets specific to an AR layer or an AR object, that are explicitly not scripts or media. Non-limiting examples include binary files, save states, temporary positions, high scores, etc.

Layer metadata 628 may include information required by the platform, apart from the render/display engine, that enables platform functionality for that layer. Examples of platform functionality include the ability to search for, buy, comment on, vote, and share AR layer 610. Layer metadata 628 contains a layer identifier (ID) 630, and other layer metadata 632. Non-limiting examples of other layer metadata 632 may include information identifying a creator of the layer, an owner of the layer, edits made to the layer, timestamps, comments, times shared, views, etc.

In this example, each AR object, such as AR object 648 contains of two types of data: (1) object-specific files 650 and (2) object metadata 662. Object-specific files 650 may include one or more references to media files 668 (i.e., AR content items or media content items, generally), script files 672, and miscellaneous files 676, which reside on one or more servers of the server system. For example, object-specific media file reference 656 refers to media file 670, object-specific script reference 658 refers to script file 674, and miscellaneous object-specific file reference 660 refers to miscellaneous file 678. Examples of media files 668, script files 672, and miscellaneous files 676 may be the same as previously described with reference to files 634, 638, and 642, respectively.

Object metadata 662 may include information required by the platform, apart from the render/display engine, that enables platform functionality for that object. Examples of platform functionality include the ability to search for, buy, comment on, vote, and share AR object 648. Object metadata 662 contains an object identifier (ID) 664, and additional object metadata 666. Non-limiting examples of other object metadata may include information identifying a creator of the object, an owner of the object, edits made to the object, timestamps, comments, times shared, views, etc.

The various references described in FIG. 6 are traversable by the AR platform to a network or database location from which a corresponding data item may be retrieved, accessed, or otherwise referenced. In another implementation, some or all of the data items referred to by a reference may instead reside within an AR layer or an AR object, such as within a file wrapper of the AR layer or AR object. In these implementations, references to such data items may be omitted from the AR layer or AR object. The various forms of scripts or script files described herein may include computer executable scripting language that may be interpreted by the AR platform (e.g., by the client-based AR platform program and/or by the server-based AR platform program depending on implementation) during runtime. The various forms of metadata or metadata files herein may be associated with specific AR objects or AR layers. In another implementation, metadata may be replaced with a metadata reference that refers to a particular metadata file. This metadata reference is traversable by the AR platform to a network or database location from which the metadata file or a portion thereof may be retrieved, accessed, or otherwise referenced.

Figure 7:
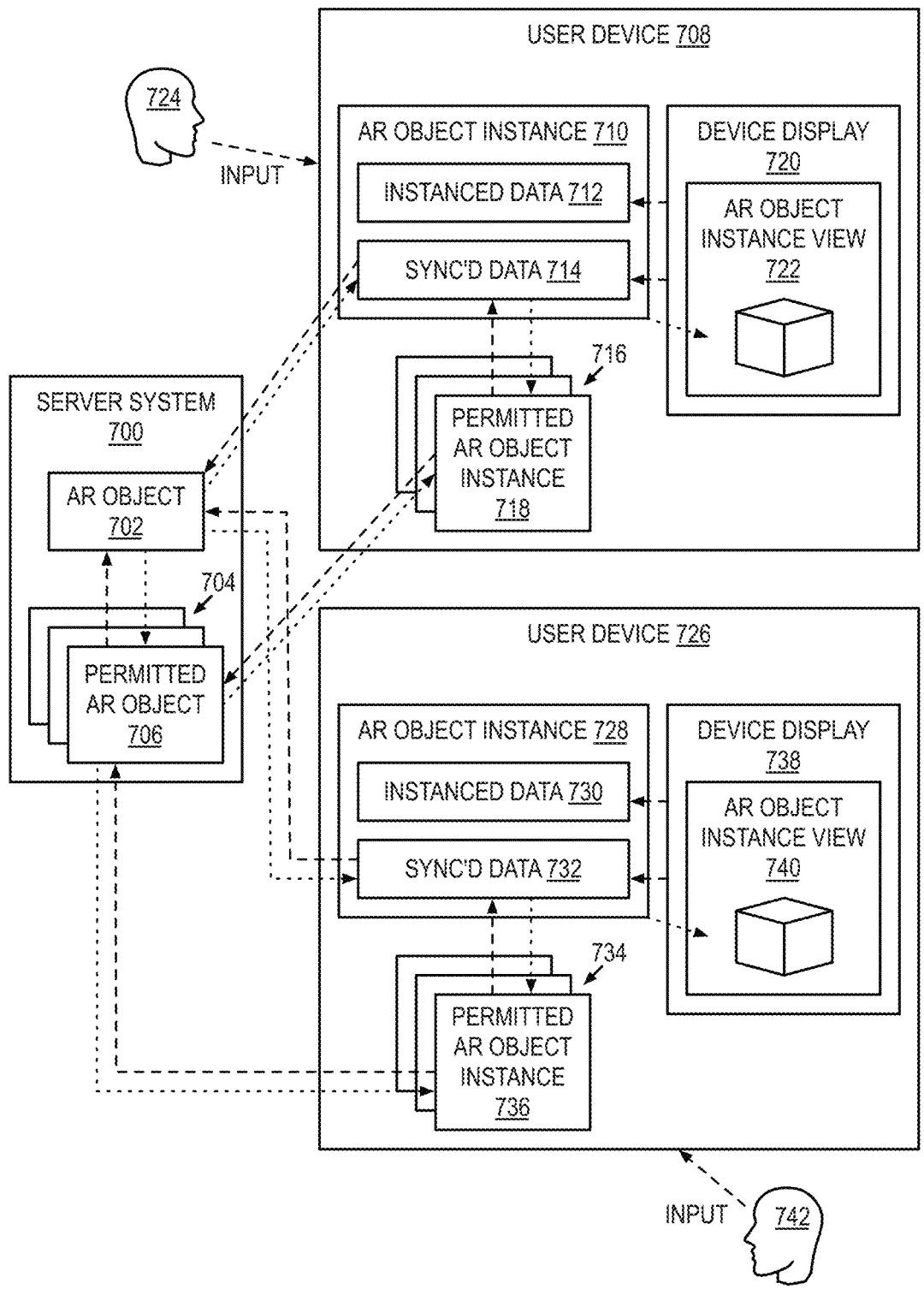
FIG. 7 is a schematic diagram depicting an example of how the platform handles instances of AR objects, and the layers with which such objects are associated, on user devices.

FIG. 7 is a schematic diagram depicting an example of how the platform handles instances of AR objects, and the layers with which such objects are associated, on user devices.

Server system 700 contains many AR objects, including example AR object 702 and permitted AR objects 704. Permitted AR objects 704 refer to AR objects (e.g., permitted AR object 706) that have appropriate permissions to interact with AR object 702. AR object 702 in this example is an AR object that has been downloaded by user devices 708 and 726, and has been executed as AR object instances 710 and 728 at their respective user devices.

AR object instance 710 contains instanced data 712 and synchronized data 714. In an example, all instances of AR object 702 have the same type of data fields instanced or synchronized. For example, the types of data in instanced data 712 is the same as in instanced data 730, and the types of data in synchronized data 714 are the same as in synchronized data 732. However, the actual data entries in instanced data 712 are unconnected/decoupled from instanced data 730, and vice-versa. The actual data entries in synchronized data 714 may be periodically synchronized with synchronized data 732 (and any other instances of AR object 702) with a viable connection to the server system 700. Hence, server system 700 support synchronization of data between or among user devices for a particular AR object.

Functions of AR object instance 710 may be called directly or indirectly by other permitted AR object instances 716 and 734 on the user devices 708 and 726, respectively, as well as calling functions of object instances on the user's device, if permissions have been granted to do so. These AR object instances 716 and 734, additionally synchronize their instance data with the AR objects (e.g., 704, 706) on the server system they are instantiated from. Similarly, the AR objects 706 and 702 on the server system may call functions from other AR objects on the server system, so long as they have permissions to do so.

These AR object instances 710 and 728 are displayed or otherwise presented to users 724 and 742, by being rendered by the user devices 708 and 726 to the device displays 720 and 738, respectively. For example, an AR object instance view 722 is provided at user device 708 that may be perceived by user 724, and an AR object instance view 740 is provided at user device 726 that may be perceived by user 742. Users 724 and 742 are then able to provide input to their respective user devices, which may in-turn provide input to the AR object instances 710 and 728, respectively.

Figure 8:
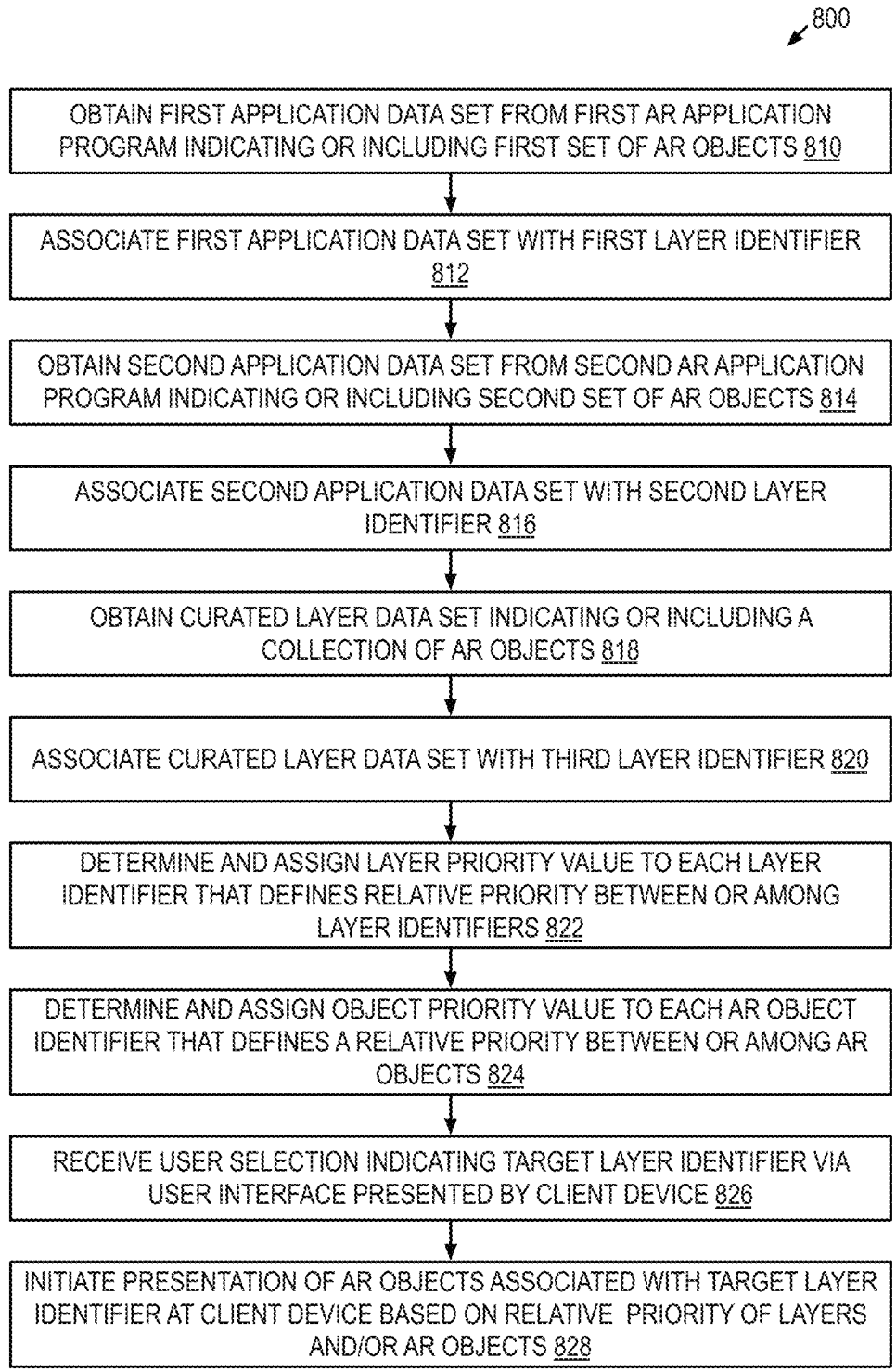
FIG. 8 is a flow diagram depicting an illustrative augmented reality method for presenting AR content items of AR objects from multiple AR layers.

FIG. 8 is a flow diagram depicting an example method 800 for presenting AR content (e.g., media files) of AR objects from multiple AR layers. Method 800 may be performed by a computing system implementing an AR platform program. As an example, method 800 may be performed by a client-based AR platform program, a server-based AR platform program, or by coordination between a client-based AR platform program and a server-based AR platform program. Method 800 may be performed on an individual client basis to present AR content from multiple AR applications or AR layers.

At 810, the method includes obtaining a first application data set from a first AR application program. The first application data set indicates or includes one or more AR objects of the first AR application program. The application data set obtained at 810 may refer to previously described child program data of FIG. 3, for example. At 812, the method includes associating the first AR application data set with a first layer identifier representing a native AR layer of the first AR application program. The first layer identifier may be added to an active layer set that identifies a first AR layer of the first AR application program (corresponding to a first native AR layer) as being in an active state with respect to the AR client.

At 814, the method includes obtaining a second application data set from a second AR application program. The second application data set indicates or includes one or more AR objects of the second AR application program. At 816, the method includes associating the second application data set with a second layer identifier representing a native AR layer of the second AR application program. The second layer identifier may be added to the active layer set that identifies a second AR layer of the second AR application program (corresponding to a second native AR layer) as being in an active state with respect to the AR client.

At 818, the method includes obtaining a curated AR layer data set indicating or including a collection of AR objects. In a first example, the collection of AR objects includes at least some AR objects of both the first AR application program and the second AR application program. Alternatively or additionally, the collection of AR objects may include one or more AR objects of a third-party data source such as previously described data source 568 of FIG. 5. At 820, the method includes associating the curated AR layer data set with a third layer identifier. The third layer identifier may be added to the active layer set that identifies a third AR layer corresponding to a curated AR layer as being in an active state with respect to the AR client.

At 822, the method includes determining and assigning a respective layer priority value to each layer identifier of the active layer set. (see, e.g., FIG. 12). As previously described with reference to FIG. 5, each layer priority value defines a relative priority between or among layer identifiers of the active layer set.

At 824, the method includes determining and assigning a respective object priority value to each AR object identifier associated with each layer identifier of the active layer set. Each object priority value defines a relative priority between or among AR objects associated with the layer identifiers of the active layer set as also described with reference to FIG. 5.

At 826, the method includes receiving a user selection indicating one or more target layer identifiers via a user interface presented by a client device. The user interface may include a layer controller interface having one or more layer controller selectors that enable a user to select a target layer identifier from among the active layer set that includes the first layer identifier, the second layer identifier, and the third layer identifier for presentation of one or more AR objects associated with that target layer identifier. In some use scenarios, the user may select zero or multiple target layer identifiers for presentation.

At 828, the method includes initiating presentation of the one or more AR objects (e.g., graphical AR content) associated with the one or more target layer identifiers at the client device. For example, graphical AR content of the AR objects may be visually presented via an AR viewer component of the AR platform program within an AR view. Presenting graphical AR content includes rendering the content for display by a graphical display device, such as by a rendering engine of the AR platform.

Figure 9A:
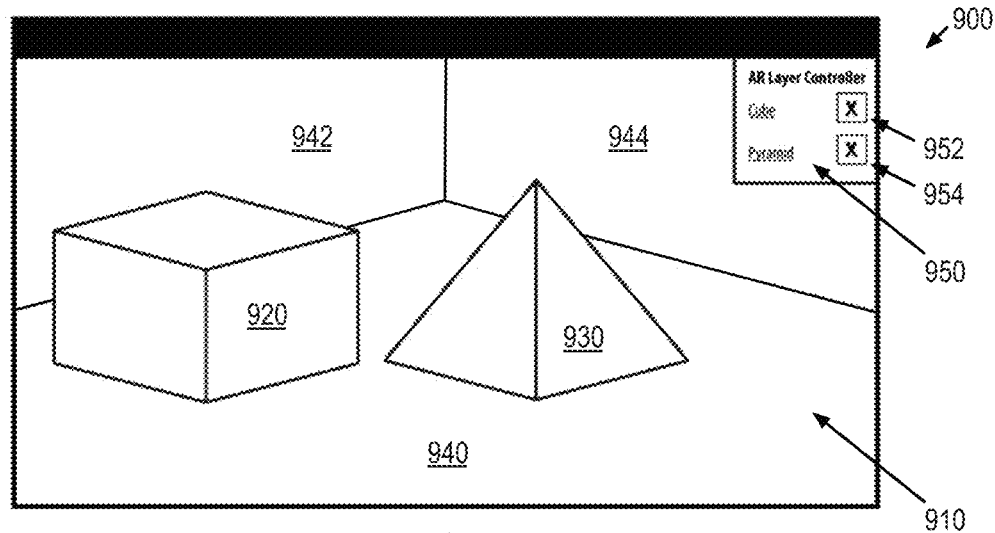
FIG. 9A depicts a non-limiting example of a user interface that includes an AR view provided by an AR platform program.

FIG. 9A depicts a non-limiting example of a user interface 900 that includes an AR view 910 provided by an AR platform program. User interface 900 may be presented via a graphical display device, for example. Within AR view 910, virtual objects in the form of graphical AR content items 920 and 930 are presented within a real-world environment that includes physical real-world objects 940, 942, 944, etc. AR view 910 visually augments the real-world environment by providing the appearance of AR content items 920 and 930 being physically present within the real-world environment. User interface 900 further includes a layer controller interface 950 of the AR platform program.

As previously described, a layer controller feature of the AR platform may be accessed by a user via an layer controller interface that includes one or more selectors that enable a user to select one or more target AR layers for presentation. In this example, layer controller interface 950 includes selectors 952 and 954 that correspond to AR layers for AR content items 920 and 930, respectively. For example, AR content item 920 is associated with a first AR layer depicted as "cube", whereas AR content item 930 is associated with a second AR layer depicted as "pyramid" in FIG. 9A. Within FIG. 9A, both AR layers are presently selected by selectors 952 and 954 as target AR layers for presentation within AR view 910 of user interface 900. In this example, both AR layers are considered to be active, and are associated with an active layer set by the AR platform program.

Figure 9B:
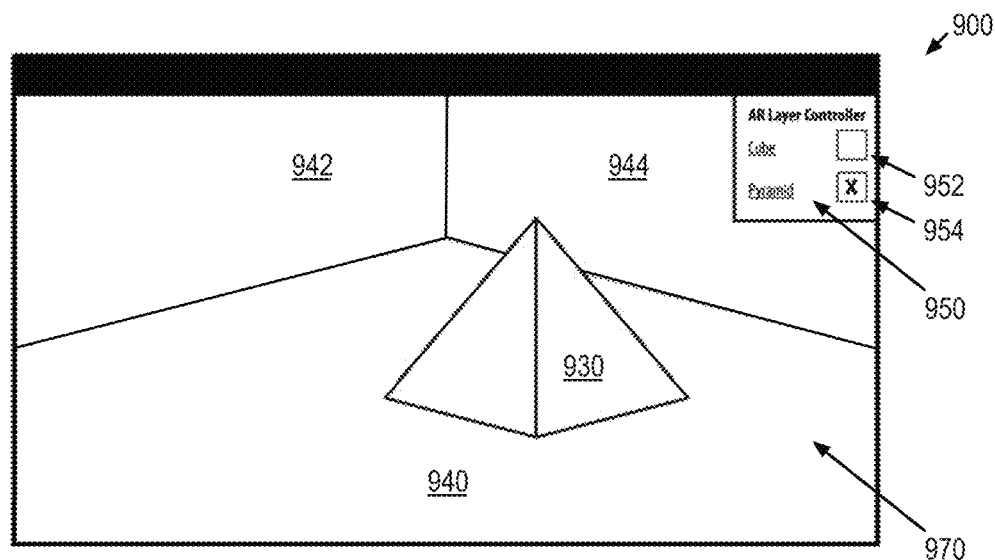
FIG. 9B depicts the user interface of FIG. 9A with an updated AR view.

FIG. 9B depicts user interface 900 of FIG. 9A with an updated AR view 970 in which a user has unselected the first AR layer "cube" within layer controller interface 950 using selector 952. Responsive to this user input, previously described AR content item 920 associated with the first AR layer is no longer presented within updated AR view 970. In this example, the first AR layer "cube" is considered to be active and is associated with an active layer set by the AR platform program, whereas the second AR layer "pyramid" is considered to be inactive and is associated with an inactive layer set by the AR platform. Here, the AR platform has enabled the user to define which AR layers are presented by the AR platform, vary presentation between or among AR content of an individual native AR layer of a particular AR application program, multiple native AR layers of multiple AR application programs, an individual curated AR layer, multiple curated AR layers, or a particular mix of one or more native AR layers and one or more curated AR layers.

Figure 10A:
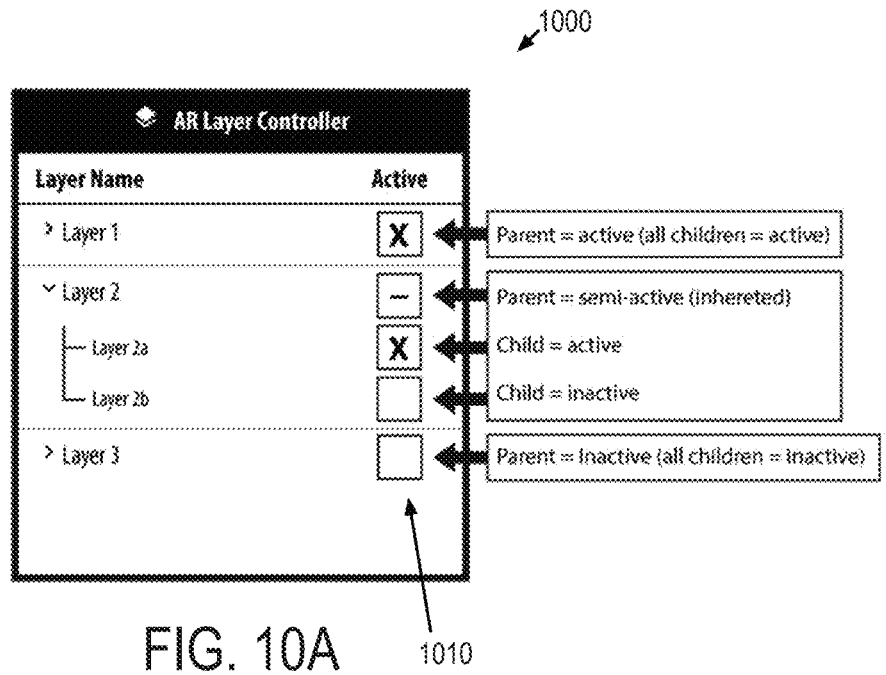
FIG. 10A depicts additional aspects of an illustrative layer controller interface.
Figure 10B:
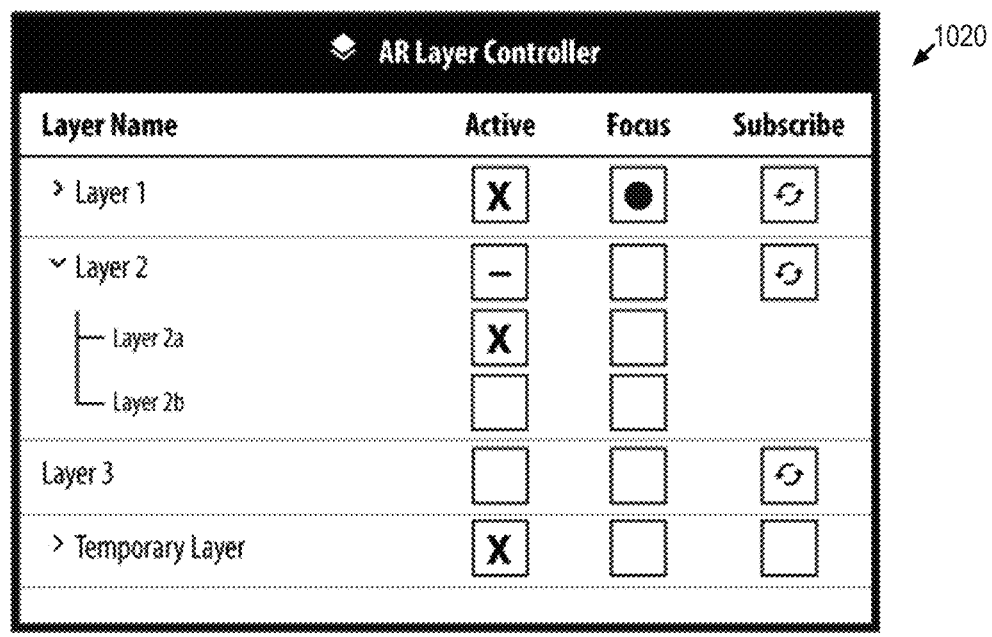
FIG. 10B depicts another illustrative layer controller interface.

FIGS. 10A and 10B depict additional aspects of an example layer controller interface 1000. Layer controller interface 1000 may be graphically presented to a user within a user interface as previously described with reference to layer controller interface 950 of FIGS. 9A and 9B. In this example, layer controller interface 1000 of an AR platform presents individual AR layers by name along with an active status indicator for each AR layer. In at least some implementations, the AR platform may support the nesting of AR layers within a parent-child hierarchy. As an example, a parent AR layer may include one or more child AR layers. Within the example depicted in FIG. 10A, a first AR layer "Layer 1" is presently active (e.g., associated with an active layer set), meaning that the first AR layer (as a parent AR layer) is active and all child AR layers of the first AR layer are also presently active. By contrast, a second AR layer "Layer 2" is presently semi-active (e.g., associated with a semi-active layer set), meaning that the second AR layer (as a parent AR layer) includes at least some active child AR layers and at least some inactive child AR layers. By contrast, a third AR layer "Layer 3" is presently inactive (e.g., associated with an inactive layer set), meaning that the third AR layer (as a parent AR layer) is inactive and does not include any active child AR layers. Layer controller interface 1000 provides another example of selectors 1010 that enable a user to select target AR layers for presentation within an AR view. Hierarchical relationships and associations between parent AR layers and children AR layers may be maintained by the AR platform within the previously described platform data of FIG. 3 or by individual AR applications (with respect to their native AR layer hierarchy) within previously described child program data of FIG. 3.

FIG. 10B depicts another example layer controller interface 1020 that includes selectors that enable a user to identify and define an active state, a focus state, and a subscription state at the AR client with respect to AR layers. These various states are described in further detail below, with respect to FIGS. 11 and 12. A layer controller interface, such as interface 1020, enables a user to define or change the active state, focus state, and subscription state for each AR layer present within the interface. The layer controller interface may further enable a user to define or change a relative position or ordering of the AR layers within the layer controller interface, which may influence priority of those layers relative to each other (see below).

The various parent and child AR layers previously described with reference to FIG. 10A are again present within layer controller interface 1020 of FIG. 10B. Layer controller interface 1020 may be graphically presented to a user within a user interface as previously described with reference to layer controller interface 950 of FIGS. 9A and 9B.

Illustrative AR Method Including Priority and Event Capture

Figure 11:
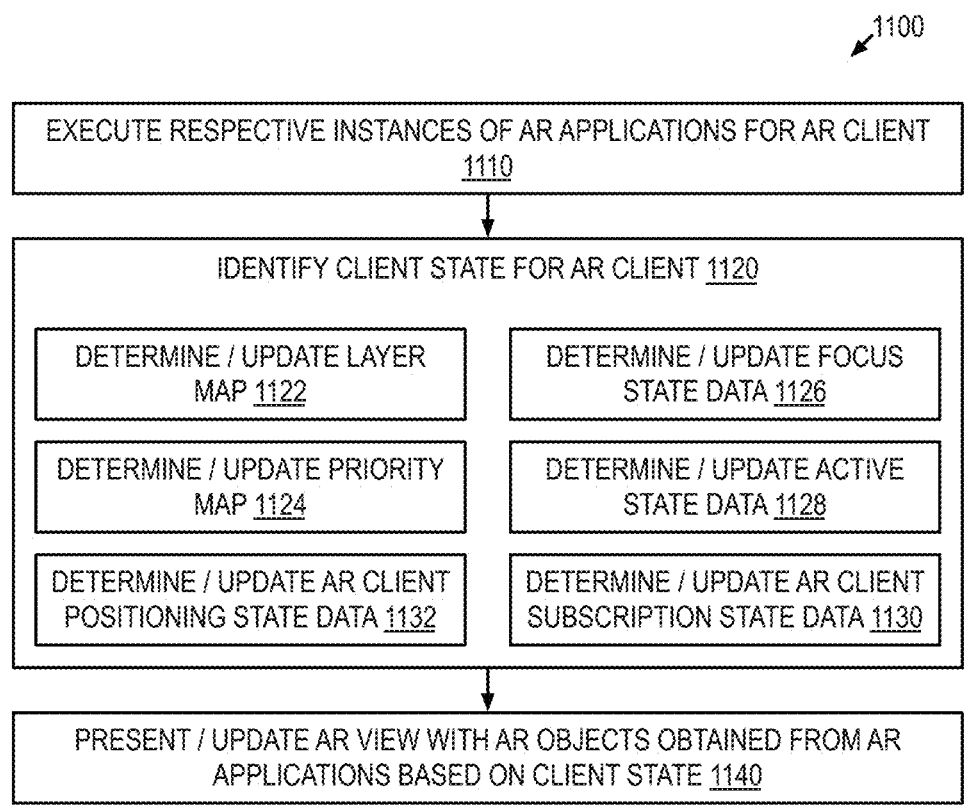
FIG. 11 is a flow diagram depicting an illustrative augmented reality method.

As shown in FIGS. 11-12, this section describes an illustrative AR method including priority determination and event capture.

FIG. 11 is a flow diagram depicting an example augmented reality method 1100. Method 1100 may be implemented by a computing system. In such case, method 1100 may be referred to as a computerized method or a computer-implemented method. In at least some implementations, method 1100 or portions thereof may be performed by an AR platform through an instance of a corresponding AR platform program or program component being hosted at and/or executed by a computing system. Typically, method 1100 is performed in whole or at least in part by a client-based AR platform program executed by a client system. However, aspects of method 1100 may be performed by a server-based AR platform program in combination with the client-based AR platform program in other implementations.

At 1110, the method includes executing respective instances of AR applications or individual AR objects thereof for an AR client. As an example, the AR platform may initially execute (e.g., launch and instantiate) a first child AR application responsive to a command initiated by a user via an input device of a client system of the AR client. An example implementation of the AR platform performing operation 1110 includes the client-based AR platform program incorporating all of the computer executable code and associated data of all of the executed AR applications, AR layers, and AR objects within the client-based AR platform program and compiled into a single binary or file.

The AR platform can change the way it executes the computer executable code of an AR layer on the fly. For example, the AR platform can interpret this code, just-in-time compile the code, or execute the compiled code. The particular method used by the AR platform depends on a variety of factors. These factors may include the hardware and/or software type and/or capabilities of the client system upon which the client-based AR platform program is running. This has several benefits, including: (1) a smaller initial download size for the client-based AR platform program, (2) the ability to add AR layers later to the client-based AR platform program, and (3) support the ability for the AR platform to support hundreds, thousands, millions, or even billions or more AR layers for users to access.

Each time an AR client downloads an AR layer, the AR platform ensure that the most up-to-date version of the AR layer is downloaded to the client system. Here, the user need not manually update an AR layer to a new version of the AR layer. However, this feature of the AR platform could be overwritten by the user through the use of user setting, actions, or options. When an AR client downloads an AR layer, the AR platform stores the downloaded layer data in a (long-term) memory cache, to minimize wait time when loading layers. This cache can be cleared out manually by the user, or programmatically by the AR platform. Programmatic clearing of the cache by AR platform would prioritize the AR layers that are the largest in terms of data storage size, least frequently used, and/or have the longest time since they were last used by the AR client. The AR client also checks with the server-based AR platform program and/or the AR applications each time an AR layer is launched or the AR platform is launched for the AR client to ensure the layer data matches the most recent version. Updates to the layer data could be implemented in an intelligent manner by the AR platform to only update the portions of the layer data that have been changed or modified from the previous version.

At 1120, the method includes identifying a client state for the AR client. As previously described with reference to operation 412 of FIG. 4, a client state refers to a state of the AR client within the AR ecosystem at a particular time, and may be based on a variety of state-determining factors that are specific to that AR client.

As part of operation 1120, the AR platform may continuously determine and/or update a client state for the AR client on a periodic basis and/or in response to changes in state-determining factors. As a non-limiting example, the AR platform may determine and/or update the layer map as indicated at 1122 and/or the priority map as indicated at 1124 for the AR client, as previously described with reference to FIGS. 5 and 8. Other non-limiting examples include the AR platform determining and/or updating focus state data (indicating whether the target is presently in focus) as indicated at 1126 for the AR client with respect to the AR layers and AR objects, active state data as indicated at 1128 for the parent and child AR layers, subscription state data as indicated at 1130 for the parent and child AR layers, and the client positioning state data for the AR client within the real-world environment as indicated at 1132.

Focus state data defines whether a particular AR layer or a particular AR object is characterized by the AR platform as having the focus of the user of the AR client. Focus may take the form of a binary value, and in some implementations, only a single AR layer and associated AR objects may be in focus at a given time. The AR platform may message with AR layers or their source AR applications to indicate whether that AR layer is presently the focus AR layer or to identify which AR layer is presently the focus layer. AR layers need not be in focus to be interacted with by a user. For example, actions taken by a user with respect to a first AR layer that is presently in focus may influence other AR layers to cause interactions with their respective AR objects.

Active state data defines whether a particular AR layer is active, inactive, or semi-active. Subscription state data defines whether a particular AR layer has been subscribed to by the user of the AR client. Client positioning state data defines one or more of: (1) a multiple degree-of-freedom (DOF) position/orientation, (2) a speed, (3) an acceleration, and (4) a heading for the AR client within the real-world environment. A multiple degree-of-freedom (DOF) position/orientation may include up to six degrees of freedom (6DOF), which includes a position of the AR object within three spatial dimensions (e.g., X, Y, and Z Cartesian coordinate dimensions) and an orientation of the AR object within three orientation dimensions (e.g., yaw, pitch, and roll angle dimensions). The various data describing the client state identified at 1120 may be stored by the AR platform as platform data, either locally at the AR client or remotely at a server system of the AR platform.

As a sub-process to operation 1120, the AR platform obtains data from a variety of sources that describes one or more aspects of the state-determining factors, and identifies whether changes to the state-determining factors have occurred since the client state was previously determined for the AR client. As previously described, these state-determining factors may include one or more of: (1) a hardware state component that includes sensor measurements obtained from one or more sensors of the client system, hardware type, and/or hardware capability of the client system, (2) a user state component that includes an identity of each user of the AR client, user-specific settings associated with each user, and/or user-specific profile information associated with each user, (3) an AR platform state component that includes a program state of the AR platform with respect to the AR client, (4) an AR application state component that includes a program state of each AR application interfacing with the AR platform with respect to the AR client. Data describing these state-determining factors may be received or otherwise obtained by the AR platform from a variety of sources, including (1) user input devices of the client system, (2) sensor devices of the client system, (3) previously stored data for the AR client including user data, among other suitable data sources.

At 1140, the method includes presenting/updating an AR view with AR objects obtained from the executed AR applications based on the client state identified at 1120. Here, the AR platform may selectively present graphical AR content of the AR objects via a graphical display device of the client device or client system. As an example, AR objects of a first AR application may be presented concurrently with AR objects of a second AR application within an AR view.

Method 1100 or portions thereof may be continuously or periodically performed to maintain an updated AR view that reflects changes to the client state for the AR client. Accordingly, the various operations of method 1100 may be at times performed in a different order, repeated, omitted, or may be performed in parallel.

The layer controller feature of the AR platform may include support for additional properties of AR layers beyond the active state previously described with reference to FIGS. 9A, 9B, and 10A, 10B. For example, a focus state may be maintained for each AR layer based on the focus state data previously described with reference to method 1100 of FIG. 11. As another example, a subscription state may be maintained for each AR layer based on the subscription state data previously described with reference to method 1100 of FIG. 11. These additional properties may be exposed to the user of the AR client via a layer controller interface.

The focus state is a property of an AR layer that defines whether that AR layer is primary focus layer for the AR client. The primary focus layer represents the AR layer that the user is presently interacting with at a given point in time or the AR layer that the AR platform assumes that the user will interact with. Within layer controller interface 1020, the AR layer "Layer 1" is presently the primary focus layer based on the focus state data maintained by the AR platform. A user may utilize one or more of the selectors associated with the focus column to change the primary focus layer to another AR layer. In an example implementation, only one AR layer can be the primary focus layer at a given time.

Subscribing is an action that may be performed by a user with respect to an AR layer. The AR layer may be a native AR layer of an AR application or a curated AR layer. The act of subscribing identifies an AR layer for convenient reference by the user, and may be similar to bookmarking a webpage or adding an electronic game to a personal game library. AR Layers that are subscribed to (i.e., subscribed AR layers) are presented in the user's layer controller interface. In addition to subscribed AR layers, AR layers that have not been subscribed to by the user (i.e., non-subscribed AR layers) can also be presented in the layer controller interface, in at least some implementations. However, non-subscribed AR layers in the layer controller interface are temporary (e.g., remain for limited period of time or for a particular session). The act of subscribing to an AR layer directs the AR platform to persistently maintain that AR layer in the layer controller interface. As an example, when a user selects a hyperlink to a new AR layer, that AR layer will be temporarily presented within the user's layer controller interface as an un-subscribed AR layer, is indicated as being active, and optionally indicated to be the focus AR layer. If the user does not subscribe to this AR layer, then that AR layer may be removed from the layer controller interface during subsequent sessions (e.g., following a subsequent log-in by the user).

User input may be directed to the layer controller feature of the AR platform in a variety of different ways to change the active state, the focus state, and the subscription state with respect to each AR layer. Non-limiting examples of user input modes include the user pressing and holding a selector or button associated with an AR layer within the layer controller interface, a special-purpose selector or button that the user can select, a voice command, selecting an AR content item to summon a corresponding graphical menu to which a user input may be directed, and an API call from an AR application program.

As previously described with reference to the priority map of FIG. 5, priority values may be assigned to AR layers and their respective AR objects. A priority-based event capture feature of the AR platform intelligently selects the AR object that the AR platform assumes the user intends to interact with. The AR platform may additionally prompt the user for clarification (i.e., user input) if uncertainty as to the user's input is identified by the AR platform with respect to two or more AR objects. This event capture feature of the AR platform references the priority values assigned to each AR layer and their respective AR objects. The priority value assigned to a particular AR layer or AR object may be determined by the AR platform based on a variety of priority-determining factors briefly described in the table of FIG. 12 and described in further detail with reference to the process flow of FIG. 17.

FIG. 12 depicts a table that describes an example priority framework that may be implemented by an AR platform to determine priority among AR layers. The first column includes the layer identifier (ID), which may include any suitable identifying information. The second column from the left-hand side of table indicates whether the AR layer with which the AR object is associated is currently active. The third column from the left-hand side of the table indicates whether an AR content item of that AR layer is currently within a field-of-view of the AR view presented at the AR client. The fourth column from the left-hand side of the table provides a description of the AR layer. The fifth column from the left-hand side of the table indicates a relative priority from highest to lowest to non-applicable depending on the factors present in the second through fourth columns of the table.

Active AR layers are prioritized relative to each other, whereas inactive AR layers need not be prioritized since their AR content items are not presented at the AR client. However, a highest priority AR layer that may be supported by the AR platform does not necessarily require that the AR layer be active. This highest priority AR layer is referred to as a "Superlayer", and may be reserved as an emergency messaging layer or a layer dedicated for use by the AR platform developer, for example.

AR layers having an AR content item within the field-of-view of the AR client may be ordered by the AR platform relative to each other based on their priority values between the high priority and the lowest priority states. By contrast, AR layers that do not have an AR content item within the field-of-view are not necessarily ordered by the AR platform relative to each other, since AR content items of these AR layers are not visually presented at the AR client.

The currently focused AR layer (i.e., the primary focus layer) is assigned the high priority state in contrast to the AR layer that has never been interacted with by the user of the AR client being assigned the lowest priority state. Between these two priority states are intermediate priority states ordered from higher to lower priority that include the last focused AR layer, the most frequently focused AR layer, the least frequently focused AR layer, the never focused AR layer, the most recent interacted with AR layer, and the least frequently interacted with AR layer.

In certain circumstances, AR objects can have a different relative priority than the AR layer that contains those AR objects. Priority may be based on a variety of factors, including how recently the AR layer was in focus (i.e., the primary focus layer) at the AR client, how often the AR layer has been in focus, and how often the user interacts with AR objects of that AR layer, which AR objects currently have AR content items present within the field-of-view of the AR view, the position, size, and distance of those AR content items to the user's perspective, and which AR layers are currently active. Priority may be used by the AR platform to determine the placement, shape, and detail of objects when AR layers or their applications define conflicting positioning of two or more AR content items.

As previously discussed, visual AR refers to a view of a real-world environment that is supplemented with computer generated graphical content in the form of AR content items of AR objects. Within a three-dimensional AR viewer environment, AR objects may take the form of three-dimensional objects that have a volume and positioning within three-dimensions. For example, referring again to FIG. 9A, AR content item 920 takes the form of a three-dimensional cube, and AR content item 930 takes the form of a three-dimensional pyramid. It will be understood that these AR objects are non-limiting examples of computer generated graphical content that may be visually presented within an AR view of an AR viewer environment. Within this three-dimensional AR viewer environment, AR content items may have up to six degrees of freedom (6DOF), which includes a position of the AR object within three spatial dimensions (e.g., X, Y, and Z Cartesian coordinate dimensions) and an orientation of the AR object within three orientation dimensions (e.g., yaw, pitch, and roll dimensions).

In the example depicted in FIG. 9A, AR content items 920 and 930 are arranged to provide the appearance of resting on a physical surface of real-world object 940. It will be understood that the AR view of FIG. 9A may refer to a single image frame of a multi-frame dynamic AR view that includes moving real-world objects and/or moving AR content items having positions and orientations that change over time relative to the perspective of the user of the AR client.

Collision Signaling, Conflict Resolution, and Automatic Conflict Mitigation

As shown in FIGS. 13-19, this section describes further illustrative aspects of AR platform 110, including collision signaling, conflict resolution, and automatic conflict mitigation.

Figure 13:
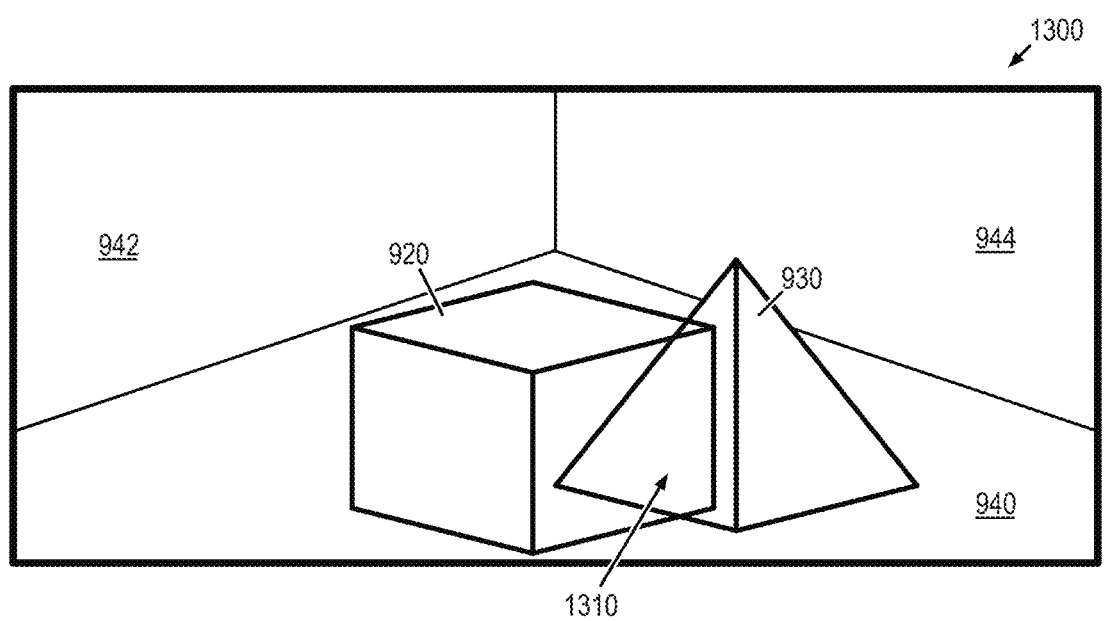
FIG. 13 depicts another illustrative AR view of an AR viewer environment.

FIG. 13 depicts another example AR view 1300 of an AR viewer environment in which previously described AR content items 920 and 930 are positioned such that a spatial conflict is present between AR content items 920 and 930. Spatial conflict may occur between AR content items from multiple independent AR applications (particularly if those AR applications were developed by different developers) or may occur between AR content items of different AR objects within an individual curated AR layer or may occur between AR content items of two or more different AR layers.

An example region 1310 of spatial conflict between AR content items 920 and 930 is indicated in FIG. 13. This region of spatial conflict refers to overlap in three-dimensional space between at least a portion of a first AR content item and at least a portion of a second AR content item. In this example, visible features of AR content items 920 and 930 conflict with each other. In other examples, non-visible features of AR content items may conflict with each other. Such non-visible features may take the form of buffer regions or volumes that surround visible features of AR content items. Accordingly, spatial conflict between AR content items may include spatial overlap of non-visible buffer regions or volumes that surround such AR content items.

Spatial conflicts between or among AR content items may inhibit or impede a user's ability to perceive or interact with those AR content items. Because a region of spatial conflict between AR content items is within multi-dimensional space of the AR viewer environment, simply changing perspective of the AR view does not necessarily resolve or eliminate the spatial conflict. Hence, these forms of spatial conflict are in contrast to the mere appearance of overlap between AR objects that may be caused by visual occlusion of one visible feature by another visible feature within a particular field of view.

If the AR platform receives a user input from a user of the AR client, the event capture feature identifies a set of conflicting AR layers that includes all or each of the AR layers to which user input could have been directed. A user input may be referred to as an interaction event within the context of resolving conflicts among AR layers. For example, within FIG. 13, a user input directed at region 1310 would include the AR layers of AR content items 920 and 930. The event capture feature identifies the AR layer having the highest priority among the set of conflicting AR layers (e.g., based on the priority map). The event capture feature passes the interaction event (i.e., the user input) to the AR layer with the highest priority.

The set of behaviors for an AR object in response to an interaction event is determined by one or more of: scripts or other metadata associated with the AR object, scripts or other metadata associated with the AR layer of the AR object, or application code defining the source AR application of the AR object. In at least some implementations, the AR layer determines to either capture the interaction event, or signal to the AR platform to pass the interaction event on to another AR layer of the set of conflicting layers with the next highest priority, and so on to the lowest priority AR layer. Once an AR layer has decided to capture the interaction event, all other AR layers of the set of conflicting layers which are relevant to the interaction event receive a notification about the interaction event from the AR platform, including an indication of which AR layer captured the interaction event, the priority value associated with that AR layer, and an indication of all AR layers that used that information as defined in the scripts and/or code of those objects, layers, or source AR applications.

As an example, the AR platform, in implementing the event capture feature, obtains an indication (e.g., a list) of the AR layers that are presently registered with the AR platform. This list of AR layers includes all active AR layers, for example. Here, each active AR layer or active AR object registers with the AR platform by creating an event receiver. This event receiver registers with the AR platform, waiting for the AR platform to communicate interaction event messages. This event receiver functionality may be implemented by the scripts or code of the AR object, AR layer, and/or the source AR application. The AR platform sorts the AR layers of the list of registered AR layers by their assigned priority values. The AR platform checks each AR layer to determine if that AR layer responded to the interaction event messaging by capturing the interaction event, in order of priority. Eventually, an AR layer may respond to the interaction event indicating that the AR layer captured the interaction event. The AR platform messages with other AR layers registered with the AR platform to inform those other AR layers of the identity of the AR layer that responded to the interaction event and the priority value or relative priority positioning of that AR layer within the sorted list, and an indication of the type of interaction event. These other AR layers may include scripts or associated code that use this information as an input to influence a behavior of the AR objects of these other AR layers.

Furthermore, AR objects, AR layers, and source AR applications may query the AR platform for priority values or relative priority assigned to other AR objects or AR layers, which may be used within the scripts and code to influence a behavior of the AR objects. This priority information provides an indication of a degree of a user's interest at a given time with respect to a particular AR layer. As an example, an AR layer may present a list of the user's active layers having at least a threshold priority value or relative priority. As another example, an AR layer may degrade or abstract graphical content of other AR layers based on their relative priority. As yet another example, an AR layer that implements a game within the AR platform may pause the game if the priority assigned to that AR layer is less than a priority threshold or resume the game if the priority exceeds a priority threshold.

Depending on the various sensors present on-board the client system, there are many different types of user input that can be captured and processed by the event capture feature of the AR platform. Some of these user input types include: voice commands received via a microphone, gestural commands received via a touch-screen or optical sensor system, facial expressions received via an optical sensor system, laser pointer input received via an optical sensor system, and touch-based inputs received via a console controller, keyboard, computer mouse, touch-screen, touch-wall, stylus, or other button or actuator, etc.

AR layers can provide a variety of different outputs to the user responsive to the interaction event depending on the output capabilities of the client system. Examples of these different outputs may include: haptic, visual, auditory, motion, olfactory, electrical, thermal or taste feedback, etc. Client devices that may be used to deliver this feedback may include: cell phones, headsets, head mounted displays, tablets, etc.

Figure 14:
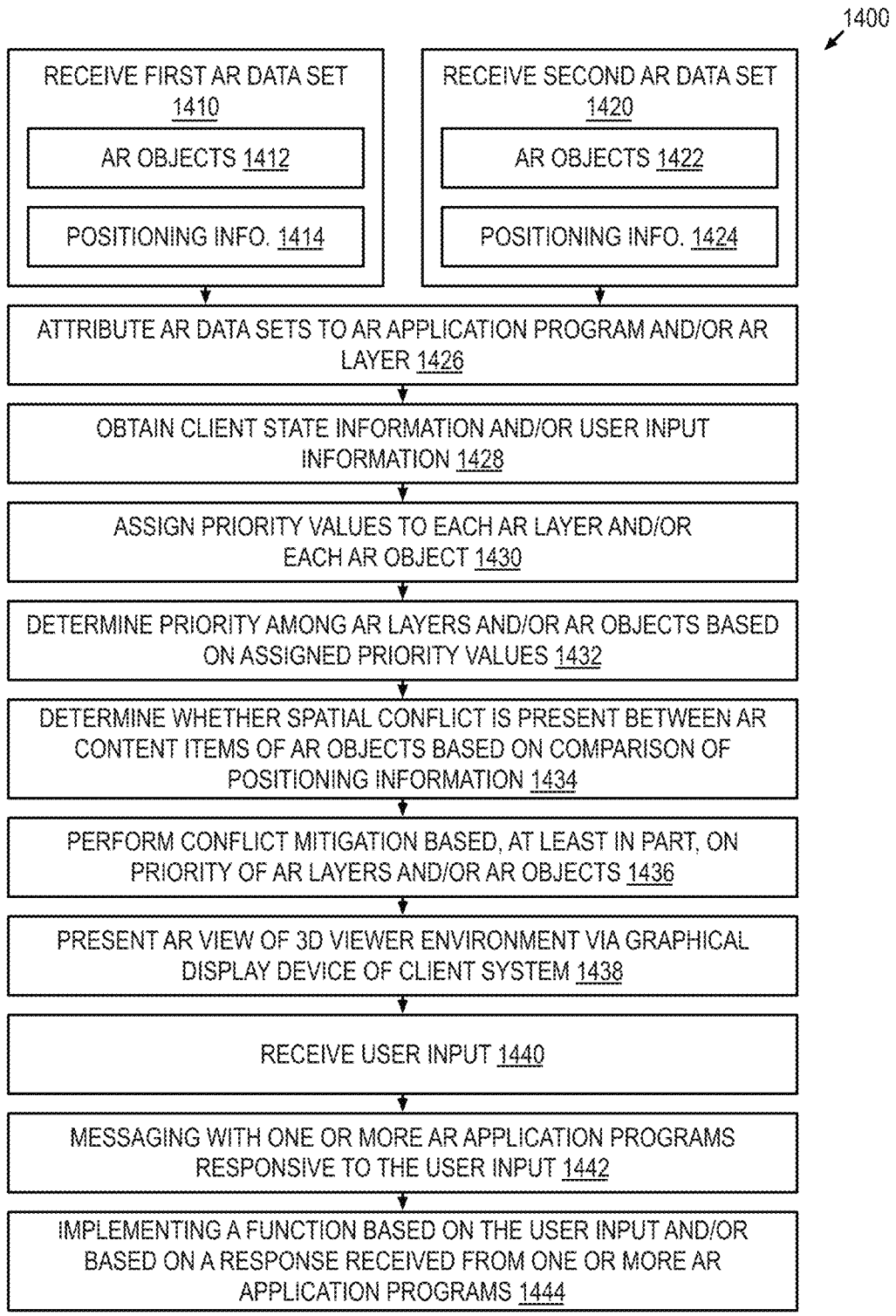
FIG. 14 is a flow diagram depicting an illustrative method for conflict mitigation among AR content items.

FIG. 14 is a flow diagram depicting an example method 1400 for conflict mitigation among AR content items. As a non-limiting example, method 1400 or portions thereof may be performed by a client system implementing a client-side AR platform program. Method 1400 may be performed in combination with the previously described methods of FIGS. 8 and 11, for example.

At 1410, the method includes receiving a first AR data set from a first AR application program. The first AR data set may include one or more AR content items 1412 (e.g., of a first AR object or AR layer) and positioning information 1414 for each of these one or more AR content items. As an example, the first positioning information may define a first three-dimensional positioning (e.g., in up to 6DOF) of a first AR content item within a three-dimensional AR viewer environment.

At 1420, the method includes receiving a second AR data set from a second AR application program. The second AR data set may include one or more AR content items 1422 (e.g., of a second AR object or AR layer) and positioning information 1424 for these one or more AR content items. As an example, the second positioning information may define a second three-dimensional positioning (e.g., in up to 6DOF) of a second AR object within the three-dimensional AR viewer environment.

At 1426, the method includes attributing AR data sets received at 1410 and 1420 to a respective AR application program or AR layer. For example, AR information received at 1410 may be attributed to the first AR application program, and then further attributed to a first AR layer based on a previously defined layer map of the AR information. AR information received at 1420 may be attributed to the second AR application program, and then further attributed to a second AR layer based on a previously defined layer map of the AR information. In these examples, AR layers are aligned with AR application programs as native AR layers. However, one or more of these AR layers may instead take the form of curated AR layers that potentially include a mix of AR objects from a plurality of AR application programs.

At 1428, the method includes obtaining client state information and/or user input information. The client state information and/or user input information received at 1428 may be used by the AR platform to assign and determine priority among or between AR objects and AR layers.

At 1430, the method includes assigning priority values to each AR layer and/or to each AR object. Operation 1430 may be used to create the previously described priority map of FIG. 5, for example. The priority values assigned to AR layers and/or to AR objects may be based, at least in part, on a variety of factors, including the operating condition information and user input information obtained at 1428. Priority values assigned to AR objects may be based on a different set of factors as compared to priority values assigned to AR layers. Assignment of priority of values will be described in further detail with reference to FIG. 17.

At 1432, the method includes determining priority among AR layers and/or among AR objects based on the priority values assigned at 1430. As an example, AR layers may be ordered relative to each other by the AR platform based on their respective priority values. Similarly, AR objects may be ordered relative to each other by the AR platform based on their respective priority values. Accordingly, the AR platform may determine whether a first AR object is of higher or lower priority relative to a second AR object by comparing their respective priority values. Similarly, the AR browser program may determine whether a first AR layer is of higher or lower priority relative to a second AR layer by comparing their respective priority values.

At 1434, the method includes determining whether spatial conflict is present between AR content items of two or more of the AR objects based on comparison of the positioning information for those AR content items. In an example, first AR information received from a first AR application program may include first positioning information and a first AR content item of a first AR object that collectively define a first three-dimensional volume within a three-dimensional AR viewer environment. Similarly, second AR information received from a second AR application program may include second positioning information and a second AR content item of a second AR object that collectively define a second three-dimensional volume within the three-dimensional AR viewer environment.

The AR platform may determine whether a spatial conflict is present between these first and second AR content items by determining whether their respective first and second three-dimensional volumes overlap with each other within the three-dimensional AR viewer environment. In at least some examples, the first three-dimensional volume may include a first non-visible buffer region surrounding a visual representation of the first AR content item, and the second three-dimensional volume may include a second non-visible buffer region surrounding a visual representation of the second AR content item. In other examples, spatial conflict may be limited to overlap in the visual representations of the first and second AR content items.

In at least some implementations, the AR platform may include a collision signaling feature that registers AR content items of AR objects as being solid or non-solid. When an AR content item is registered as solid, an spatial overlap between that AR content item and another AR content item registered as solid causes the collision signaling feature of the AR platform to notify the AR layers or AR applications associated with the spatial conflict as well as the relative position, orientation, geometry, and priority of the AR content items involved in the spatial conflict, so that these AR layers or AR applications have the option of mitigating the spatial conflict by moving their respective AR content items or replacing their respective AR content items with alternative graphical content or discontinuing presentation of their respective AR content items.

At 1436, the method includes performing conflict mitigation to reduce the spatial conflict between AR content items within the three-dimensional AR viewer environment. As previously described, the AR layers or AR applications associated with the AR content items involved in the spatial conflict have the option of taking action to mitigate the conflict. In other implementations, the AR platform may act on behalf of the AR layers or AR applications to mitigate the conflict (as described below).

The conflict mitigation performed at 1436 may be based, at least in part, on the priority of AR layers and/or AR objects relative to each other. Conflict mitigation may include one or more of the following: (1) repositioning AR content items within the AR viewer environment, (2) filtering or omitting AR content items from being visually presented within the AR viewer environment, (3) substituting a graphical representation of the AR content items with an alternative graphical representation (e.g., another AR content item of the same AR object), (4) scaling down a size of AR content items within the AR viewer environment, and (5) providing menus that enable a user to distinguish between and direct user input at the AR content items.

In an example conflict between first and second AR content items from first and second AR application programs, conflict mitigation may be performed with respect to a target AR content item. The target AR content item may be selected by the AR platform from one of the first AR content item or the second AR content item involved in the spatial conflict based on their assigned priority values. For example, the target AR content item may be selected as the lower priority AR content item. This lower priority AR content item may, for example, be repositioned within the three-dimensional AR viewer environment, scaled down in size, and/or have a graphical representation of the AR content item substituted with an alternative graphical representation. This alternative graphical representation may take the form of a simplified visual representation of the AR content item, in an example. In other implementations, the target AR content item may be selected as the higher priority AR content item.

Filtering of AR content items from being visually presented may be programmatically performed by the platform in at least some implementations. Such filtering may be performed responsive to user settings or user input. In an example, a user inputs one or more variables (M) that represent a quantity or degree of augmentation of the real-world that the user is willing to tolerate. This variable M may or may not be transformed by a function f(M) to obtain user-variables N, X, etc. The Platform takes one or more of these user-variables, and applies the user-variable(s) to an algorithm for defining perceived AR density. Non-limiting examples of AR-density algorithms include: (N) % of screen-space occupied by graphical content of AR objects/AR layers; (N) AR content items of AR objects/AR layers displayed; (N) AR content items of AR objects/AR layers in (X) given area of the display; (N) AR objects/AR layers or their AR content items thereof displayed over (X) period of time; (N) % of volumetric area (X) occupied by AR content items of AR objects/AR layers (with flat, 2D graphical representations being given a minimum depth); (N) AR objects/AR layers or their content items thereof of a given author, category, tag, or other metadata signifier. The platform uses these or other user-variables (e.g., N, X) and AR-density to determine a threshold to be applied by the platform to filter graphical content from being displayed or otherwise presented to the user.

In some examples, the platform then looks at all of the relevant AR objects or AR layers and uses priority to cull objects/layers until the threshold is met. For example, if a threshold is set at "N total AR Objects", then simply the Nth highest priority Objects would be displayed. As another example, if a threshold is N % of the screen area, the platform could take all applicable AR objects' priority, and divide them by the amount of screen space they take up, and begin culling the low scores until the threshold is reached.

FIG. 9A represents an example in which an AR content item (e.g., AR content item 920) has been repositioned (e.g., moved to the left) within the AR viewer environment to reduce spatial conflict with another AR content item 930 that may otherwise be present based on AR application-defined positioning, as depicted in FIG. 13. Hence, AR view 910 may provide a user with an AR viewing experience having less spatial conflict among AR content items of competing AR applications or AR layers as compared to AR view 1300 of FIG. 13. Alternatively, FIG. 9B depicts an example in which an AR content item (e.g., content item 920) has been filtered from being presented in the AR view to reduce or eliminate spatial conflict.

Figure 15:
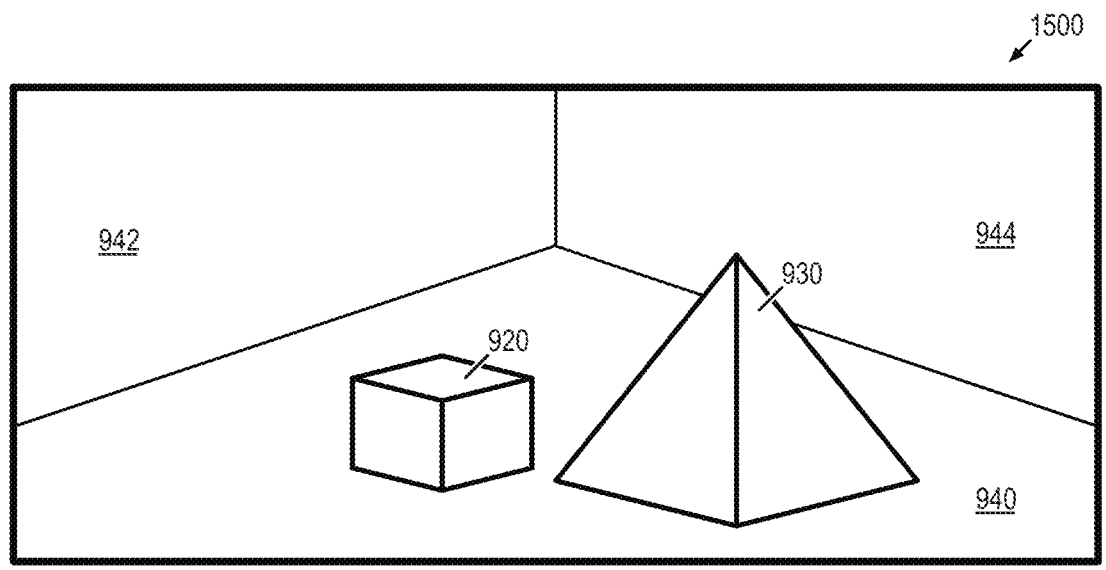
FIG. 15 depicts another illustrative AR view of an AR viewer environment.

FIG. 15 depicts another example AR view 1500 of an AR viewer environment. In this example, previously described AR content item 920 of FIGS. 9A and 13 has been scaled down in size to AR content item 1520 (e.g., to represent a smaller cube) to reduce spatial conflict with another AR content item 930 that may otherwise be present as previously depicted in FIG. 13. In this example, previously described AR content item 930 retains its same relative size across the various views presented in FIGS. 9A, 9B, 13, and 15.

Figure 16:
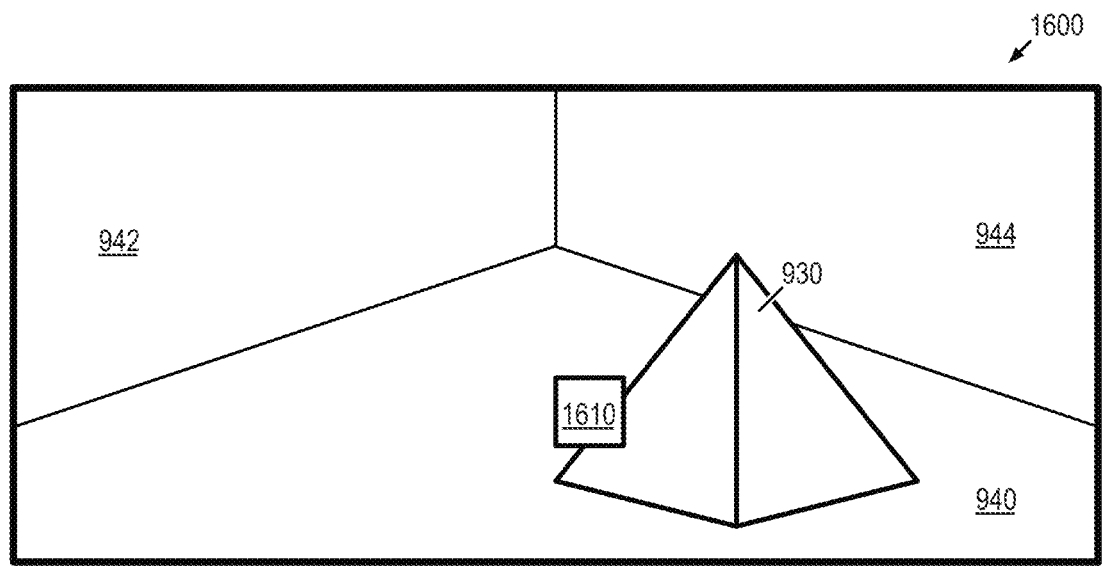
FIG. 16 depicts another illustrative AR view of an AR viewer environment.

FIG. 16 depicts another example AR view 1600 of an AR viewer environment. In this example, graphical content representing visual features of previously described AR content item 920 has been replaced with alternative graphical content in the form of an icon 1610 to reduce spatial conflict with another AR content item 930 that may otherwise be present (e.g., as depicted in FIG. 13). In each of these examples, reducing spatial conflict may refer to the reduction in a magnitude of a volume or area of the spatial conflict. In at least some implementations, this alternative graphical content may take the form of a replacement AR content item that is retrieved by the AR platform from the same AR object or the same AR application as the replaced AR content item. This replacement of an AR content item with an icon is also an example of abstraction as may be defined by a presentation policy (described below).

At 1438, the method includes presenting an AR view of a three-dimensional viewer environment via a graphical display device of the client system in which the AR content items are integrated with or overlaid upon a view of a real-world environment to provide an AR viewing experience. Here, first and second AR content items from respective first and second AR objects and corresponding application programs or layers may be presented at their respective three-dimensional positionings to provide the appearance that these AR content items form part of the real-world environment.

At 1440, the method includes receiving user input directed at the three-dimensional viewer environment. As an example, a user may direct a user input at an AR content item graphically presented within the AR view. In this example, the user's intention to interact with the AR content item may be apparent. As another example, a user may direct a user input at a region of spatial conflict between the first and second AR content item presented within the AR viewer environment. In this example, the user's intention as to which AR object the user input is to be directed may be less apparent or discernable. As previously described, priority among AR content items may assist in resolving this conflict.

At 1442, the method includes messaging with one or more of the AR application programs responsive to the user input received at 1440. In examples where the user input is directed to a particular AR content item, the AR platform may message with the AR application that is attributed to or serves as the source of that AR content item. As an example, the AR platform may send a message to the AR application program that indicates the user input and identifies the AR content item by an AR object identifier and/or AR layer identifier. In response to this message, the AR platform may receive a response message from the AR application program that indicates a function to be implemented or otherwise performed by the AR platform. In examples where the user input is directed to a region of spatial conflict, messaging with two or more AR application programs may be performed to resolve and mitigate the conflict.

At 1444, the method includes implementing a function based on the user input received at 1440 and/or based on a response received from the one or more AR application programs from the messaging performed at 1442. Some functions may be performed by the AR platform without messaging with the AR application program. As an example, the AR platform may present a menu associated with the AR content item via its AR object or AR layer in response to receiving a user input directed at the AR object without necessarily messaging with the AR application program attributed to that AR content item. In other examples, the AR platform may message with the AR application program attributed to the AR content item in response to receiving the user input directed at that AR content item. This messaging may enable the AR platform to update the state of the AR object of the AR content item at the AR application program and/or may be used to indicate interaction with the AR object at the AR application program. The AR application program may respond with additional child program data to be received, processed, and/or used by the AR platform to further update a state of the AR content item within the AR viewer environment. As an example, a response message received from an AR application program may indicate a function to be performed or otherwise implemented by the AR platform, which may result in a change of state of the AR viewer environment or the AR content item presented therein.

Figure 17:
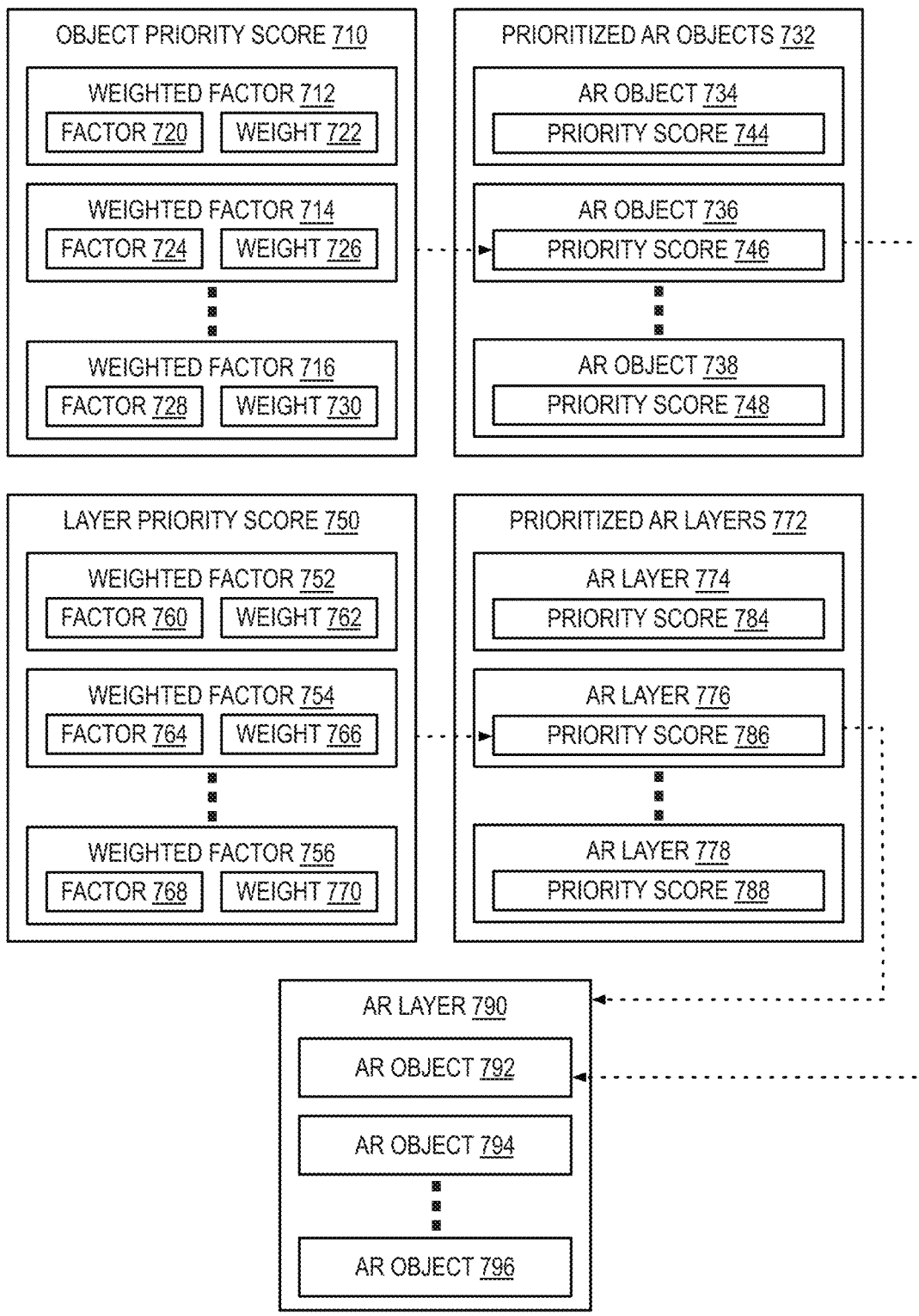
FIG. 17 depicts an illustrative framework for prioritizing AR objects and AR layers.

FIG. 17 depicts an example framework for prioritizing AR objects and AR layers. As described above, each AR object may be associated with an object priority value that defines a relative priority of that AR object within a collection of AR objects. An AR content item inherits the priority value of the AR object with which that AR content item is associated. For example, AR content item 582 may inherit the object priority of AR object 562, because AR content item 582 is associated with object 562. Each AR layer may be associated with a layer priority value that defines a relative priority of that AR layer within a collection of AR layers. In an example, each of these priority values may take the form of a numeric value that can be compared to priority values of other AR objects or AR layers to determine a relative priority within a set of AR objects or AR layers.

An object priority value may be identified for each AR object. This object priority value may be defined by a combination of weighted factors (examples listed below). A schematic representation of an example object priority value 1710 is depicted in FIG. 17. Object priority value 1710 is based on a plurality of weighted factors 1712, 1714, 1716, etc. It will be understood that an object priority value may be based on any suitable quantity and/or combination of weighted factors. Each weighted factor may be defined by a combination of at least one quantified factor and an associated weight for that factor. As examples, weighted factor 1712 is defined by a combination of factor 1720 and weight 1722, weighted factor 1714 is defined by a combination of factor 1724 and weight 1726, and weighted factor 1716 is defined by a combination of factor 1728 and weight 1730. A numerical value representing a quantified factor (e.g., 1720) and a numerical value representing its associated weight (e.g., 1722) may be combined, for example, as a product or other suitable combination of these two values to obtain a weighted factor (e.g., 1712). Weighted factors may be combined with each other, for example, as a sum or other suitable combination to obtain an object priority value for an AR object, such as object priority value 1710.

A schematic representation of example set of prioritized AR objects 1732 is depicted in FIG. 17. Prioritized AR objects 1732 include AR object 1734 having an associated priority value 1744, AR object 1736 having an associated priority value 1746, and AR object 1738 having an associated priority value 1748, etc. As an example, object priority value 1710 may refer to priority value 1746 of AR object 1736. AR objects may be ordered among each other based on their respective priority values to obtain an ordered set of AR objects. Priority between two or more AR objects may be determined by comparing object priority values, enabling AR objects to be identified as being of higher or lower priority relative to each other.

A layer priority value may be identified for each AR layer. This layer priority value may also be defined by a combination of weighted factors (examples listed below). A schematic representation of an example layer priority value 1750 is also depicted in FIG. 17. Layer priority value 1750 is based on a plurality of weighted factors 1752, 1754, 1756, etc. It will be understood that a layer priority value may be based on any suitable quantity and/or combination of weighted factors. Each weighted factor may be defined by a combination of at least one quantified factor and an associated weight for that factor. As examples, weighted factor 1752 is defined by a combination of factor 1760 and weight 1762, weighted factor 1754 is defined by a combination of factor 1764 and weight 1766, and weighted factor 1756 is defined by a combination of factor 1768 and weight 1770. A numerical value representing a quantified factor (e.g., 1760) and a numerical value representing its associated weight (e.g., 1762) may be combined, for example, as a product or other suitable combination of these two values to obtain a weighted factor (e.g., 1752). Weighted factors may be combined with each other, for example, as a sum or other suitable combination to obtain a layer priority value for an AR layer.

A schematic representation of an example set of prioritized AR layers 1772 is depicted in FIG. 17. Prioritized AR layers 1772 include AR layer 1774 having an associated priority value 1784, AR layer 1776 having an associated priority value 1786, and AR layer 1778 having an associated priority value 1788, etc. As an example, layer priority value 1750 may refer to priority value 1786 of AR layer 1776. AR layers may be ordered based on their respective priority values to obtain an ordered set of AR layers. Priority between two or more AR layers may be determined by comparing layer priority values, enabling AR layers to be identified as being of higher or lower priority relative to each other.

FIG. 17 further depicts a schematic representation of an AR layer 1790 having a plurality of associated AR objects 1792, 1794, 1796, etc. As a non-limiting example, previously described AR layer 1776 may refer to AR layer 1790, and previously described AR object 1736 may refer to AR object 792 that is associated with AR layer 1790. It will be understood that AR objects 1792, 1794, and 1796 may originate from an individual AR application program or from a plurality of different AR application programs or other data sources as previously described with reference to FIG. 5.

Factors that may be used by the AR platform to determine a priority of AR objects may differ from and/or partially overlap with factors used by the AR platform to determine a priority of AR layers. As non-limiting examples, factors used to determine an object priority value for an AR object may include one or more of the following: (1) a priority of an AR layer that the AR object is associated with, (2) which AR layers are currently active or inactive, (3) which AR objects currently have AR content items presented on-screen or within the AR view (as well as the position, size, and distance of those AR content items), (4) a distance of the AR content item from a center of the screen or AR view, (5) a distance of the AR content item from a position of the user's client device within the AR viewer environment, (6) a distance of the AR object from the user's "3D cursor" (e.g., a user's hands in a head-mounted client system), (7) a frequency with which the user interacts (or edits) with the AR object, (8) how recently the user has interacted with the AR object, (9) how recently the AR object has been modified by other users, (10) a frequency with which the user interacts with AR objects that have similar attributes (tags, author, popularity) to the AR object, (11) a social rank of the AR object among a community of users, (12) a frequency with which users have interacted with the AR object relative to other AR objects in an area, (13) how often other users or similar users have interacted with the AR object, (14) other social data, such as up-votes, down-votes, added to whitelists or blacklists, comments, views, the user's social graph, etc., (15) tag specific situational modifiers (e.g., the AR object has a "morning" tag, and the current time is within the morning, thereby raising the priority of the AR object), (16) tag relationships to a user's known preferences (e.g., user preferences may be imported from outside sources, such as a third-party social network), (17) the user's relationship to an author of the AR object (e.g., an author of an AR object will have that AR object increased in priority), (18) the user's specific geographic location (e.g., certain objects may be intended to be viewed from specific places or types of places), (19) whether the AR object is in more than one active AR layer, (20) how much of the AR object is obstructed by real world objects, (21) administrator specified values (e.g., an emergency AR layer, sponsored AR objects), (22) the user's location history, (23) the user's connected devices, (24) other apps or events on the user's device, (25) user specified priority values or other user input, (26) an amount of the user's in-game currency or transaction history.

As non-limiting examples, factors used to determine a layer priority value for an AR layer may include one or more of the following: (1) relative position or ordering of the AR layer in the layer controller interface (e.g., an AR layer located closer to the top of the list may increase the priority of that AR layer to a greater extent than an AR layer located closer to the bottom of the list), (2) a time since the AR layer was last in focus (i.e., the primary focus layer), (3) a frequency at which or how often the AR layer is in focus, (4) a frequency at which or how often the user interacts with AR objects of the AR layer, (5) a time since the user has interacted with an AR object of the AR layer, (6) an average additional priority of AR objects of the AR layer, (7) which AR objects have AR content items that are currently on-screen or within the AR view (as well as the position, size, and distance of those objects), (8) whether the AR layer is currently active, (9) a social rank of the AR layer, (10) tag specific situational modifiers (e.g., an AR layer has a "morning" tag, and the current time is within the morning, thereby raising the priority of the AR layer), (11) the user's relationship to an author of the AR layer (e.g., if the user is an author of the AR layer, then the AR layer will be prioritized), (12) administrator specified value (e.g., emergency AR layer), (13) user specified priority values or other user input. It will be understood that these factors are non-limiting examples of the various factors that may be considered by AR platform.

Figure 18:
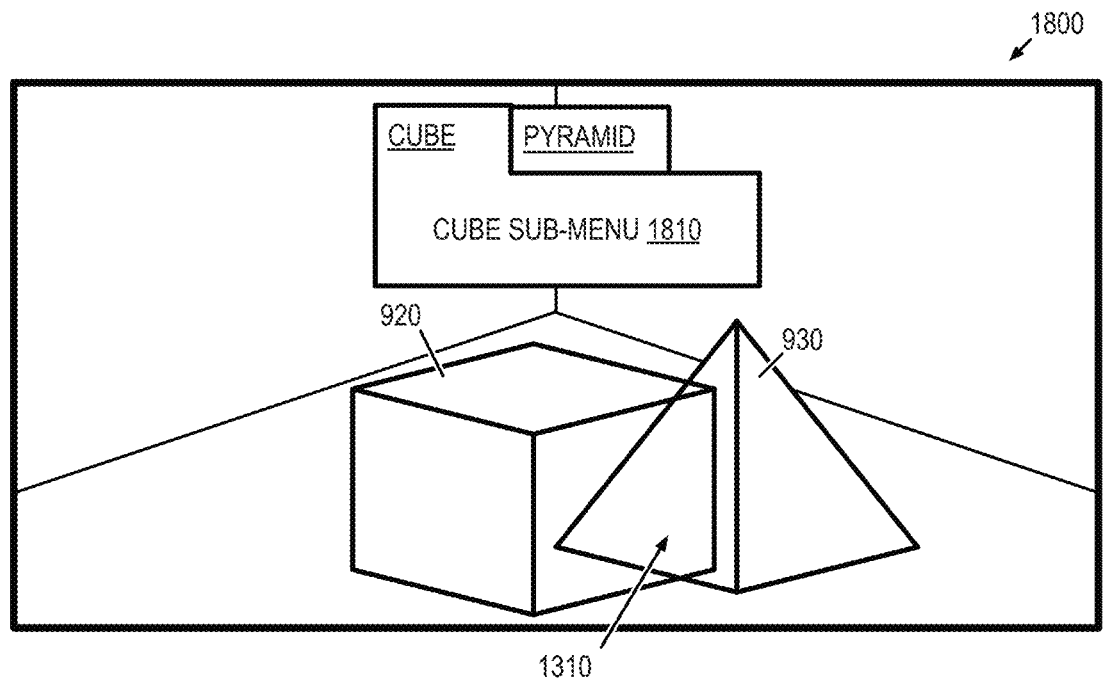
FIG. 18 depicts another illustrative AR view of an AR viewer environment.

FIG. 18 depicts another example AR view 1800 of an AR viewer environment, including previously described AR objects 920 and 930 of FIG. 9A. In this example, a region of spatial conflict 1310 is present, but a menu is also presented within the user interface that includes sub-menus for the first AR object 920 (e.g., as a sub-menu 1810) and for the second AR object 930 (e.g., as a sub-menu layer interface). A user may direct a user input to each of these sub-menu interfaces to ensure that the user input is routed by the AR platform to the intended AR object, AR layer, and AR application of that AR content item.

Figure 19:
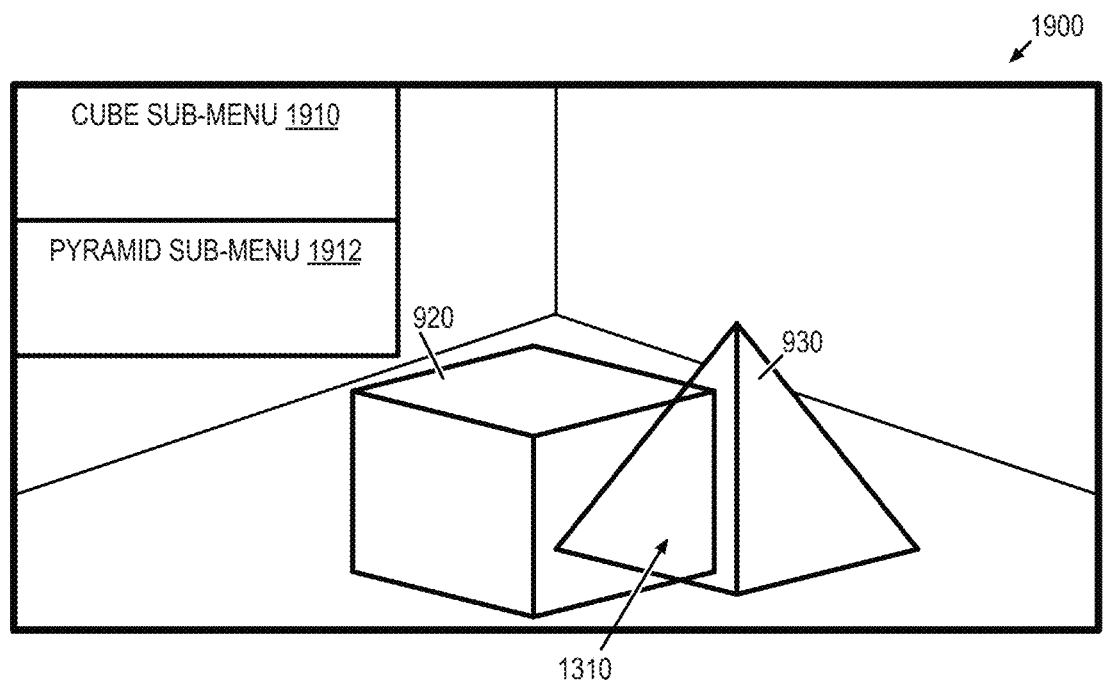
FIG. 19 depicts another illustrative AR view of an AR viewer environment.

FIG. 19 depicts another example AR view 1900 of an AR viewer environment, including previously described AR content items 920 and 930 of FIG. 9A. In this example, sub-menus 1910 and 1912 are presented for AR content items 920 and 930, respectively. An order and/or position of these sub-menus may be based on a relative priority of the AR objects and/or AR layers of these AR content items. For example, AR content item 920 may be associated with a higher priority AR layer than AR content item 930, thereby causing the AR platform to present cube sub-menu 1910 within an upper left corner of the user interface and pyramid sub-menu 1912 to be presented below cube sub-menu 1910. It will be appreciated that other suitable orientations of the sub-menus may be used based on priority. A user may direct a user input to each of these sub-menu interfaces to ensure that the user input is routed by the AR platform to the intended AR object, AR layer, and AR application of that AR content item.

In the examples depicted in FIGS. 11 and 10B, a first menu or sub-menu is associated with a first AR application program and/or a first AR object, and a second menu or sub-menu is associated with a second AR application program and/or a second AR object. The relative positioning of the first and second menus or sub-menus may include a relative positioning within a spatial dimension of the three-dimensional AR viewer environment (e.g., appear to be present within the three-dimensional AR viewer environment) or within a view provided by the graphical display device (e.g., appear to be tied to a viewpoint of the user).

Graceful Degradation and Presentation Policies

Figure 20:
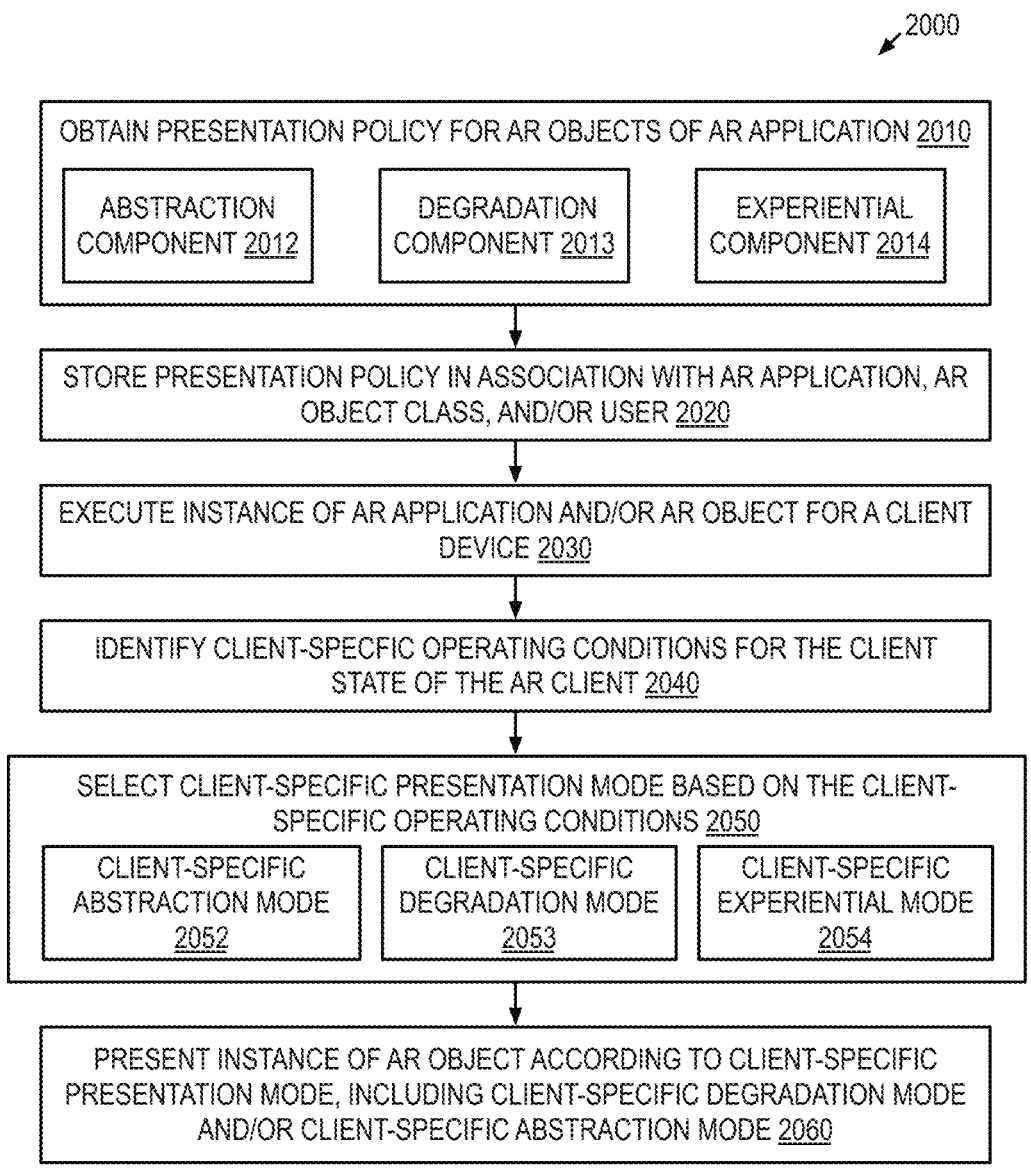
FIG. 20 is a flow diagram depicting another illustrative augmented reality method.
Figure 21:
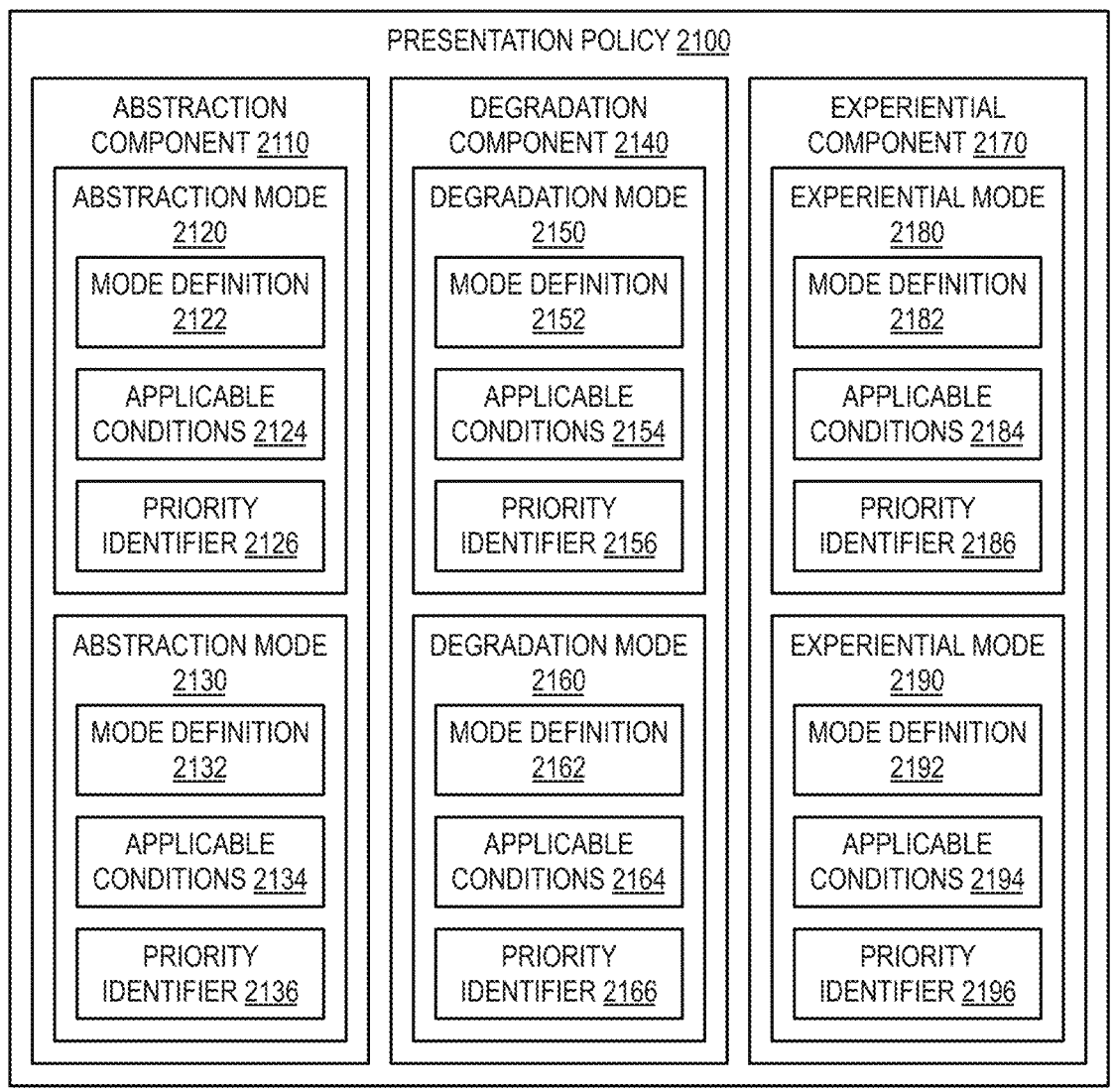
FIG. 21 is a schematic diagram depicting an illustrative data structure for a presentation policy.

As shown in FIGS. 20-21, this section describes this section describes further illustrative aspects of AR platform 110, including graceful degradation and the use of presentation policies. In general, graceful degradation may include any suitable process of downgrading the representation of an AR object (e.g., in terms of quality, abstraction, and/or experiential factors) to meet a minimum threshold of bandwidth efficiency, requirements of the user device, and/or experiential requirements (e.g., determined by developers or the AR platform), while still delivering the best experience possible.

FIG. 20 is a flow diagram depicting an example augmented reality method 2000 for implementing a graceful degradation feature of the AR platform. Method 2000 may be implemented by a computing system. In such case, method 2000 may be referred to as a computerized method or a computer-implemented method. In at least some implementations, method 2000 or portions thereof may be performed by an AR platform through an instance of a corresponding AR platform program or program component being hosted at and/or executed by a computing system.

Graceful degradation implemented by a graceful degradation feature of the AR platform may refer to one or more of: (1) programmatic reduction in a quality of an AR content item (i.e., degradation), (2) programmatic abstraction of an AR content item, or (3) programmatic replacement of AR content from an AR view with corresponding content in a different experiential view (e.g., a non-AR view, such as a map view).

At 2010, the method includes obtaining a presentation policy for a set of AR objects. As will be described with reference to subsequent operations of method 2000, the presentation policy may be implemented by the AR platform responsive to operating conditions of a client state of an AR client. Accordingly, the presentation policy may be obtained at or by the AR platform program in this example.

Depending on implementation, the presentation policy may be directed to a set of AR objects that is defined by a particular class limited to within a particular AR application, or by a particular class that spans some or all of the AR applications of an ecosystem of AR applications supported by the AR platform. Accordingly, a presentation policy for a set of AR objects may refer to (1) an individual AR object of a multi-object AR application, (2) some or all of the AR objects of a multi-object AR application, (3) a grouping of multiple AR objects across some or all AR applications of a supported multi-application ecosystem.

The presentation policy may include an abstraction component 2012 that defines how an AR object is to be programmatically abstracted by the AR platform, a degradation component 2013 that defines how an AR object is to be programmatically degraded by the AR platform, and an experiential component 2014 that defines if and how AR content (i.e., an AR content item) from an AR view is to be programmatically replaced with corresponding content (i.e., a non-AR content item) in a different experiential view. Typically, degradation refers to a reduction in quality (e.g., polygon quantity, resolution, frame rate, refresh rate, etc.) at which content (e.g., graphical content) of an AR object is presented. By contrast, abstraction typically refers to a replacement of content (e.g., graphical content) of an AR object with an abstracted representation (e.g., an icon or simplified form) of that content.

An abstraction component may have two or more abstraction modes for the set of AR objects of the AR application. These abstraction modes may be selectable by the AR platform using the presentation policy based on client-specific operating conditions. As an example, the two or more abstraction modes of the abstraction component include at least a non-abstracted version (e.g., an original form of a graphical AR content item of an AR object) and an abstracted version (e.g., an abstracted representation of a graphical AR content item of an AR object). As an example, an abstracted representation may take the form of a graphical icon that represents a graphical content item in its original form. As another example, an abstracted representation may take the form of a static image that represents a dynamic video as an original form. As another example, an abstracted representation may take the form of a flat two-dimensional object that represents three-dimensional object as an original form. The abstraction component may include any suitable quantity of abstraction modes, including three or more, ten or more, hundreds, thousands, or more abstraction modes.

A degradation component may have two or more degradation modes for the set of AR objects of the AR application. These degradation modes may be selectable by the AR platform using the presentation policy based on client-specific operating conditions. As an example, the two or more degradation modes of the degradation component include at least a lower quality version and a higher quality version for the set of AR objects. Within the context of graphical content, a reduction in quality may be characterized by a reduction in resolution, polygon quantity, refresh rate, frame rate, etc. for a graphical content item relative to its original form. The degradation component may include any suitable quantity of degradation modes, including three or more, ten or more, hundreds, thousands, or more degradation modes.

The degradation component or the abstraction component may be omitted from the presentation policy in at least some implementations or in certain contexts. In at least some implementations, aspects of degradation and abstraction may overlap with each other or may be integrated into a common framework. For example, a polygon quantity for a sphere may be reduced to a level at which the sphere has the appearance of a polyhedron, thereby providing a degree of both degradation and abstraction with respect to the sphere. Degradation and abstraction components will be described in further detail with reference to FIG. 21.

As previously described, a presentation policy may include one, two, or more selectable modes for the abstraction component and for the degradation component, along with applicable criteria for selecting those modes. Such criteria may include value ranges or thresholds to which measurements of the client state of the AR client may be compared to identify which abstraction and/or degradation modes are to be selected for a given set of operating conditions.

Additionally or alternatively, a presentation policy may include priority identifiers associated with some or all of the selectable modes of the abstraction component and degradation component. These priority identifiers may be interpreted by the AR platform (e.g., compared to each other) as a preferred selection priority of one mode relative to another mode in scenarios where two or more modes are selectable by the AR platform for a given set of operating conditions. Priority identifiers may be confined to within the abstraction component or within the degradation component to provide respective selection priorities for each component. Alternatively or additionally, priority identifiers may span the abstraction component and the degradation component to enable the AR platform to select between a degradation mode and an abstraction mode for a given set of operating conditions. Within this context, the AR platform may first filter the abstraction and degradation modes based on the operating conditions to obtain a filtered set of selectable modes, and then utilize the priority identifiers associated with the selectable modes of the filtered set to select a particular abstraction mode or a particular degradation mode from the filtered set. In at least some implementations, the AR platform may select both an abstraction mode and a degradation mode as part of operation 2050. The AR platform may include a default priority ranking of degradation and abstraction modes that may be replaced by user-defined aspects of the presentation policy. Typically, degradation modes having a lesser degree of degradation and abstraction modes having a lesser degree of abstraction will be preferred for selection over greater degrees of degradation and abstraction if the operating conditions of the client device are sufficient for the presentation of those selected modes.

In at least some implementations, the AR platform may include one or more user interfaces that enable a user to define aspects of the presentation policy. As an example, the user may define selectable modes for the abstraction component and for the degradation component, along with the applicable criteria for selecting those modes, and may assign priority identifiers to the selectable modes of the abstraction and degradation components. These and other aspects of the presentation policy may be obtained via a user interface as one or more user inputs. As an example, a user interface may take the form of a developer-user interface for a developer-user to define aspects of the presentation policy across all instances of an AR application by the developer. As another example, a user interface may take the form of an end-user interface for an end user to define aspects of the presentation policy across all or some of the AR applications of that end user.

In at least some implementations, the presentation policy or a portion thereof may be defined within the AR application. The AR application may communicate the presentation policy to the AR platform during runtime of the AR application, such as via an API. In still other implementations, the presentation policy may be retrieved by the AR platform from a network resource that publishes the presentation policy of the AR application. The AR platform may have a default presentation policy or portions thereof that is/are implemented in the absence of input from users, AR applications, or third-party sources defining the presentation policy.

At 2020, the method includes storing the presentation policy or updates to the presentation policy in association with one or more data entities within the AR system. As an example, the presentation policy may be tied to one or more data entities to provide AR layer-specific or application-specific, AR object class-specific, user-specific, etc. presentation policies. The presentation policy may be stored at or within a database system that is accessible to the AR system, within program components of the AR system, or within program components of the AR application(s). As an example, the presentation policy or portions thereof may be stored as a multi-dimensional map or selection matrix that enables the AR platform to select a particular degradation mode and/or abstraction mode based on client-specific operating conditions of the client state of the AR client.

At 2030, the method includes executing or causing execution of an instance of an AR application and/or an AR object of the set of AR objects for a client device. As an example, the instance of the AR object may be executed at or by the AR platform or a program component thereof. As another example, the AR platform may execute or cause the execution of an instance of the AR application or a program component thereof to in-turn execute or cause the execution of the instance of the AR object. Within the context of visual AR, the AR object includes graphical AR content in the form of one or more graphical AR content items that may be presented via a graphical display device.

At 2040, the method includes identifying client-specific operating conditions of the client state of the AR client. Client-specific operating conditions of the client state may include one or more of: (1) a network connection status between the client device and a network resource, (2) a processing capability of the client device, (3) hardware inputs of the client device, (4) a distance between an estimated position of the client device and a location of the AR object, (5) focus identified for the AR object, (6) priority identified for the AR object, (7) whether the AR object is being displayed as part of its native AR layer or as part of a curated AR layer.

Each operating condition may have one or more associated values that provides a measure of the client state within a domain or range of values. The operating conditions identified for the AR client including their associated values enable the AR platform to perform a comparison with the criteria defined by the presentation policy to select a client-specific presentation mode. The operating conditions of the client state considered by the AR platform may include one or more, two or more, three or more, some of, or all of: (1) the network connection status, (2) the processing capability, (3) the hardware inputs, (4) the distance between the client device and the location of the AR object, (5) the focus identified for the AR object, (6) the priority identified for the AR object, (7) whether the AR object is being displayed as part of its native AR layer or as part of a curated AR layer.

At 2050, the method includes selecting a client-specific presentation mode based on the client-specific operating conditions of the client state. As an example, the method at 2052 may include selecting a client-specific abstraction mode from among the two or more abstraction modes of the presentation policy based on the client-specific operating conditions. Alternatively or additionally, the method at 2053 may include selecting a client-specific degradation mode from among the two or more degradation modes of the presentation policy based on the client-specific operating conditions. Alternatively or additionally, the method at 2054 may include selecting a client-specific experiential mode from the two or more experiential modes of the presentation policy based on the client-specific operating conditions.

The various operating conditions that influence selection of a particular client-specific mode may be the same as or may differ among abstraction, degradation, and experiential components of the presentation policy.

As a first example, the operating conditions of the client state includes at least a network connection status; and a lower quality version of the AR object may be selected responsive to the network connection status between the client device and the network resource indicating lower network throughput or bandwidth, and the higher quality version of the AR object may be selected responsive to the network connection status between the client device and the network resource indicating higher network throughput or bandwidth.

As a second example, the operating conditions of the client state includes at least the processing capability; and a lower quality version of the AR object may be selected responsive to a processing capability indicating lower processing throughput or capability, and the higher quality version of the AR object may be selected responsive to the processing capability indicating the higher processing throughput or capability.

As a third example, the operating conditions of the client state includes at least the distance status; and the lower quality version of the AR object may be selected responsive to the distance status indicating a greater distance, and the higher quality version of the AR object may be selected responsive to the distance status indicating a lesser distance.

At 2060, the method includes presenting, at the client device, an instance of the graphical AR content item of the AR object according to one or more of the client-specific degradation mode, the client-specific abstraction mode, and/or the client-specific experiential mode. The graphical AR content item may be presented at the client device via an AR viewer of the AR platform or via a non-AR view supported by the AR viewer. Typically, the AR viewer is a client-based program component of the AR platform. However, in some implementations, the AR viewer may take the form of a general-purpose browser program (e.g., a web browser) operating at the client system, and interacting with a server-based component of the AR platform over a communications network.

In at least some implementations, the AR platform may generate the instance of the graphical AR content item in accordance with the selected abstraction, degradation, and/or experiential modes. Here, the AR platform may receive a graphical AR content item in original form from the executed AR object or AR application, and may generate an alternative form of the graphical AR content item that corresponds to the selected abstraction, degradation, and/or experiential modes. As an example, the AR platform may generate a single frame from a multi-frame video to be used as an abstracted representation of the multi-frame video. As another example, the AR platform may generate a lower resolution version of a higher resolution graphical content item.

In other implementations, the AR platform may request and receive an instance of the graphical AR content from the executed AR object or AR application that corresponds to the selected abstraction, degradation, and/or experiential modes. As an example, the AR platform may request a particular resolution and/or data size from the executed AR object or AR application, for example, as a different content item of the same AR object. The AR object or AR application may fulfill the request received from the AR platform or may provide a lower priority and/or less resource intensive content item to the AR platform as a response.

Method 2000 or portions thereof may be repeated or performed continuously to update the presentation mode of AR objects during runtime, such as where the operating conditions of the client device change. For example, some or all of the previous operations 2010 and 2020 may be performed following execution of the AR object, such as during runtime. As another example, the presentation policy may be defined, redefined, or otherwise updated or changed during runtime of the AR application and its associated AR objects. As yet another example, operating conditions of a client device or client system may change over time. Accordingly, the various operations of method 2000 may be at times performed in a different order, repeated, omitted, or may be performed in parallel.

FIG. 21 is a schematic diagram depicting an example data structure for a presentation policy 2100. Presentation policy 2100 includes an abstraction component 2110, a degradation component 2140, and an experiential component 2170. It will be understood that presentation policy 2100 is a non-limiting of a data structure that defines presentation of AR content at an AR client. Accordingly, other suitable data structures may be used to define a presentation policy.

An abstraction component may include a plurality of abstraction modes. For example, abstraction component 2110 includes abstraction mode 2120 and abstraction mode 2130. Abstraction component 2110 may include a single abstraction mode or three or more abstraction modes in another example, or may be omitted from the presentation policy. As an example, abstraction mode 2120 may refer to a non-abstracted or a lesser abstracted version and abstraction mode 2130 may refer to an abstracted or greater abstracted version of an AR object or an AR content item thereof.

A degradation component may include a plurality of degradation modes. For example, degradation component 2140 includes degradation mode 2150 and degradation mode 2160. Degradation component 2140 may include a single degradation mode or three or more degradation modes in another example, or may be omitted from the presentation policy. As an example, degradation mode 2150 may refer to a non-degraded or lesser degraded version and degraded mode 2160 may refer to a degraded or greater degraded version of an AR object or an AR content item thereof.

An experiential component may include a plurality of experiential modes. For example, experiential component 2170 includes experiential mode 2180 and experiential mode 2190. Experiential component 2170 may include a single experiential mode or three or more experiential modes in another example, or may be omitted from the presentation policy. As an example, experiential mode 2180 may refer to an AR view and experiential mode 2190 may refer to a non-AR view (e.g., a map view) of an AR object or an AR content item thereof.

Each of the abstraction, degradation, and experiential modes may include or be associated with a mode definition that identifies and/or defines aspects of the particular mode, applicable conditions that are to be present to enable programmatic selection the particular mode by the AR platform, and a priority identifier that provides a relative priority ordering of modes relative to each other. For example, mode definition 2122 of abstraction mode 2120 may define a degree of abstraction to be applied to an AR object, applicable conditions 2124 may define a minimum or maximum network connection status, processing capability, viewing distance status, etc. that is to be present for selection of abstraction mode 2120. Priority identifier 2126 may indicate that abstraction mode 2120, if selectable based on operating conditions, is to be selected over abstraction mode 2130 based on priority identifier 2136. Abstraction mode 2130 similarly includes mode definition 2132, applicable conditions 2134, and priority identifier 2136 specific to mode 2130.

Degradation mode 2150 includes mode definition 2152 specific to mode 2150, applicable conditions 2154, and priority identifier 2156; and degradation mode 2160 includes mode definition 2162, applicable conditions 2164, and priority identifier 2166 specific to mode 2160. Experiential mode 2180 includes mode definition 2182 specific to mode 2180, applicable conditions 2184, and priority identifier 2186; and degradation mode 2190 includes mode definition 2192, applicable conditions 2194, and priority identifier 2196 specific to mode 2190.

As previously described, some or all of the presentation policy data (e.g., including priority identifiers, applicable conditions, etc.) may be stored as a multi-dimensional map or selection matrix for use by the AR platform to select one or more policy modes based on client-specific operating conditions. Referring again to FIG. 3, a presentation policy may be included in platform data 364 of a server-based AR platform program and/or within platform data 334 of a client-based AR platform program.

Priority identifiers may be comparable to each other within a particular component of the presentation policy to enable the AR platform to select a particular mode for that component. For example, the AR platform may compare priority identifier 2156 of degradation mode 2150 to priority identifier 2166 of degradation mode 2160 to determine which degradation mode is to be used to present content items of an AR object. As another example, the AR platform may compare priority identifier 2186 of experiential mode 2180 to priority identifier 2196 of experiential mode 2190 to determine which experiential mode is to be used to present content items of an AR object.

Typically, if operating conditions permit the presentation of AR content items via an AR view, the AR platform will select that experiential mode. Accordingly, a priority identifier of an experiential mode that includes an AR view will typically refer to a higher priority as compared to other experiential modes that do not include an AR view. However, it will be understood that a user may manually select other experiential modes to override programmatic selection by the AR platform.

In at least some implementations, priority identifiers may be further comparable to each other across components of the presentation policy. As an example, the AR platform may compare priority identifiers of abstraction modes to priority identifiers of degradation modes to priority identifiers of experiential modes to select a particular mode for a given set of operating conditions. For example, these priority identifiers may define a hierarchy that directs the AR platform to present an AR view with no abstraction or degradation if possible or available based on the operating conditions, followed by an AR view with some level of abstraction and/or some level of degradation if possible or available based on the operating conditions, followed by a non-AR view.

Aspects of the presentation policy or portions thereof may be defined on an individual user basis (e.g., based on settings within a user account), on an individual AR layer basis (e.g., based on metadata contained in or associated with the AR layer), on an individual AR object basis (e.g., based on metadata contained in or associated with the AR object), and/or by the AR platform. For example, referring also to FIG. 3, platform data 364 and/or 334 of the AR platform may define or include some or all of the presentation policy. As another example, child program data 374 and/or 342 of a native AR layer may define or include some or all of the presentation policy for that native AR layer and its associated AR objects and their various content items. Referring also to FIG. 6, layer metadata 618 may define or include some or all of the presentation policy for AR layer 610, such as within layer data 626, and/or object metadata 646 may define or include some or all of the presentation policy AR object 632, such as within object data 654.

As previously described, the various methods, operations, processes, or portions thereof described herein may be tied to a computing system of one or more computing devices. In particular, such methods, operations, and processes may be implemented as a computer-application program or service, an application-programming interface (API), a library, and/or other computer-program type.

Illustrative Data Processing System

Figure 22:
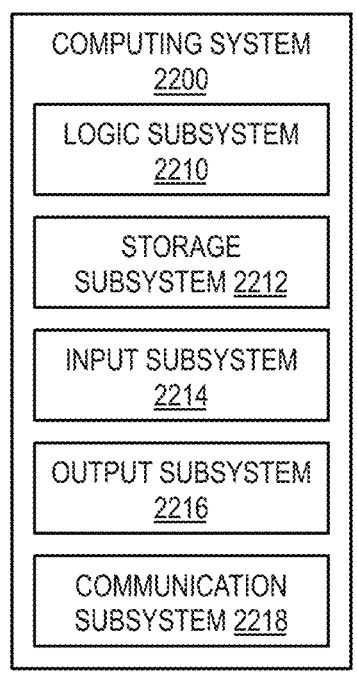
FIG. 22 schematically depicts a non-limiting example of a computing system.

As shown in FIG. 22, this example describes an illustrative data processing system 2200 (also referred to as a computer or computing system). In this example, computing system 2200 is an illustrative data processing system suitable for implementing aspects of AR platform 110 described herein. More specifically, in some examples, devices that are embodiments of data processing systems (e.g., smartphones, tablets, personal computers, server computers, mobile computing devices, electronic controller devices, wearable devices, and/or other computing devices).

Computing system 2200 includes a logic subsystem 2210 and a storage subsystem 2212. Computing system 2200 may further include an input subsystem 2214, an output subsystem 2216, a communication subsystem 2218, and/or other components not shown in FIG. 22.

Logic subsystem 2210 includes one or more physical logic devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic machines configured to execute hardware or firmware instructions. Processors of the logic subsystem may be single-core or multi-core, and the instructions executed thereon may be configured for sequential, parallel, and/or distributed processing. Individual components of the logic subsystem may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 2212 includes one or more memory devices (e.g., physical and/or non-transitory memory devices) configured to hold instructions executable by the logic subsystem to implement the methods and processes described herein. When such methods and processes are implemented, the state of storage subsystem 2212 may be transformed—e.g., to hold different data. Storage subsystem 2212 may include removable and/or built-in devices. Storage subsystem 2212 may include optical memory devices, semiconductor memory devices, and/or magnetic memory devices, among other suitable forms. Storage subsystem 2212 may include volatile, nonvolatile, dynamic, static, read/write, read-only, random-access, sequential-access, location-addressable, file-addressable, and/or content-addressable devices. Aspects of logic subsystem 2210 and storage subsystem 2212 may be integrated together into one or more hardware-logic components. While storage subsystem 2212 includes one or more physical devices, aspects of the instructions described herein alternatively may be propagated by a communication medium (e.g., an electromagnetic signal, an optical signal, etc.) that is not held by a physical device for a finite duration.

The terms "module," "program," and "engine" may be used to describe an aspect of computing system 2200 implemented to perform a particular function. In some cases, a module, program, or engine may be instantiated via logic subsystem 2210 executing instructions held by storage subsystem 2212. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc. A "service", as used herein, may refer to a program that is executable across multiple user sessions. A service may be available to one or more system components, programs, and/or other services. In some implementations, a service may run on or be hosted by one or more server-computing devices.

Input subsystem 2214 may include or interface with one or more user-input devices such as a keyboard, mouse, touch screen, microphone, camera, etc. Input subsystem 2214 may include or interface with one or more sensor devices, such as inertial sensors, optical sensors, GPS or other geo-positioning receivers or sensors, for example. Output subsystem 2216 may include or interface with one or more user-output devices such as a graphical display device, touch screen, audio speakers, haptic/tactile feedback device, etc.

Communication subsystem 2218 may be configured to communicatively couple computing system 2200 with one or more other devices. Communication subsystem 2200 may include wired and/or wireless communication devices compatible with one or more different communication protocols. As non-limiting examples, the communication subsystem may be configured for communication via a wired or wireless WAN, LAN, or PAN. In an example, the communication subsystem may allow computing system 2200 to send and/or receive messages to and/or from other devices via a communications network.

As described herein, a variety of information in the form of data may be measured, collected, received, stored, retrieved from storage, processed, analyzed, organized, copied, reported, and/or transmitted in raw and/or processed forms. Data includes a set of one or more values (i.e., data values) of one or more parameters or variables. Such values may be quantitate or qualitative in nature. Data may be represented by one or more physical quantities, attributes, or characteristics of one or more signals or object states.

An object state refers to a physical state of a tangible, physical object, such as a device or machine. Within the context of a computing system or other electronic system, an object state may include a value of a bit stored in a memory cell or other suitable bistable/multistable electronic circuit (e.g., flip-flop or latch) of a memory device. As an example, a value of a bit may be defined by a high or low physical voltage value of a memory cell, corresponding to values of 1 or 0 for the bit, respectively.

Data represented by one or more signals (i.e., data signals) may be propagated by a communication medium, in the form of electrical signals, electromagnetic signals, optical signals, etc. Data signals may be communicated over one or more wired and/or wireless communications links or paths. Data signals may be formatted or otherwise organized into one or more messages, streams, packets, datagrams, and/or frames as defined by one or more communications protocols. Data may be represented in a variety of digital and/or analog forms.

A collection of data may take the form of a set instructions that are executable by a machine (e.g., a computing device) to perform one or more operations. Such instructions may be referred to as machine-readable or executable instructions that direct the machine to perform one or more operations. A set of instructions may take the form of software or a portion thereof (e.g., a software component). Software may include firmware, an operating system, an application program or other program type, a software plug-in, a software update, a software module, a software routine, or other software component.

An organized collection of data may take the form of a database system or other suitable data structure (e.g., an electronic file). A database system includes one or more databases that define relationships and associations between and among data objects. As an example, a data object (e.g., a user identifier) that includes a set of one or more data values may be associated with one or more other data objects (e.g., a user setting). A database system may be integrated with or form part of a program or program component.

Data may include metadata that describes other data. Metadata describing the structure of other data, such as a relationship or association of data objects in a database may be referred to as structural metadata. Metadata describing the content of other data may be referred to as guide metadata. A collection of data may include metadata and other data described by that metadata.

AR Platform for IoT Devices

As shown in FIGS. 25-34, this section describes an illustrative augmented reality (AR) platform for network-connected physical devices, such as Internet of Things (IoT) devices. The AR platforms described below are examples of AR platform 110. Any or all of the features and aspects of platform 110 described above may be combined with or present in the AR platforms described below.

In general, and in accordance with the aspects of AR platform 110 described above (see, e.g., FIG. 3), an AR platform for IoT devices may include an AR platform program running on a server, an AR platform program running on a client device, and a child application running inside the client-side AR platform program. The child application comprises an AR object. Data from one or more IoT devices may be used as inputs for one or more scripts of this AR object (e.g., for displaying the data in an AR view). Similarly, one or more scripts of the AR object may send data as output to one or more IoT devices. This data may cause the IoT device(s) to alter their real-world operation states (e.g., an IoT light may turn on or off). The user may interact with this AR object to effectively interact with in the IoT device. The user may also view, edit, copy, delete, share, and/or reassign aspects of the AR object, and may grant or be granted permissions relating to any of these actions. Information relating to how users interact with shared AR objects may be tracked and/or used to filter the objects and/or collect object-related (e.g., popularity-based) data.

In this context, an AR object script may include any suitable set of instructions contained in, and executable by, an AR object on an AR platform. Scripts may include features of an AR object and/or AR application layer that enable users, other AR content, or themselves, to manipulate, visualize, or interact with the AR object or layer in a variety of ways. For instance, instructions for rotating AR objects relative to a user's point of view, generating animations, and calling a certain phone number associated with an AR application layer are all examples of scripts. Scripts may be activated by events, assets, and/or by other scripts. Scripts can be used to define rules such (e.g., physics rules) and the behavior of objects based on those rules.

As described above, AR objects (e.g., AR object 562) are the building blocks that make up AR applications and AR layers. In some examples, AR objects may be required to have a relationship to the real world and have some sort of output (visual, auditory, haptic, etc.). AR objects may be shareable objects or non-shareable objects (also referred to as dependent objects). A shareable AR object, or shareable object, is an AR object that has permissions set such that the object can be included and used or otherwise experienced outside of its "native" or "parent" AR layer, e.g., in a curated AR layer (e.g., curated AR layer 536). This native/parent layer is typically the layer in which the object was created. In some examples, a shareable AR object may contain social data. In some examples, a shareable AR object may be published by a user/creator, where publishing may involve changing the viewing permissions of the shareable AR object such that additional users may view and interact with the object.

The term "publish" or "publishing" in this context may include any suitable process for making AR content available on an AR platform and enabling the AR content to be discoverable by the platform's users (as specified by one or more permission settings). This process may include the provision of metadata (e.g., categories and tags), the formatting of abstracted AR content, and/or the transfer of data to one or more servers to make the link discoverable by search engines, crawlers, and the AR platform itself.

Publishing of a shareable AR object may involve changing the editing and sharing permissions of the shareable AR object. In some examples, publishing may involve adding the shareable AR object to various AR layers and/or feeds.

In general, the terms "shareable AR object" or "shareable AR content" may refer to any suitable AR object or content (e.g., as defined by a developer) that permits users to interact with, modify, like, vote on, comment on, place into an AR curated layer or layers, and/or the like, outside of the native AR Layer of the object or content. Shareable objects and content may contain a variety of media, including graphics, animations, sound, models, meshes, and the like. These shareable AR objects may be authored by users, within confines defined by the developer.

Conversely, "dependent" AR objects are those that do not have permissions to be used or seen outside of their native/parent AR layer. For example, a dependent AR object may contain scripts, or may be created by AR application layer developers for use in or as interfaces, backgrounds, world representation, non-player characters (NPCs), and/or the like.

Expanding on the concept of permissions, AR object permissions may generally include data that dictates which actions a user can perform with respect to which AR objects, and which actions can be performed by which AR objects with respect to the user. For example, AR object permissions may include the ability to access the AR object for public access, for a private group (e.g., premium/paying members), for an individual user (e.g., the AR object developer), and/or the like. Generally speaking, the AR object permissions allow or disallow various actions on or by AR objects. AR object permissions may be tied to the AR object and/or to a user (e.g., a user object).

In some examples, AR object permissions may include personal permissions, e.g., permissions that are tied to a user, a class of user, or a user object. For example, "ownership permissions" may be given to a creator or owner of an AR object. An ownership permission, or the like, may permit a user to change any component of an AR object, similar to administrator rights for that object. Ownership is a "root" permission for the AR object, and may be assigned to a user object. However, in certain embodiments, mere creation of an AR object may not automatically, impart any AR object permissions. Also, for example, AR object permissions may be assigned to a class of user or otherwise grouped into larger permissions categories. For example, the ability to edit and delete an AR object may be grouped into a category such as a Developer Permissions category. Also, for example, certain AR objects may have AR object permissions that restrict the ability to view those objects to paying users, such as in so-called "freemium" business models. In some examples, AR object permissions may be applied to a class of users based on location, such that only local or onsite users may create an AR object tethered to the location. In some examples, custom-defined permissions may emerge, such as where developers creating content in an AR layer may define additional permission types, ad hoc, to be applied to the new AR objects belonging to that AR layer.

Permissions can also be provided for AR layers themselves, which substantially follow the same logic as AR object permissions. Giving a user permissions for a curated layer enables access to the AR objects within that layer. This provides a method of granting permission for several AR objects with a single action. Adding an AR object to a curated layer may allow all users with permissions for that layer to access that AR object. In combination, these capabilities effectively enable "group permissions" functionality.

As described in greater detail above, an "AR application" may include any suitable program that outputs AR content (and instructions which define behaviors of capabilities of that AR content) for an AR-ready device or system. Child applications (also referred to as child apps and/or AR application layers) may output content from a single content provider, or a restricted set of trusted providers. A "parent application" (also referred to as a parent app or an AR browser) may support content from many developers. Both are examples of an AR application. Said another way, an AR application layer (also referred to as a child application) may include an AR layer supported with its own layer-level scripts. Child apps may be authored and published by developers, and subscribed to by users. Generally, child apps comprise groups of dependent AR objects used to create and/or interact with shareable AR objects, and may be focused around specific tasks (typically oriented towards entertainment, information, or productivity).

Figure 23:
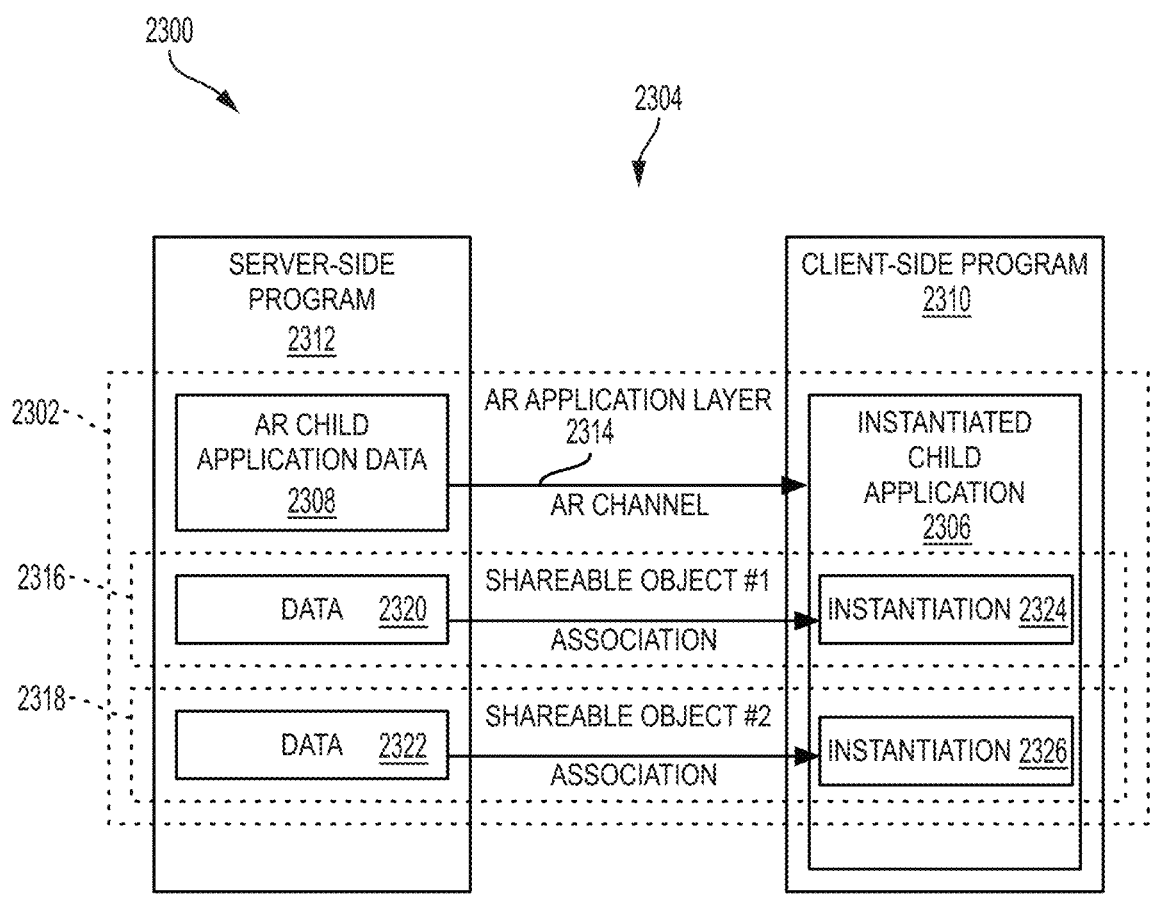
FIG. 23 is a schematic diagram of an illustrative AR platform including shareable AR objects.

FIG. 23 is a schematic representation of an illustrative AR platform 2300 having an AR application layer 2302 within the context of a client-server interaction over a communications network (e.g., a computer network) generally indicated at 2304. As previously described, e.g., with respect to FIG. 3, AR application layer 2302 includes a child application instance 2306 that is instantiated by a client-side program 2310 of AR platform 2300. AR application layer 2302 further includes AR child application data 2308 that is received from a server-side program 2312 of the AR platform over an AR channel 2314. Server-side program 2312 may support many concurrently instantiated child applications (e.g., application 2306) of respective AR application layers (e.g., layer 2302), along with their respective AR channels (e.g., channel 2314). These child applications may be instantiated on several different devices. AR application layer 2302 further includes one or more shareable objects, such as example shareable objects 2316 and 2318 in FIG. 23. Each of these shareable objects includes server-side data (data 2320, 2322) and is instantiated by the child application program (instantiations 2324, 2326).

Figure 24:
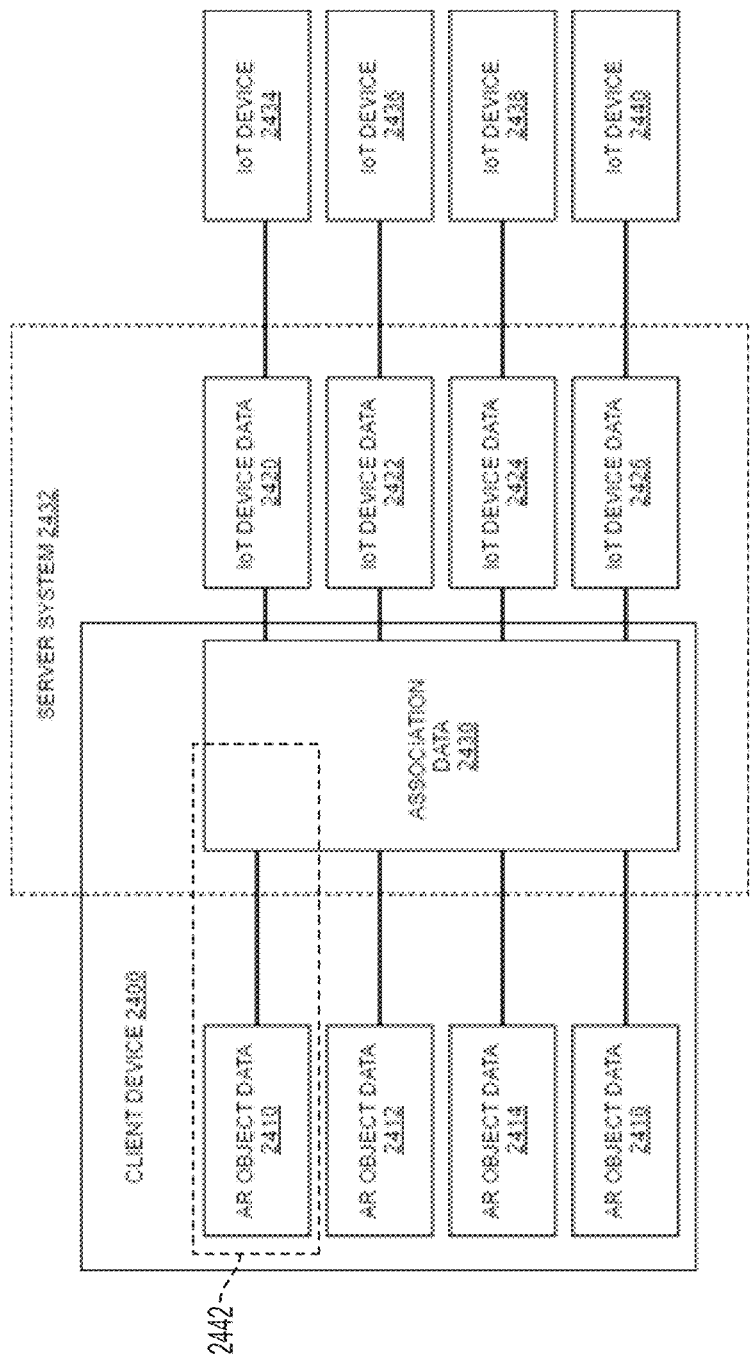
FIG. 24 is a schematic diagram of illustrative shareable AR objects associated with corresponding illustrative network-connected physical devices.

FIG. 24 depicts a schematic representation of shareable objects (e.g., shareable object 2442) having AR object data 2410, 2412, 2414, and 2416 on a client device 2400, being associated with IoT devices 2434, 2436, 2438, 2440; examples and aspects of which are described herein with reference to FIGS. 25-34. A shareable object may be a component of a curated AR layer or AR application layer, as described above. Shareable objects include one or more AR object data items, such as AR object data items 2410, 2412, 2414, 2416. Within the disclosed AR ecosystem, AR objects may be identified and distinguished from each other by unique or pseudo unique AR object identifiers. Accordingly, each AR object data item may include a corresponding AR object identifier. In some examples, this AR object identifier may be the previously described AR object referrer.

As described above, an AR object may refer to a type of data object that is interoperable across different parts of the AR platform. An AR object may include modular components, such as assets and scripts, and may be the lowest level objects that users can directly interact with (I.e., bottom-level objects). As an example, AR object assets may include the graphical content that is displayed via a graphical display device (e.g., a see-through display of a wearable AR device or a touch-screen of a mobile device, etc.) to provide an AR view to a user. An AR object may be stored in a plurality of configurations within the AR platform. This includes exclusively in servers of the AR platform or in third-party servers, or exclusively on user devices, or a mix of both. For instance, AR objects may be cached on the client-side program of the AR platform, AR object data may exist on the server, and/or IoT device data may exist on the client device.

Shareable objects may be associated with one or more IoT device data items (and by extension with one or more IoT devices), such as IoT device data items 2420, 2422, 2424, 2426. Shareable AR object 2442 in FIG. 24 includes AR object data 2410 and related association data 2430. This association data may associate the shareable AR object with IoT device data 2420 or with any suitable combination of one or more IoT device data items. In some examples, shareable object 2442 also includes the associated IoT device data.

Each of these IoT device data items may include a referrer to a respective IoT device. As a non-limiting example corresponding to the previous example, IoT device data item 2420 may refer to an IoT door lock, and IoT device data items 2422, 2424, and 2426 may refer to IoT light bulbs. Within the disclosed IoT ecosystem, IoT objects may be identified and distinguished from each other by unique or pseudo unique IoT device identifiers. Accordingly, each IoT device data item may include a corresponding IoT device identifier. In some examples, this IoT device identifier may be the described IoT device referrer.

Shareable objects include association data 2430 that links the shareable objects to IoT device data items. Linking through association data 2430 may include, for example, unconditional association (e.g., a direct link) and/or conditional association (e.g., using an if/then rubric). As a non-limiting example, association data 2430 may include the logic rules depicted in FIG. 29 or 30 with respect to the If/Then statements described in those examples. It will be understood that any suitable logic statements and rules may be included as part of a shareable object beyond the examples provided herein.

In general, association between the AR object data items and the IoT device data items may be established using any suitable method. A non-exhaustive list of example methods follows. In some examples, the IoT device may be GPS-enabled, and the user's mobile device can look up all IoT devices within a certain range, seeing the IoT device in question as part of a list of nearby available devices. The user may then choose to own/associate a shareable object with the IoT device.

In some examples, having created a username and password to buy a particular IoT device, the user may then use this username and password combination to gain "ownership" of the IoT device, and associate AR content with the device. In some examples, the user's device may look at IoT devices on the local area network (LAN), and allow association to any of those devices. In some examples, the IoT device may be Bluetooth- or ad hoc WiFi-enabled, allowing the user's Bluetooth-enabled mobile device to connect and associate with the IoT device. In some examples, the user's mobile device may scan an identifying QR code, or marker, possibly on the IoT device itself. In some examples, computer vision (CV) methods may be used to recognize individual IoT devices and associate with them. In general, computer vision (also referred to as machine vision) may include any suitable methods and systems for acquiring, processing, analyzing, and understanding images and dimensional data from the real world to produce numerical or symbolic information. For example, one form of computer vision can be used to determine a scene's geometry from various hardware inputs on a mobile device, such as cameras and sensors.

Once an IoT device has been associated/owned, a position of the device in space may further be generated or determined by any suitable method, e.g., by Bluetooth triangulation, object recognition, registration to an object's point cloud, the scanning of a QR code, tracking to a marker placed on the IoT device. Some methods may require additional authentication, such as by using the client device being used to buy the IoT device initially, a password (possibly with a username attached, both of which may be indicated on the IoT device), the scanning of the QR code or marker on the IoT device, the recognition of a near field communication (NFC) chip in the IoT device, the confirmation of biometric data of the user by the IoT device, and/or the like, or any combination of these.

Figure 25:
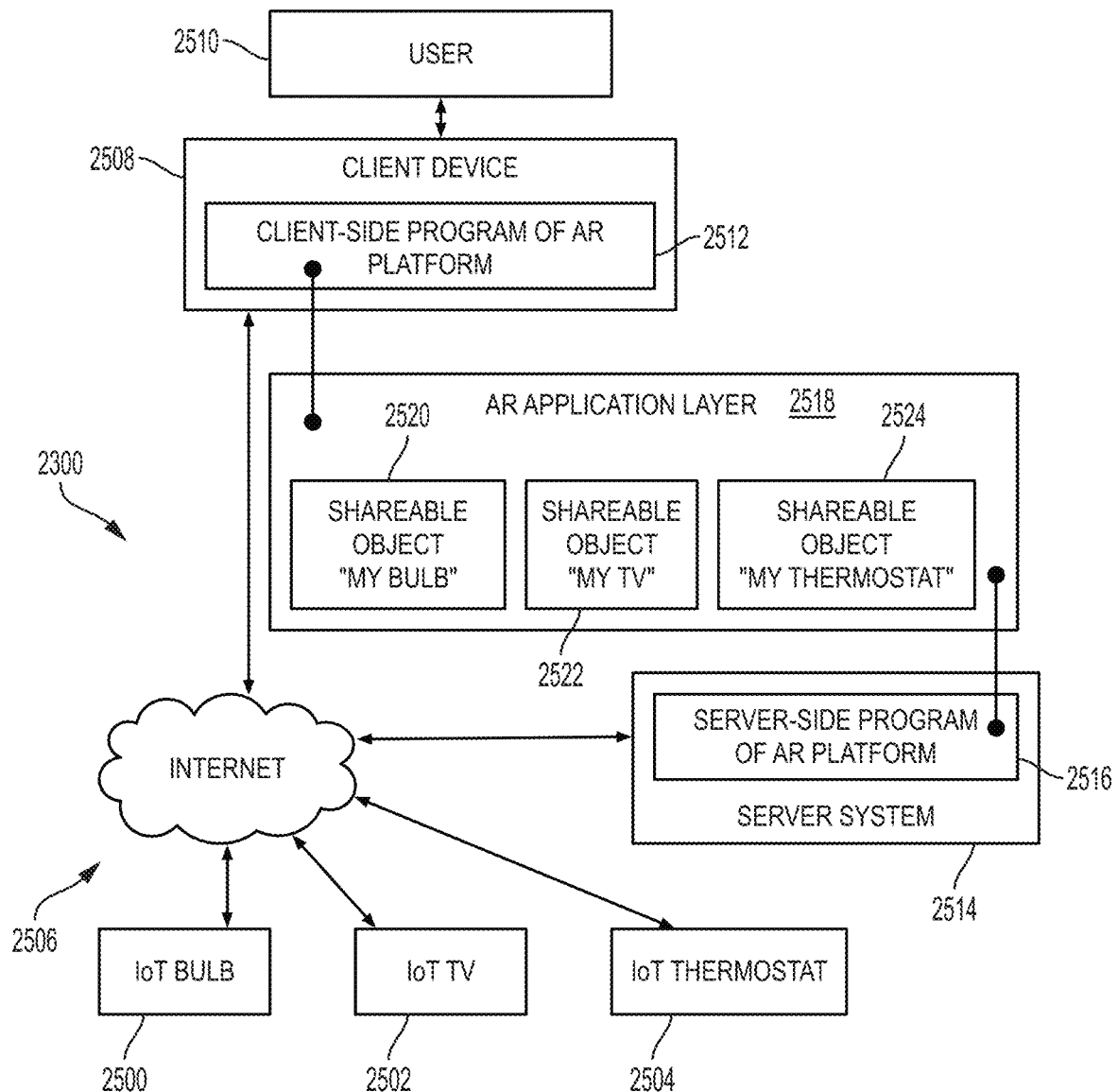
FIG. 25 is a schematic diagram of an illustrative AR platform showing relationships between client-side, server-side, network, and IoT devices.

FIG. 25 is a schematic representation of a computing system that includes AR platform 2300 and three IoT devices 2500, 2502, 2504 interacting with each other via a communications network 2506, such as the Internet. In this example, a client device 2508 represents a device (e.g., a smart phone) that is operated by a human user 2510. Client device 2508 implements the client-side program 2512 of the AR platform, as an example corresponding to child application 2306 being instantiated by client-side program 2310 (see FIG. 23).

A server system 2514 (e.g., a server, server cluster, etc.) implements a server-side program 2516 of the AR platform, corresponding to server-side program 2312 described above (see FIG. 23). An AR application layer 2518 is established (similar to AR application layer 2302, above), and may be referred to in this example as a "Universal IoT Layer." AR application layer 2518 may include one or more shareable objects spanning the client-side and server-side programs as described above with reference to FIG. 23. For example, AR application layer 2518 may include three shareable objects, a first shareable object 2520 (called "my bulb"), a second shareable object 2522 (called "my TV"), and a third shareable object 2524 (called "my thermostat").

In this example, IoT devices 2500, 2502, and 2504 are physical devices in the real world, where device 2500 is an IoT light bulb, device 2502 is an IoT television, and device 2504 is an IoT thermostat. The shareable objects are each associated with a corresponding IoT device, such that shareable object 2520 is associated with device 2500, shareable object 2522 is associated with device 2502, and shareable object 2524 is associated with device 2504. Accordingly, each shareable object can be accessed by user 2510 to interact with the respective IoT device.

This interaction may include viewing of status or state, viewing of settings, changing of settings, rule-based control of the IoT device, dynamic real-time control of the IoT device, and/or the like, or any combination of these. In some examples, the shareable AR object takes the form of a specific class of shareable AR object provided for each IoT device. This class may be defined (by first or third party developers) to use API's specific to the IoT device in question, to access the IoT device's data and/or controls. In some examples, these classes of shareable AR Object may "inherit" from a Universal IoT shareable AR Object class. This class includes a unified method of storing and displaying data "values" from the IoT devices. These values can be used as inputs and outputs from an If/Then AR object, which has support for handling booleans as well as numerical values and custom state-sets. A custom state set is a software object with an arbitrary number of states. In one implementation, each state is a number or a string. However, each state can be any software object for which a function exists that returns a hashable value. These states are predefined, and the "value" of the setting can be selected from one of these states.

In some examples, a shareable AR object (e.g., object 2520) may be used to display one or more settings from an IoT device (e.g., IoT light bulb 2500). In a first step, an IoT interface script of AR object 2520 queries IoT device 2500 (over network 2506) regarding the state of the IoT device's variables or settings. In response, software or firmware of IoT device 2500 checks the state of each requested setting, and sends the state of the setting(s) back to the IoT interface script of AR object 2520 via network 2506. The IoT interface script is configured to then set a respective internal variable of AR object 2520 to reflect the state of each of the IoT device settings. A display script of AR object 2520 may then be called to determine what should be rendered on the display (e.g., "on" or "off" for a binary setting). The display script may make function calls to cause the renderer to display the appropriate text or imagery on user device 2508 when the scene is rendered as part of the display of the AR object.

Continuing with this example, a shareable AR object may be used to change a setting of an IoT device, e.g., in response to a user action. First, mobile device 2508 of user 2510 registers a user input, and activates the AR platform program. The display script of AR object 2520 is then called, which determines how the setting should be changed based on the user input, and changes the internal state variable of the AR object to reflect the change. For example, the user may have indicated (e.g., with a tap of an icon) that the setting should be changed from "on" to "off." The internal state variable for that setting is then changed to "off." When the IoT interface script runs, possibly in response to the variable value change, it notes the change in the internal state variable and sends a command through the network to change the corresponding IoT device setting. The IoT device software receives this command, and interfaces with IoT device 2500 hardware to enact the intended change in the device.

Figure 26:
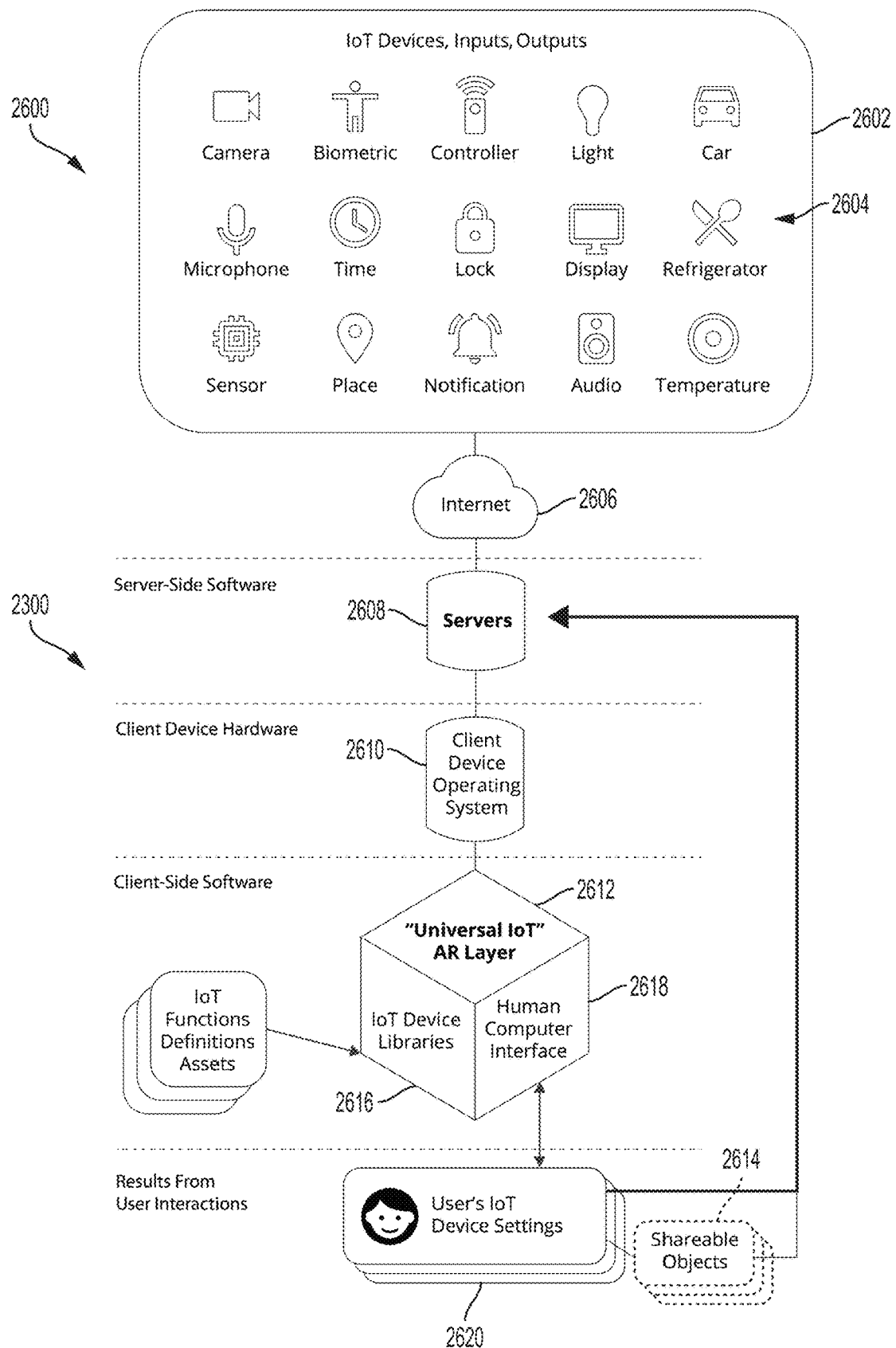
FIG. 26 is a schematic diagram of an illustrative AR ecosystem including IoT devices.

FIG. 26 is a schematic overview diagram depicting aspects of an AR ecosystem 2600 having an AR platform structure within the context of an IoT use-scenario. Box 2602 at the top of the figure represents an arbitrary collection of IoT devices 2604, as well as sensors and/or real-world factors which may be used as an input or output. IoT devices 2604 connect to the Internet or other communications network 2606 (e.g., personal area network (PAN), local area network (LAN), and/or wide area network (WAN)). It will be understood that reference to the Internet throughout the present disclosure may alternatively or additionally include one or more PANs, LANs, and/or WANs. Network 2606 connects to one or more servers 2608 of AR platform 2300.

Servers 2608 implement server-side programs of the AR platform (e.g., server-side programs 2312 or 2516). In some examples, the server system of the AR platform may be replaced with or augmented by on-premises smart hubs that communicate with client devices of users and/or IoT devices via personal area networks or local area networks without necessarily traversing the Internet.

AR platform servers 2608 connect to one or more client devices 2610 via network 2606. The client-side program of the AR platform includes an AR application layer 2612. As described above with respect to FIG. 25, this AR application layer includes an instantiated AR platform application program (referred to as "Universal IoT") (e.g., program 2512). The AR application layer further includes child application data received from servers 2608 of the AR platform, and one or more shareable objects 2614 (see discussion above and with respect to shareable objects 2316, 2318, 2520, 2522, and 2524). AR application layer 2612 contains IoT device libraries and code 2616 used to display a human-computer interface 2618 (as appropriate) to a human user of the client device 2610.

The user may create IoT device settings 2620. At least some of these IoT device settings may take the form of shareable objects 2614. In some examples, a shareable object may be used to change the settings of an IoT device. This may be done by creating a shareable object and associating that object with the IoT device. The user then uses the interface of the shareable object to change the settings of the IoT device. As part of "Universal IoT" layer 2612, this process may include viewing the IoT device using user's device 2610, and then using an input method (e.g., a double tap, a button press, etc.) to indicate the user's desire to create a shareable AR object associated with this IoT device.

Additionally or alternatively, a button or other GUI element may be assigned to "create new shareable AR settings object." As part of the process of creating the shareable AR settings object, the object is associated with one or more IoT devices. In some examples, the user may instead associate an existing shareable settings object not yet associated with any IoT devices.

As an example, an IoT light bulb device may have a brightness setting (% brightness) with various states: "On" (100% brightness), "Off" (0% brightness), and a plurality of intermediate levels (1%-99% brightness). An AR object (e.g., in the shape of a dial or slider) may be created and associated with the IoT light bulb. The user can then interact with the AR object, e.g., by turning the dial or sliding the slider, to change the settings of the IoT light bulb, thereby affecting the level of brightness it produces. In some examples, a similar AR "dial" object could further be associated with several IoT light bulbs in a given room or area, and be interacted with to change all of their settings collectively. In some examples, this AR dial object could further be associated with another AR object—this time an AR object that appears as the end of a power cord plugged into a wall outlet. Interacting with the AR power cord (e.g., pulling the plug) changes the settings of all AR objects connected to it (including the AR dial) to "off." The associated IoT devices (including the aforementioned IoT light bulbs) would then respond by turning off.

Shareable AR objects may be copied. This involves a function call implementable by developers for shareable objects. The function may be called by a shareable object itself, if the developer chooses. For example, a developer may implement a UI interface for an object that allows a second user to copy a first user's shareable object. This is useful for when a second user wants to edit an AR object, but the second user does not have permissions to edit that object. As a solution, the second user copies the first user's object, and then edits the copy (in effect, "forking" the AR object). On a programmatic level, a new specific AR object is made from the AR object class that the original AR object was a part of. The metadata of the original AR object is then copied over to the new AR object, and that metadata is appended to in order to reflect the fact that the new object is a copy. The developer's code can then choose to copy any AR object-specific data from the original AR object to the new AR object (i.e., the copy). The position of the new AR object may be the same as the original (with visual presentation made harmonious by the conflict mitigation system described above), or the developer may alter the positioning parameters slightly as part of the copying process.

In some examples, the new AR object may be associated with a new IoT device. In some examples, settings may be copied from a first AR object to a second AR object, thereby applying those settings to the IoT device associated with the second object. Both AR objects may be associated with the same IoT device, or with different IoT devices having compatible settings. When multiple AR objects are associated with the same IoT device, each AR object may provide a different level of control to a different user.

Copy permissions may be set, allowing AR objects or users to copy a portion of another AR object, such as copying only the settings. In some examples, the settings may be copied from the first AR object to the second AR object. In other examples, the settings of the first AR objects may be copied as a new (i.e., third) AR object.

One AR object may be associated to multiple IoT devices, so long as all of the IoT devices are of the same type or have the same (or compatible) set of settings. The settings of this AR object apply to all IoT devices associated with it. For instance, a shareable "lightswitch" AR object may be created for a room and associated with the multiple different IoT-enabled lights in the room. The user may then change the setting of the lightswitch AR Object from "on" to "off," thereby changing the settings of all three of the IoT devices simultaneously.

Figure 27:
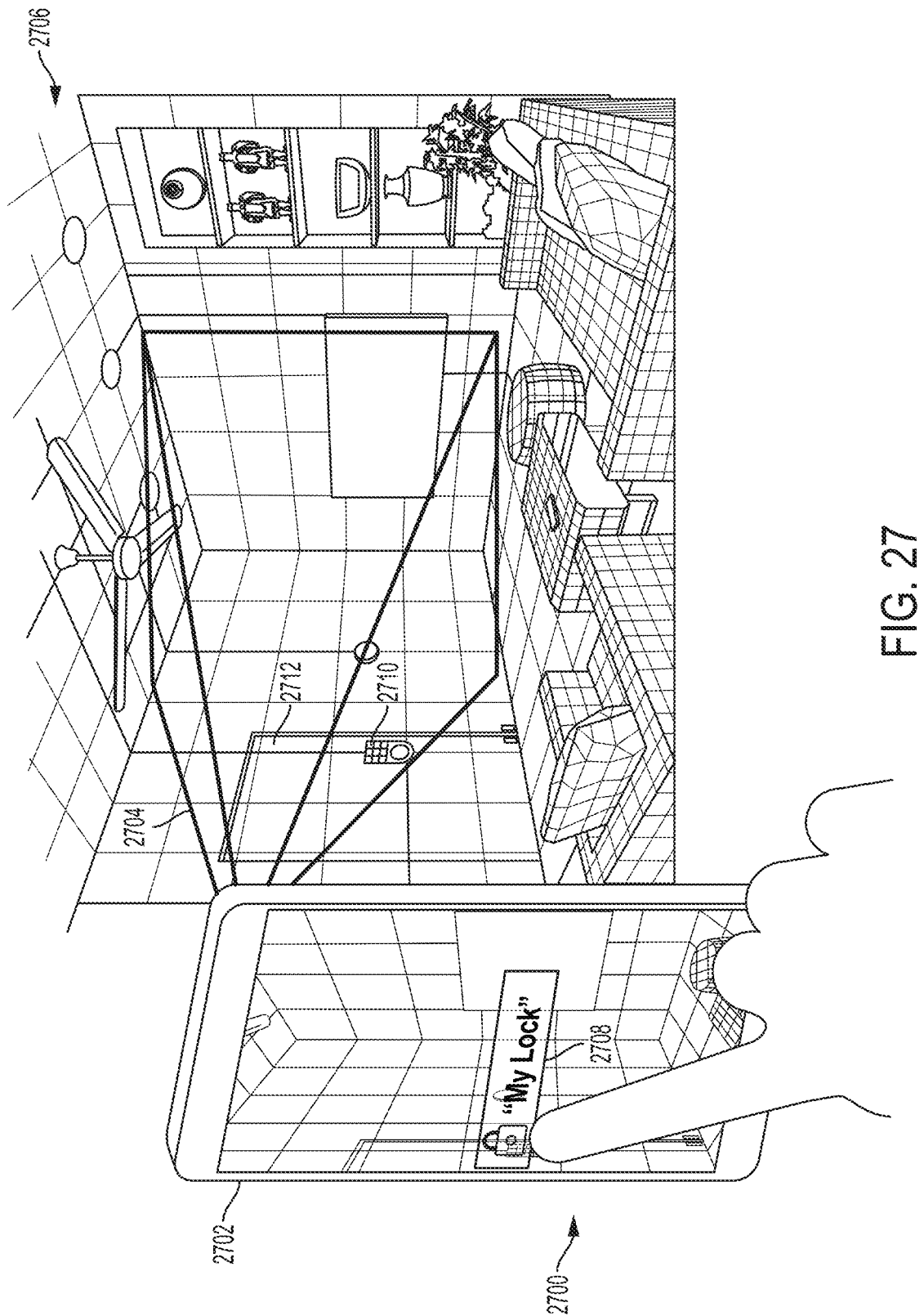
FIG. 27 depicts an illustrative AR interface in use in a room having IoT devices therein.

FIG. 27 depicts an example AR interface 2700 on an illustrative mobile device 2702 (e.g., a user's smart phone). In the depicted example, device 2702 is performing an initial room spatial mapping (indicated at 2704) of an illustrative room 2706. The user is also performing an initial IoT device setup. The point of view (POV) of device 2702 and the POV of the user are depicted. Here, the mobile device has scanned the room and generated geometry (e.g., a data representation of the physical space). Such scanning may be enabled by a computer vision (CV) library that may be included as part of the AR application layer. As part of the IoT device setup, the user is shown as assigning a label 2708 (e.g., "My Lock") to an identified IoT device 2710 (e.g., an IoT door lock situated on a door 2712 of the room).

Figure 28:
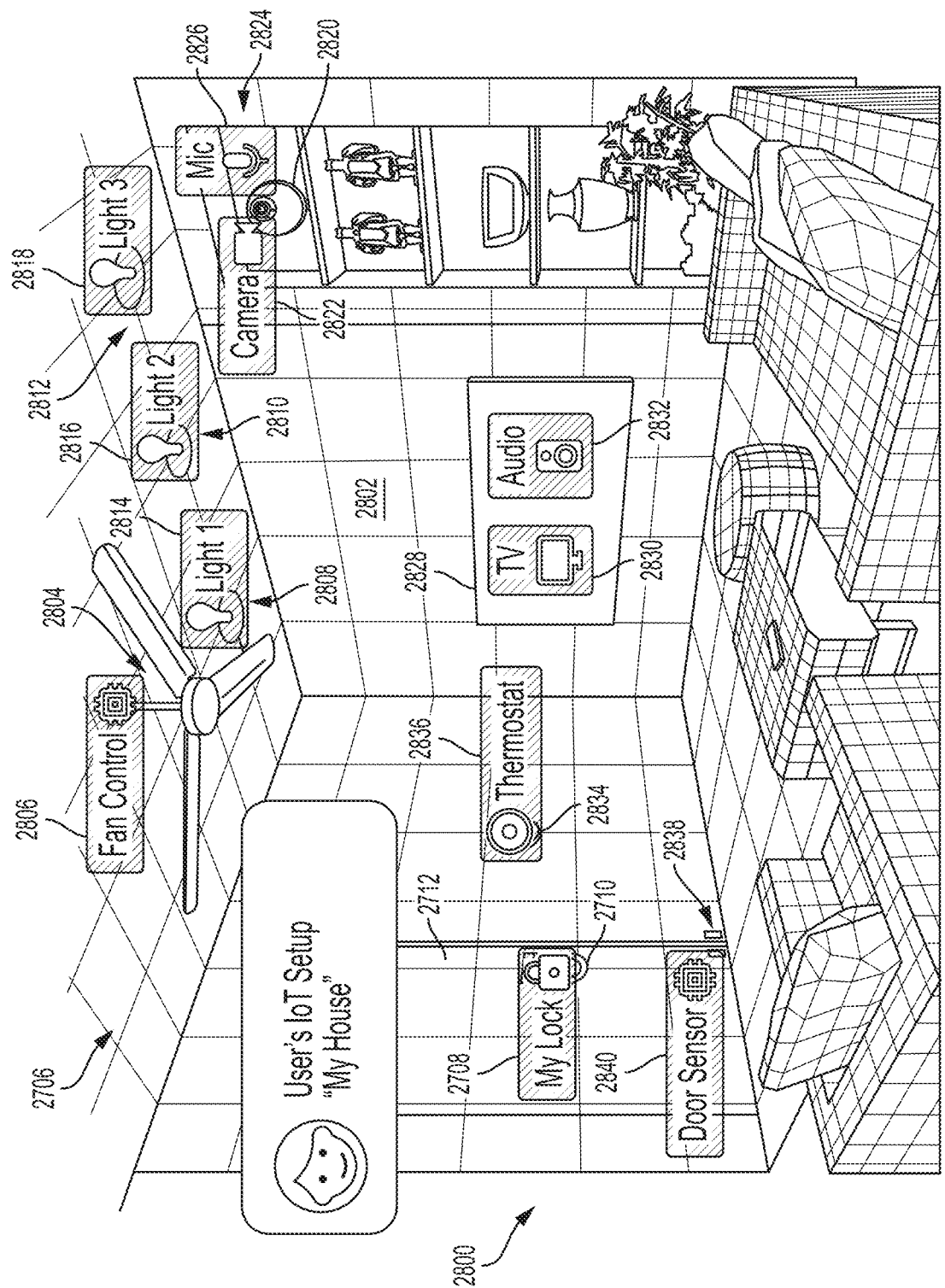
FIG. 28 depicts an illustrative AR setup for various examples of IoT devices in a room.

FIG. 28 depicts an example AR view 2800 of IoT-AR interface 2700 in which multiple IoT devices have been setup and are located in a spatial map 2802. AR view 2800 of FIG. 28 may be presented via interface 2700 of mobile device 2702, as shown in FIG. 27. Here, the user has completed setting up and identifying several IoT devices in room 2706 (e.g., via user input interaction with the mobile device). The IoT devices are located on a spatial map in AR view 2800. These IoT devices are shown using dependent AR objects, which are interface elements included with the AR application. In the depicted example, the IoT devices and associated AR objects include the abovementioned door lock 2710 (and AR object 2708 "my lock"); a fan controller 2804 (and AR object 2806 "fan control"); a first lamp 2808, second lamp 2810, and third lamp 2812 (and AR objects 2814, 2816, 2818); an imaging device 2820 (and AR object 2822 "camera"); a microphone 2824 (and AR object 2826); a sound-enabled television or other display screen 2828 (and AR objects 2830 "tv" and 2832 "audio"); a thermostat 2834 (and AR object 2836); and a door sensor 2838 (and AR object 2840).

The user has grouped all of these AR objects into a single collection, and labeled it "My House." AR view 2800 represents an example of a completed setup and association of IoT objects, and the resulting interface provided via a mobile device. It will be understood that a mobile device may include handheld mobile devices (e.g., smartphones, tablet computers, etc.) and/or wearable devices such as head mounted graphical displays (e.g., AR glasses), among others.

Figure 29:
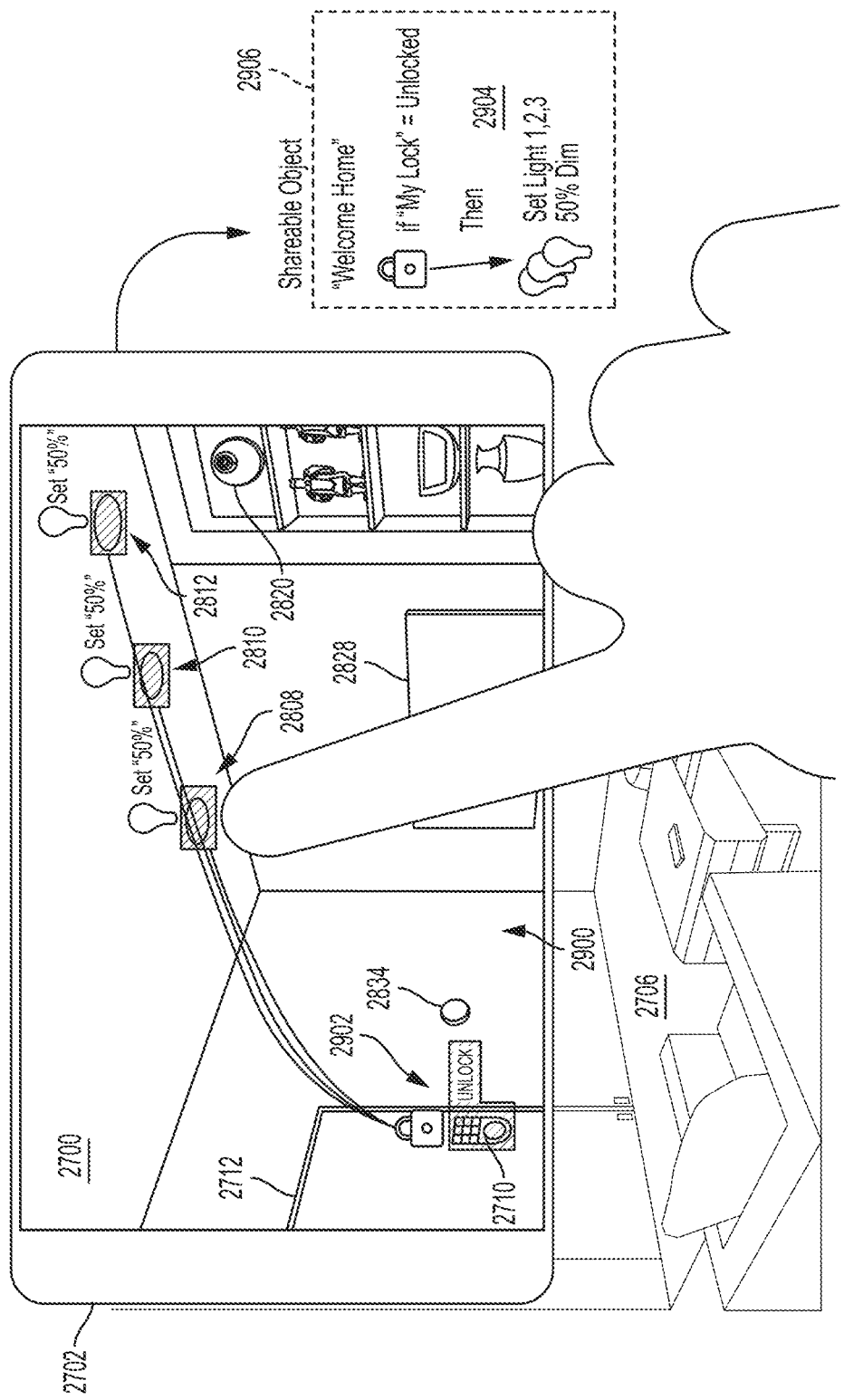
FIG. 29 depicts an illustrative AR view on a user device, with an accompanying schematic illustration of an exemplary shareable AR object.

FIG. 29 depicts an illustrative aspect of IoT-AR interface 2700 presented via mobile device 2702 in which device orchestration and shareable object creation is performed. Here, using the mobile device, the user views door lock 2710 and three smart light bulbs 2808, 2810, 2812 within an AR view 2900. Via a touch interface of the mobile device (or other suitable user input interface) a user has selected the lock's trigger attribute "unlock" (indicated at 2902), and set the behavior of the three light bulbs using an If/Then method 2904. A shareable object 2906 is created based on and responsive to this user interaction. The resultant shareable object 2906 is named "Welcome Home" by the user, and shows a simplified version of the settings for clarity. In this example, when the user unlocks the door, the three light bulbs are instructed to turn on at a 50% brightness setting.

Method 2904 described above comprises a method contained in shareable object 2906. In some examples, a more generalized method functionality is provided. For example, rule- or condition-based (e.g., if/then) shareable AR objects may be incorporated into the functionality of the Universal IoT layer. These objects can be linked between AR settings objects, and have adjustable conditional actions. For example, such an AR object can be linked to the door sensor settings AR object, thereby receiving input as to whether the door is opened or closed. The AR object can also be linked to an IoT light settings AR object, and be set up such that if the door setting is "open" then the light is set to "on." Alternatively, for instance, if the light has a luminosity setting from 1-100, then that setting could be set to a specific number (e.g., "75") when the door is opened. Similarly, in the example of an IoT-enabled space heater, the device can be connected to an IoT-enabled thermostat through an if/then AR object such that the heater would turn "on" when the temperature is under 60 degrees, and off when the temperature is over 70.

Figure 30:
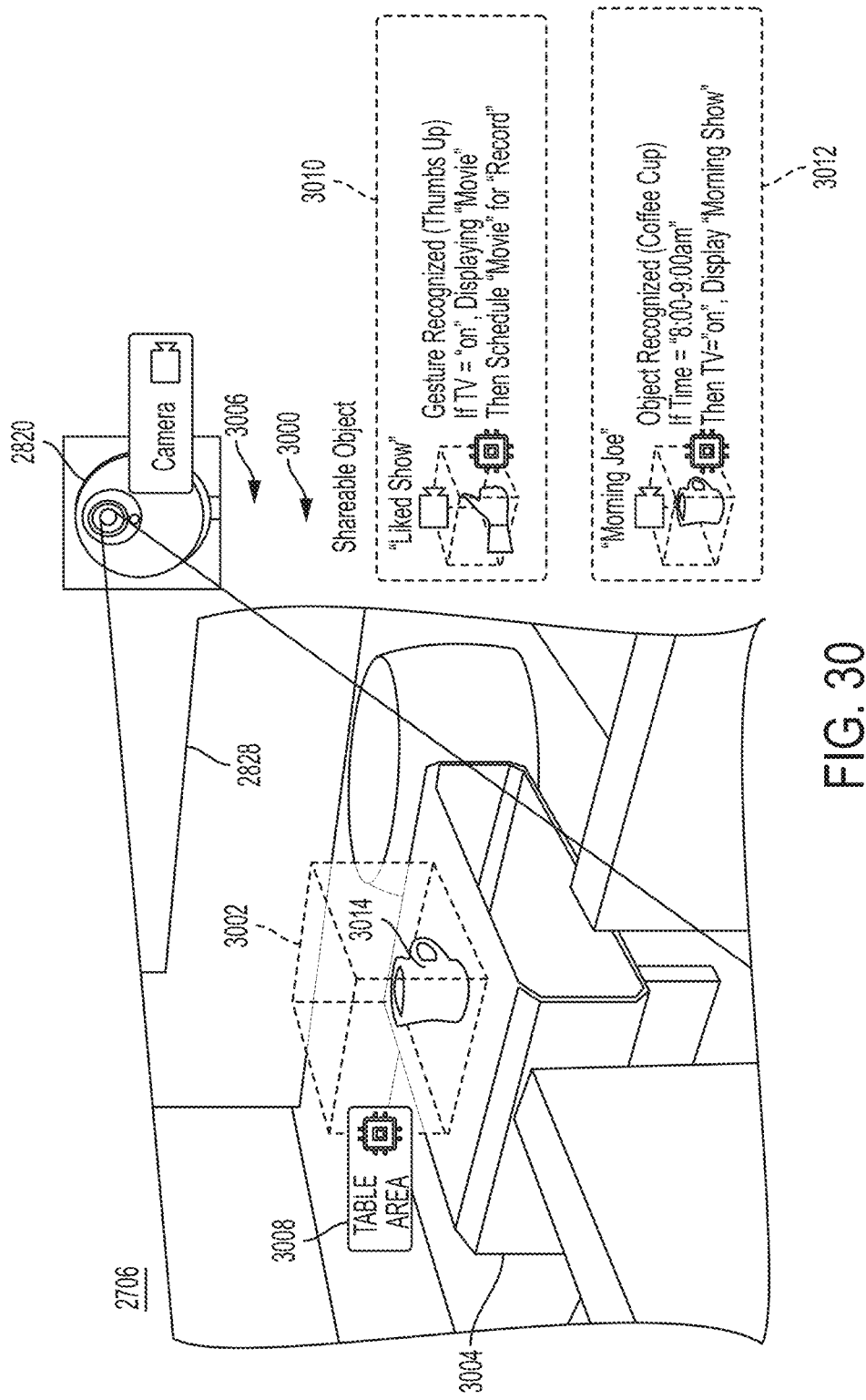
FIG. 30 depicts an illustrative sensor system including an AR defined volume and imaging device.

FIG. 30 depicts an illustrative AR-based sensor system 3000, in which a sensor is created using an arbitrary AR defined volume in combination with an imaging device. In general, for any one of an IoT device's sensors that is used to register a change in the environment, the scope of the area or volume in which this change is registered may be defined through the use of an AR shape. For example, an AR object in the form of a cube or sphere may be positioned, resized, and changed by a user. Note that the relative position and orientation of the IoT device's sensor to the user's mobile device needs to be roughly ascertainable.

FIG. 30 depicts an example in which such an AR defined volume is implemented as an AR cube 3002 located on a table 3004. The AR defined volume (i.e., cube 3002) may be viewed by the user via an AR view 3006 presented via the user's mobile device. AR cube 3002 (the AR defined volume) is identified as "Table Area" 3008 in FIG. 30, and functions as an IoT sensor (in combination with imaging device 2820), despite the AR defined volume being a virtual object. This is enabled by using imaging device 2820 (e.g., a camera located on a shelf of the room) to monitor the space defined by AR cube 3002. Further capability is provided by gesture and/or object recognition provided by the AR application layer.

Also depicted in FIG. 30 are two exemplary shareable objects 3010 and 3012 which take advantage of the AR defined volume and accompanying AR sensor functionality. Shareable object 3010, referred to as "Liked Show," is a shareable object that causes the currently playing program on screen 2828 to be added to an IoT-enabled DVR's recording schedule when the TV is on and the "thumbs up" gesture is recognized in AR cube 3002. Shareable object 3012, referred to as "Morning Joe," is a shareable object that turns on the TV and tunes to a particular program when a coffee mug 3014 is recognized in AR cube 3002 between 8 am and 9 am. In each of these examples, the TV and DVR are IoT devices.

The spatial definitions of an AR defined volume (e.g., AR cube 3002) may be assets or components of an AR object, rather than an entire AR object itself. In other words, the spatial definitions of an AR defined volume may be visually represented as an AR content item within a greater AR object. While these spatial definitions may be visually represented by a media file that makes up the AR content item, how other components of the AR object are affected is represented by other object-specific files, such as scripts and miscellaneous files. For example, an AR object "flying dragon" could contain one set of AR object-specific files (3D models, audio files, scripts, etc.) representing the visualization and behavior of a cartoon dragon that flies around an area. That same AR object could include another set of object-specific files, that visualize as a bounding box, and contain scripts that tell the dragon it cannot travel beyond the boundaries.

Figure 31:
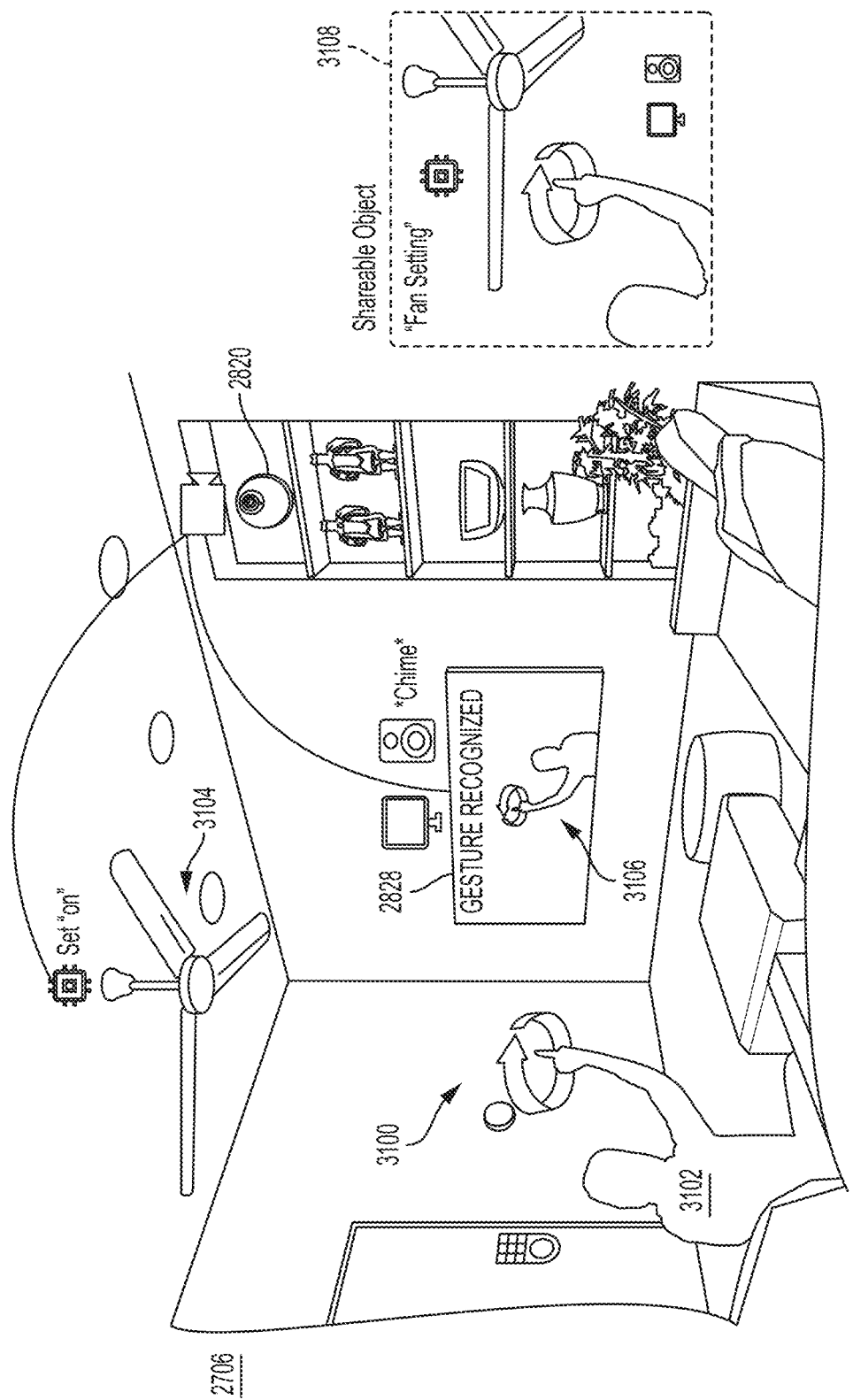
FIG. 31 depicts an illustrative gesture control system and accompanying exemplary shareable AR object.

A shareable AR object may be created to capture a desired sequence of events that do not necessarily include the mobile device or an AR view. For example, FIG. 31 depicts an example of gesture recognition and gesture control of an IoT device, in which a camera feed is used to provide on-screen confirmation of the gesture. Similar to the concepts described with respect to FIG. 30, a gesture 3100 may be performed by a user 3102 (e.g., a hand or arm motion) within a physical space being imaged by imaging device 2820, rather than being performed within an AR defined volume. In this example, such a gesture activates a ceiling fan 3104. Here, a confirmation 3106 of the gesture is displayed on TV 2828 and a chime is emitted from the speakers to confirm the system has detected and completed the operation. A shareable object 3108 may be created from this sequence, linking the gesture and corresponding device settings. The view depicted in FIG. 31 may include an AR view provided by a mobile device. However, an AR view is not necessarily required in this example. User 3102 may interact with IoT devices (e.g., a fan, a television, a speaker, etc.) without a mobile device, due to the presence of the imaging device or other suitable sensor.

Figure 32:
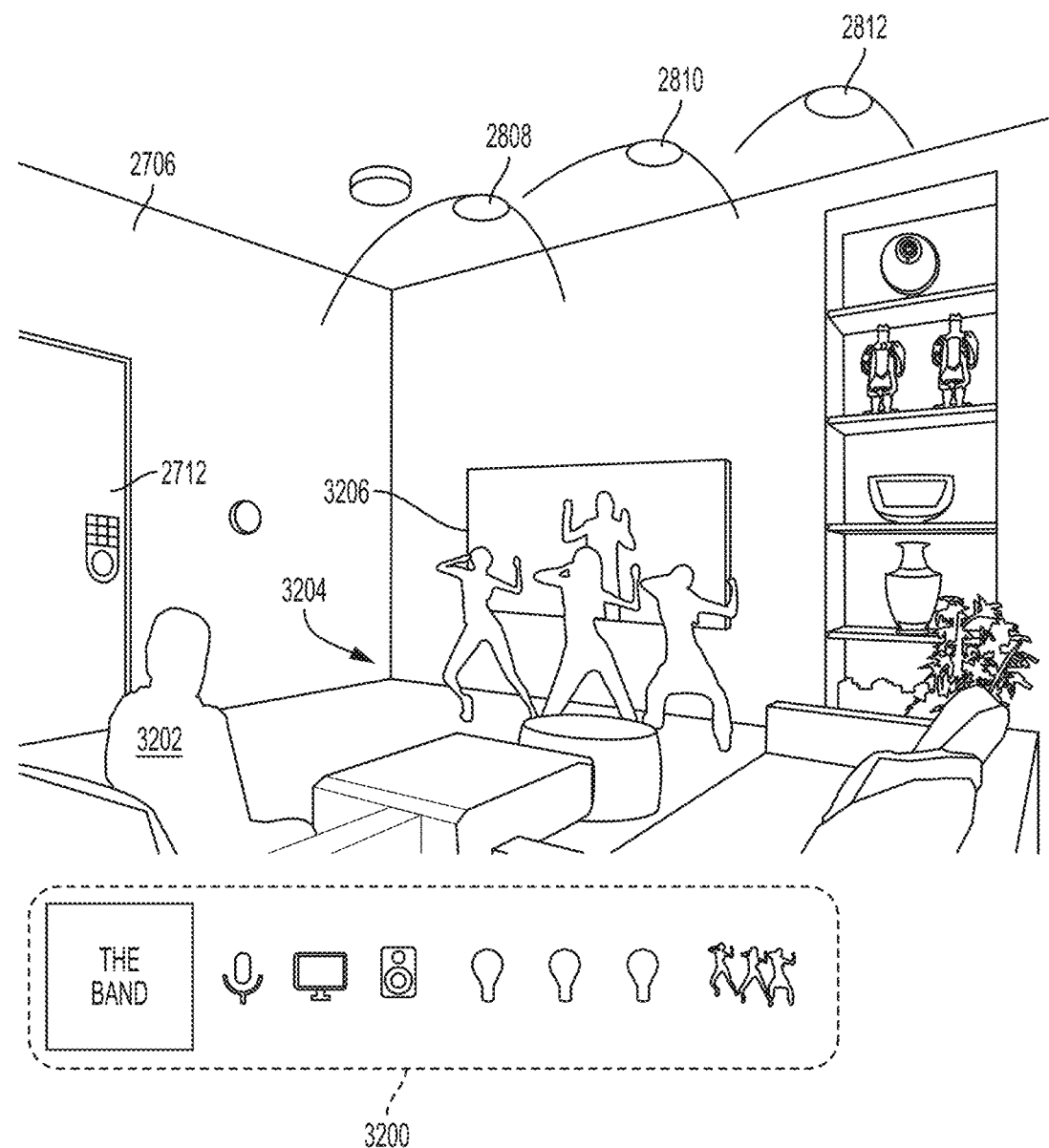
FIG. 32 depicts an illustrative AR display provided by a third party, and associated shareable AR object.

FIG. 32 depicts aspects of an external or third-party shareable object 3200, in which a band provides an IoT and AR experience to a user 3202. In this case, a third party has created shareable AR object 3200 which is being experienced by user 3202. A band has released a coordinated AR light show with their latest music video. Part of the shareable object also includes three virtual "backup dancers" 3204 which are displayed in front of the TV playing their music video 3206. User 3202 is capable of viewing the video, AR light show, and AR dancers using a mobile device (e.g., a head mounted display). Note that the real lights 2808, 2810, 2812 may also be reproduced on virtual backup dancers 3204. This lighting effect can be included in the 3D assets of shareable object 3200. If the shareable object registers that IoT lights are present, effects can be enabled on the virtual models to produce interesting effects of blending the real world with the virtual objects. For example, real-world lighting produced by light bulbs 2808, 2810, 2812 can be blended with virtual lighting presented with the virtual object dancers. In some examples, user 3202 may have permissions to edit the shareable object to create new effects and combinations, for example adding more AR lights, different AR characters, or locking door 2712 to avoid interruptions whenever the video is played. In some examples, multiple users may collaborate to edit shareable objects such as object 3200 in real time. This may be done in a collocated group setting, for example, by granting permissions to the applicable child application layer based on users' GPS coordinates being in the right location.

In general, this concept of collaborative editing or "hot-editing" may include alteration of the AR content and sending of the alterations to the other participants in the AR event via the network. Another participant can receive, visualize, alter, and send back the AR content creating a "change" event based on the interactions of the participant. The process can continue, and the devices participating in the AR event can continuously change the augmented reality content and synchronize it with the network (or other system).

In addition, the example of FIG. 32 illustrates the concept that an IoT enabled device can inform the AR system of the state of the device, and the AR system can render AR objects differently based on that state. For example, shareable AR object 3200 may include instructions to change the AR lighting effects based at least in part on a state of IoT lights 2808, 2810, and/or 2812. For example, if the lights are off, the AR lighting effects may be set to a lower brightness setting than they would be if the real-world lights were on.

Figure 33:
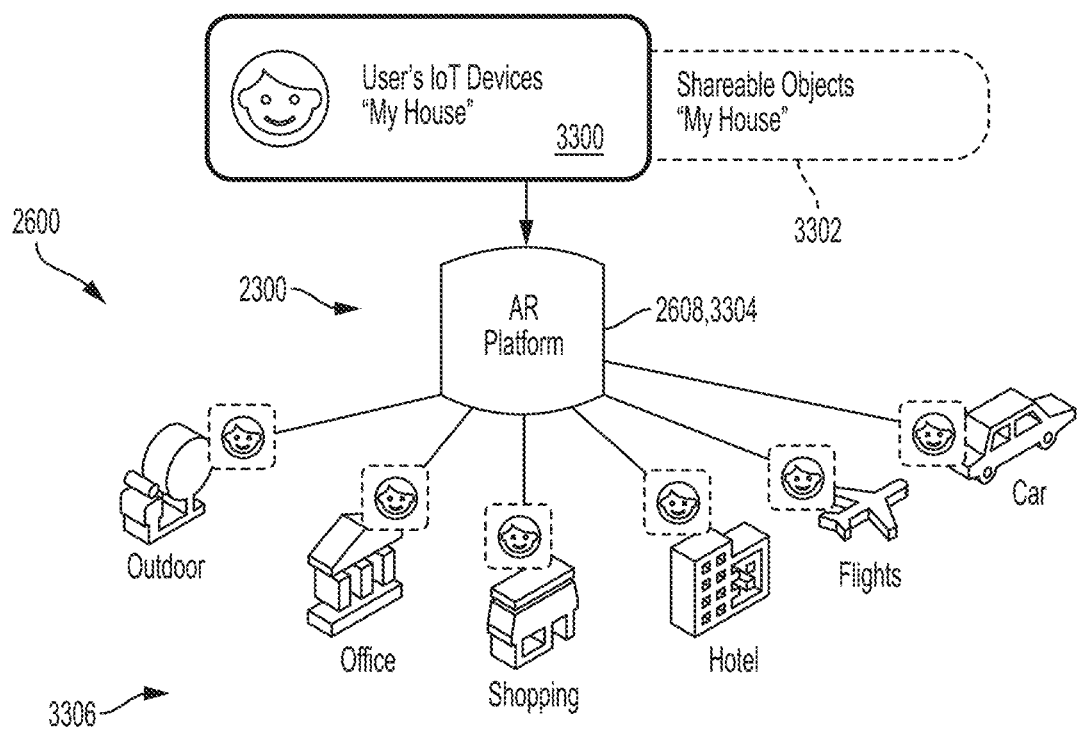
FIG. 33 depicts an illustrative AR platform having portable shareable AR objects and settings.

FIG. 33 depicts aspects of user settings on the AR platform/ecosystem 2600. Generally speaking, wherever compatible IoT exists, shareable objects may be used. A user's IoT setup 3300 (see FIG. 28), named "My House," also contains shareable objects 3302. This information and settings are saved on, e.g., servers 2608 using server-side software. Shareable AR objects 3302, e.g., settings objects, may be transited to other locations 3306 where that user has authenticated with local IoT devices.

Figure 34:
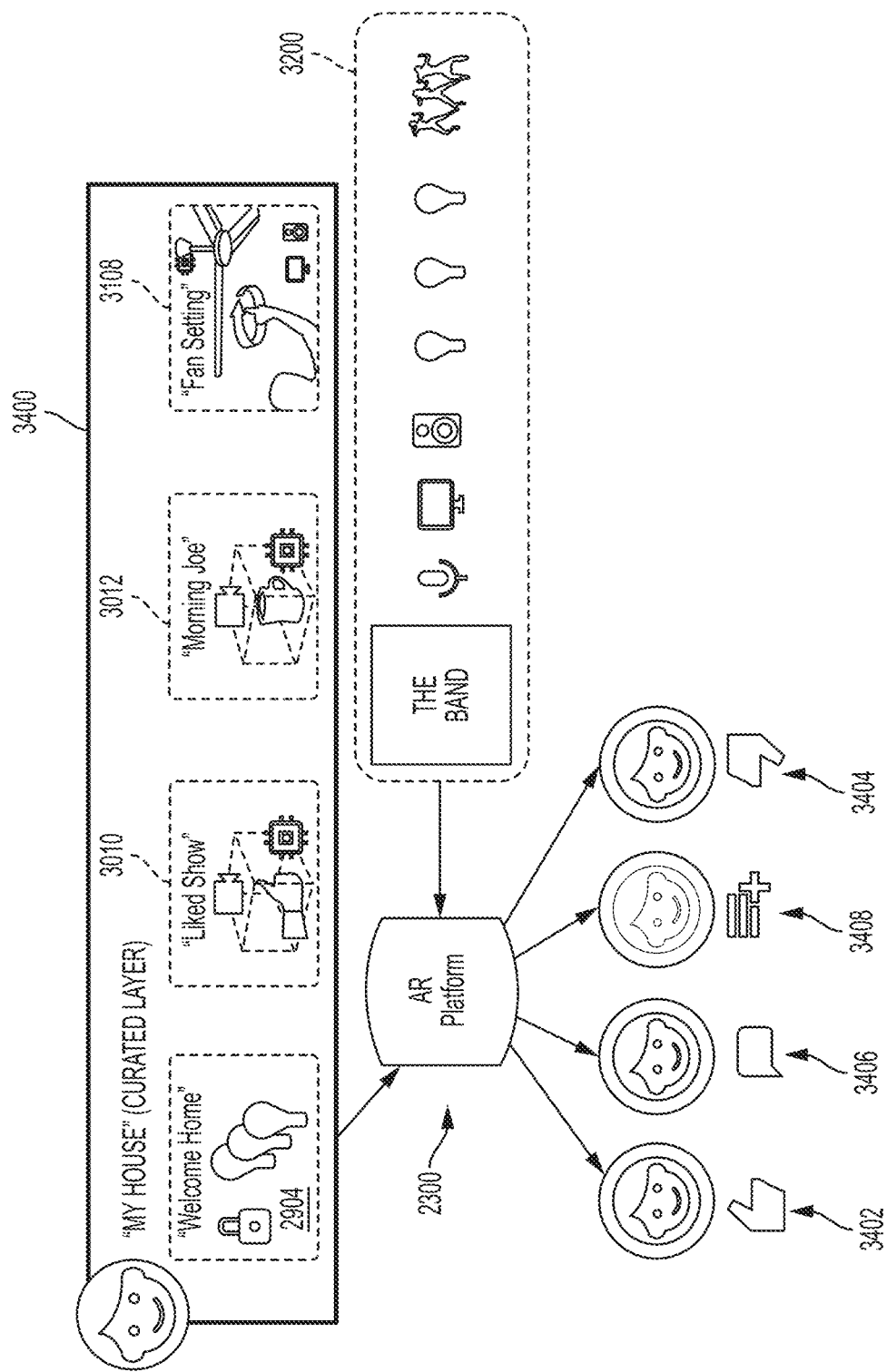
FIG. 34 depicts an illustrative crowd-sourcing system using an AR platform and shareable AR objects associated with IoT devices.

FIG. 34 depicts aspects of a crowd-sourced environment in which published shareable objects are available to other users. FIG. 34 depicts the four shareable objects of the previous examples of FIGS. 29-31 (I.e., shareable objects 2906, 3010, 3012, and 3108), which are encapsulated in a curated layer 3400, plus the external shareable object 3200 from the band. Curated layer 3400 may be stored on the AR platform server-side software and hardware. Other users can then perform interactions (e.g., upvoting 3402, downvoting 3404, commenting 3406, listing 3408, etc.) on the shareable object entities.

Figure 35:
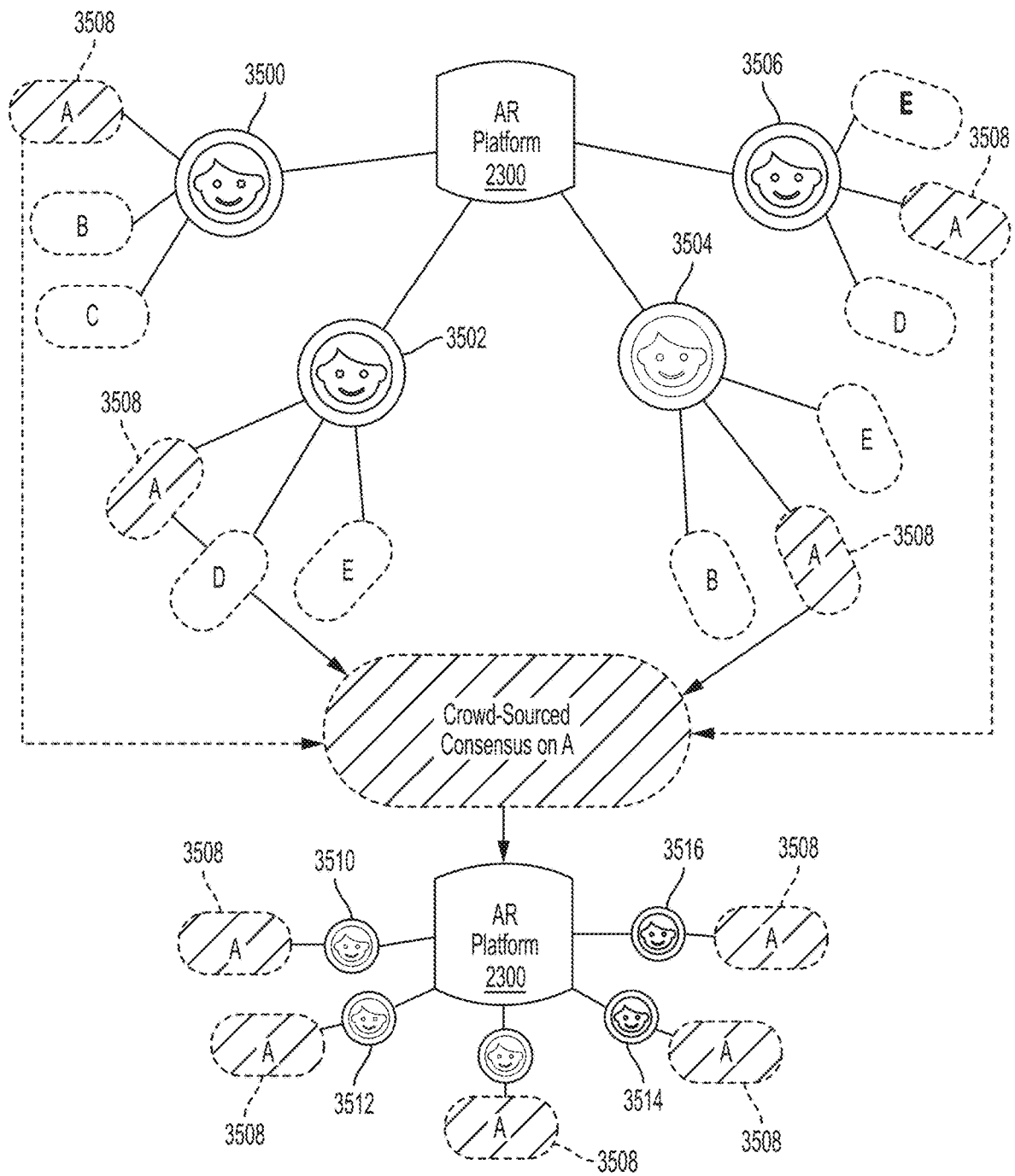
FIG. 35 is a schematic diagram of an illustrative consensus-based method implemented in an AR ecosystem in accordance with aspects of the present disclosure.

FIG. 35 depicts an illustrative process of consensus-based filtering of content using AR platform 2300. In this example, many users are sharing shareable objects and determining which objects they choose to use or interact with. The structure of AR platform 2300 enables the collection and measuring of user interest in shareable objects such as those relating to IoT devices and settings. In FIG. 35, an example is depicted in which the a first set of four users 3500, 3502, 3504, 3506 discover a shareable object 3508 in the form of a shareable setting "A." Each of the users adds it to their own collection of IoT settings, along with other shareable objects (e.g., shareable settings "B", "C", "D", "E"). In this example, all four users choose to use settings "A." Accordingly, the AR platform recognizes a consensus on shareable object 3508 being the "best" shareable object.

Following this system recognition of shareable object 3508, the AR platform may use that information to determine what shareable content to present to future users 3510, 3512, 3514, 3516 when they are, e.g., newly arrived in an applicable geographic location. In this example, the system will display shareable object 3508 to those users. This may be done with multiple items. For example, if there are dozens of shareable AR objects associated with a specific IoT device, displaying all of the available objects to every person who looked at that IoT device in AR could get rather messy, from a visual perspective. Accordingly, if one (or several) of these shareable AR objects are more "popular" (e.g., more users use them or have saved them for later use), then the system may only show the popular AR objects, at least initially. Even in cases where another user modifies the original shareable object "A," its origin and changes (instanced data) may be preserved to derive meaning for the platform.

In addition to this passively-obtained consensus dynamic, users may actively vote on shareable AR objects. For example, if the local street lights of a city are IoT-enabled devices, each may be provided with an associated shareable AR object. This AR object can take votes from users about whether the street light should be on or off. Each street light may then change the state of its light bulb depending on which side has more votes at any current moment or within any specified time span. Many such examples are possible regarding this collaborative voting or "instant democracy" mechanism with respect to IoT device settings.

The user actions described above, such as initial IoT setup in FIG. 28 and device orchestration in FIG. 29, may be performed using "intuitive AR actions." Intuitive AR actions may include any physical action that can be taken by a user to interact with the AR platform through the user interface (e.g., graphical user interface (GUI)). These actions may be performed using the user's finger(s), a mouse, voice controls, a stylus, or through any other suitable input device. For example, a user may draw a line on the user's screen between one shareable AR object and another, or between a shareable AR object and the position of an IoT device (or vice versa), with the line being displayed in the AR view as the user is drawing it. The two endpoints of the line would then be used to determine which two objects are to be linked. Ambiguity in what the connection is supposed to do may be resolved by, e.g., a dialog pop-up that asks the user to choose between several options or select settings.

In another example of an intuitive AR action, a user may tap and hold one displayed AR object or IoT device and then tap (and possibly hold) a second AR object or IoT device. In another example, a user may tap and drag a shareable AR object on top of another shareable AR object or IoT device position. In another example, a user may be detected as looking at a first AR object or IoT device position, tapping it, and then looking at a second AR object or IoT device position, and tapping that. In some examples, voice command may be used, such as by saying "link this to this," where the user's eye tracking or tapping behavior indicates what "this" means in each case. In another example, any of the above actions may be initiated via a button press or voice command, expressing a desire to link the two objects. Similar actions to these may be performed to copy objects rather than linking, e.g., tapping and dragging a shareable AR object to copy it into a new position, or to associate it with a new IoT device.

Additional Examples and Illustrative Combinations

This section describes additional aspects and features of AR platforms and systems for use with IoT devices, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A computer-implemented augmented reality platform comprising:
    a server in a computer network, the server including a server-side augmented reality (AR) platform program;
    a client device including a client-side AR platform program in communication with the server-side AR platform program via the computer network, the client-side AR platform program including a first instance of a child application containing a first AR object; and
    a first physical device in communication with the computer network and configured to exchange data relating to the first physical device with the computer network;
    wherein the first AR object is associated with the first physical device and configured to communicate with the first device via the computer network.

A1. The platform of AC, the first physical device further comprising a setting transitionable between a first state and a second state.

A2. The platform of A1, wherein the first AR object is configured to communicate an instruction to the first physical device to transition the setting between the first state and the second state.

A3. The platform of A2, wherein the instruction is an output of a script of the first AR object.

A4. The platform of A1, wherein the first AR object is configured to communicate a request that the first physical device provide the current state of the setting to the first AR object.

A5. The platform of A4, wherein the current state of the setting of the first physical device is an input to a script of the first AR object.

A6. The platform of A4, wherein the first AR object is configured to display a visual representation corresponding to the setting of the first physical device on the client device.

A7. The platform of A1, wherein the first physical device is a lamp, and the setting is a brightness setting.

A8. The platform of any one of paragraphs AC through A7, wherein the first AR object is configured to communicate with the first physical device in response to a user command provided to the client device.

A9. The platform of A8, wherein the client device is configured to receive the user command from a user interaction with the first AR object via a user interface of the client device.

A10. The platform of any one of paragraphs AC through A9, wherein the client device comprises a mobile electronic device.

A11. The platform of any one of paragraphs AC through A10, wherein the first physical device is an Internet of Things (IoT) device.

A12. The platform of any one of paragraphs A0 through A11, the first physical device further comprising a sensor configured to detect a physical property and produce sensor data, wherein the first AR object is configured to request the sensor data from the first physical device, and the first physical device is configured to provide the sensor data in response to the request.

A13. The platform of A12, wherein the sensor data comprises an input to a script of the first AR object.

A14. The platform of A13, wherein a visual representation corresponding to the sensor data is displayed on the first AR object.

A15. The platform of any one of paragraphs AC through A14, further comprising a second physical device in communication with the computer network and having an interface configured to exchange data relating to the second physical device with the computer network; and the client-side AR platform program including a second AR object associated with the second physical device and configured to communicate with the second device via the computer network.

A16. The platform of A15, wherein the second AR object is contained in a second instance of a child application (e.g., of the abovementioned child application or of a second child application/AR application layer).

A17. The platform of A15, wherein the first AR object and the second AR object are contained in the first instance of the child application.

A18. The platform of A15, wherein the first AR object and the second AR object are viewable on a graphical user interface of the client device.

A19. The platform of A18, wherein the first AR object and the second AR object are displayed in respective virtual locations corresponding to the first physical object and the second physical object, as viewed on the GUI of the client device.

A20. The platform of A15, wherein the first AR object is associated with the second device and configured to exchange data with the second device via the computer network.

A21. The platform of any one of paragraphs AC through A20, wherein the first AR object is a shareable AR object.

A22. The platform of any one of paragraphs AC through A21, wherein the first AR object is disposed in a curated AR layer.

A23. The platform of any one of paragraphs AC through A22, wherein the first AR object is configured to interact with the first physical device using an application programming interface (API) of the first physical device.

B0. A computer-implemented method for interacting with physical devices using an augmented reality system, the method comprising:
executing, using a server in a computer network, a server-side augmented reality (AR) platform program;
executing, on a client device, a client-side AR platform program in communication with the server-side AR platform program via the computer network, the client-side AR platform program including a first instance of a child application containing a first AR object; and
associating the first AR object with a first physical device and communicating data between the first AR object and the first physical device via the computer network.

B1. The method of B0, further comprising:
communicating an instruction from the first AR object to the first physical device to transition a setting of the first physical device from a first state to a second state.

B2. The method of B1, wherein the first physical device is a lamp, and the setting is a brightness setting.

B3. The method of any one of paragraphs BC through B2, further comprising: communicating, from the first AR object to the first physical device, a request to send a current state of a setting of the first physical device to the AR object.

B4. The method of B3, further comprising:
receiving, by the first AR object from the first physical device, the current state of the setting; and
displaying, on the client device, information corresponding to the current state.

B5. The method of any one of paragraphs BC through B4, wherein the first physical device comprises a sensor, the method further comprising:
communicating, from the first AR object to the first physical device, a request to send sensor data associated with the sensor to the first AR object.

B6. The method of any one of paragraphs BC through B5, wherein communicating data between the first AR object and the first physical device via the computer network comprises using an application programming interface (API) of the first physical device.

B7. The method of any one of paragraphs BC through B6, further comprising:
receiving, at the client device, a user interaction with the first AR object; and
communicating data between the first AR object and the first physical device corresponding to the user interaction.

B8. The method of B7, wherein the user interaction indicates a request to edit a setting of the first physical device, and communicating data between the first AR object and the first physical device includes sending a request to the first physical device to edit the setting.

B9. The method of B8, further comprising changing the setting of the first physical device to comply with the edit request.

B10. The method of B9, wherein the first physical device is a lamp, and changing the setting comprises turning off the lamp.

B111. The method of any one of paragraphs BC through B10, further comprising: saving one or more settings of the first physical device in the first AR object.

B112. The method of B111, further comprising:
copying the one or more settings of the first physical device from the first AR object to a second AR object, and associating the second AR object with a second physical device.

B13. The method of B12, wherein copying the one or more settings from the first AR object to the second AR object comprises an intuitive AR action by a user interacting with the client device.

B14. The method of any one of paragraphs BC through B13, further comprising:
associating the first AR object with a plurality of physical devices including the first physical device, each one of the plurality of physical devices having a setting compatible with a corresponding setting of the first physical device.

B15. The method of B14, wherein associating the first AR object with the plurality of physical devices comprises an intuitive AR action by a user interacting with the client device.

B16. The method of any one of paragraphs BC through B15, further comprising:
  associating a second AR object with a second physical device;
  controlling a setting of the second physical device using the second AR object, wherein controlling the setting comprises using conditional logic to change output data of the second AR object based on data received from the first AR object.

B17. The method of B16, wherein the conditional logic comprises an if/then statement.

B18. The method of B16, wherein the data received from the first AR object corresponds to a state of the first physical device.

B19. The method of any one of paragraphs BC through B18, wherein the client device is a first client device of a first user, the method further comprising:
  setting a permission status of the first AR object to allow the first AR object to be available to a second user using a second client device.

B20. The method of B19, further comprising:
  permitting the first user and the second user to collaboratively edit the first AR object.

B21. The method of B20, wherein collaboration between the first and second user comprises voting on a choice of two or more candidate edits to the first AR object, and wherein the edit made to the first AR object comprises the candidate edit having the most votes.

B22. The method of any one of paragraphs BC through B21, wherein the client device is a client device of a first user, the method further comprising:
  placing the first AR object and a second AR object into a curated AR layer and granting permission for one or more second users to access the curated layer.

C0. A sensor system comprising:
  a device having a sensor configured to detect a property of a physical space;
  a computer-implemented augmented reality (AR) system configured to generate an AR object corresponding to an AR defined volume disposed at least partially within the physical space, such that an AR view of the physical space renders a display of the AR defined volume; and
  a computer system having a processor and a set of stored instructions executable by the processor to:
    monitor an output of the device;
    in response to a sensed event from the device in the physical space, comparing a location of the sensed event to the AR defined volume of the physical space; and
    if the location of the sensed event is within the AR defined volume, triggering an action in the AR system.

C1. The system of C0, wherein the device comprises an imaging device.

C2. The system of C1, wherein the imaging device is configured to detect visible light.

C3. The system of any one of paragraphs C0 through C2, wherein the AR defined volume has a fixed size.

C4. The system of any one of paragraphs C0 through C3, wherein the AR defined volume is cuboidal.

C5. The system of any one of paragraphs C0 through C4, wherein the sensed event comprises the presence of a recognized physical object.

C6. The system of any one of paragraphs C0 through C5, wherein the sensed event comprises a gesture.

C7. The system of any one of paragraphs C0 through C6, wherein triggering the action in the AR system comprises changing a setting of an AR object of the AR system.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A computer-implemented augmented reality (AR) platform comprising:
  a computer system including a set of one or more AR programs, the set containing a first AR object associated with a first priority value and a second AR object associated with a second priority value, wherein the first AR object is configured to communicate with a first physical device via a computer network, and the second AR object is configured to communicate with a second physical device via the computer network; and
  a computing device of the computer system in the computer network, wherein the computing device is physically separate from a sensor, the sensor is configured to sense an event within a physical space, and the computing device is configured to monitor output of the sensor; and
  wherein in response to sensing a first event by the sensor, the computing device is configured to automatically:
    select one of the first and second AR objects based on the first and second priority values, and
    trigger the selected AR object to run an executable instruction contained in the selected AR object, wherein the executable instruction is configured to, in response to being run, output a first command to the physical device corresponding to the selected AR object.

2. The platform of claim 1, wherein the sensor is disposed at a fixed location.

3. The platform of claim 1, wherein the first command comprises an instruction to transition a setting of the physical device corresponding to the selected AR object between a first state and a second state.

4. The platform of claim 1, wherein the first and second priority values correspond to a frequency of user interaction with the first and second AR objects respectively.

5. The platform of claim 1, wherein the first and second priority values are stored at a memory of the AR platform.

6. The platform of claim 1, wherein the first AR object is contained in a first AR program of the set of AR programs and the second AR object is contained in a second AR program of the set of AR programs.

7. The platform of claim 6, wherein the first priority value is associated with the first AR program and the second priority value is associated with the second AR program.

8. The platform of claim 1, wherein the first event comprises a gesture.

9. The platform of claim 8, wherein the gesture comprises a hand gesture and sensing the hand gesture includes recognizing the hand gesture as a first hand gesture of a plurality of recognizable hand gestures, the first hand gesture being associated with the first command.

10. The platform of claim 1, wherein the physical space is defined by data of the AR platform.

11. The platform of claim 1, wherein the physical space corresponds to a volume defined by an AR object.

12. The platform of claim 1, wherein the computer system includes a mobile digital device.

13. The platform of claim 12, wherein at least one of the first and second AR objects includes a visual AR component configured to be incorporated into an AR view at the mobile digital device.

14. A sensor system comprising:
a sensor configured to sense data relating to a physical space;
a computer-implemented augmented reality (AR) system in communication with a computer network, the AR system including a first AR object configured to communicate with a first physical device and a second AR object configured to communicate with a second physical device, wherein the first AR object has a first priority value and the second AR object has a second priority value; and
a computer system comprising at least one computing device physically separate from the sensor, wherein the computing device is configured to receive output of the sensor and, in response to output indicating a first event within the physical space, the computing device is configured to automatically:
determine that the first priority value indicates a higher priority than the second priority value, and
communicate first data to the first AR object; wherein the first AR object is configured to, in response to the first data, run an executable instruction contained in the first AR object, and the executable instruction is configured to, in response to being run, communicate an instruction to the first physical device.

15. The sensor system of claim 14, wherein the first and second priority values correspond to a frequency of user interaction with the first and second AR objects respectively.

16. The sensor system of claim 14, wherein the first and second priority values correspond to a recency of user interaction with the first and second AR objects respectively.

17. The sensor system of claim 14, wherein the first AR object belongs to a first AR application of the AR system and the second AR object belongs to a second AR application of the AR system.

18. The sensor system of claim 17, wherein the first priority value is a priority value of the first AR application and the second priority value is a priority value of the second AR application.

19. The sensor system of claim 14, wherein the first AR object and the second AR object are viewable on a graphical user interface of a client device.

20. The sensor system of claim 14, wherein the physical space is defined by an AR object of the AR system.

* * * * *